(12) United States Patent
Katsuyama

(10) Patent No.: US 10,933,653 B2
(45) Date of Patent: Mar. 2, 2021

(54) IMAGE PROCESSING APPARATUS, IMAGE PROCESSING METHOD, PROGRAM, AND IMAGE RECORDING APPARATUS

(71) Applicant: FUJIFILM Corporation, Tokyo (JP)

(72) Inventor: Kimito Katsuyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/691,978

(22) Filed: Nov. 22, 2019

(65) Prior Publication Data

US 2020/0086653 A1 Mar. 19, 2020

Related U.S. Application Data

(63) Continuation of application No. PCT/JP2018/014563, filed on Apr. 5, 2018.

(30) Foreign Application Priority Data

Jul. 11, 2017 (JP) .............................. JP2017-135542

(51) Int. Cl.
*B41J 2/21* (2006.01)
(52) U.S. Cl.
CPC .................... *B41J 2/2103* (2013.01)
(58) Field of Classification Search
CPC .......... B41J 2/2103; B41J 2/2132; B41J 2/01; G06K 15/1881; G06K 15/107; H04N 1/52; H04N 1/46
See application file for complete search history.

(56) References Cited

U.S. PATENT DOCUMENTS

| 2005/0007416 A1 | 1/2005 | Takekoshi et al. |
| 2009/0002766 A1 | 1/2009 | Horii et al. |

(Continued)

FOREIGN PATENT DOCUMENTS

| EP | 1059803 A2 * | 12/2000 | .......... H04N 1/4051 |
| GB | 2545717 A | 6/2017 | |

(Continued)

OTHER PUBLICATIONS

IP.com search (Year: 2020).*

(Continued)

*Primary Examiner* — Lisa Solomon
(74) *Attorney, Agent, or Firm* — Studebaker & Brackett PC

(57) ABSTRACT

Provided are an image processing apparatus, an image processing method, a program, and an image recording apparatus capable of suppressing occurrence of banding and color unevenness without productivity decrease. Different types of nozzle jetting rates are reflected in image data of each of a first color and a second color that are two different plural colors to perform conversion of a gradation value of each pixel, and halftone processing is performed with respect to the converted image data. A first nozzle jetting rate to be reflected in a gradation value of the first color is set so that a nozzle jetting rate of an end part nozzle at each of both end parts of a nozzle row is suppressed to be smaller than a nozzle jetting rate of a central nozzle. A second nozzle jetting rate to be reflected in a gradation value of the second color has a smaller difference between the nozzle jetting rate of the end part nozzle and the nozzle jetting rate of the central nozzle compared with the first nozzle jetting rate.

25 Claims, 29 Drawing Sheets

(56) References Cited

U.S. PATENT DOCUMENTS

| | | |
|---|---|---|
| 2010/0177137 A1 | 7/2010 | Kakutani |
| 2016/0191747 A1 | 6/2016 | Katsuyama |
| 2016/0288490 A1 | 10/2016 | Okajima et al. |
| 2017/0085750 A1 | 3/2017 | Katsuyama |
| 2017/0157919 A1 | 6/2017 | Katsuyama |

FOREIGN PATENT DOCUMENTS

| | | | |
|---|---|---|---|
| JP | 2004338312 A | 12/2004 | |
| JP | 2005088467 A | 4/2005 | |
| JP | 2008307870 A | 12/2008 | |
| JP | 2009160876 A | 7/2009 | |
| JP | 2010083023 A | 4/2010 | |
| JP | 2010094895 A | 4/2010 | |
| JP | 2010162770 A | 7/2010 | |
| JP | 2010162772 A | 7/2010 | |
| JP | 2015096316 A | 5/2015 | |
| JP | 2016043651 A | 4/2016 | |
| JP | 2016120714 A | 7/2016 | |
| JP | 2017056682 A | 3/2017 | |
| WO | 2017109461 A1 | 6/2017 | |

OTHER PUBLICATIONS

International Search Report issued in PCT/JP2018/014563; dated May 29, 2018.
International Preliminary Report on Patentability and Written Opinion issued in PCT/JP2018/014563; dated Jan. 14, 2020.

\* cited by examiner

FIG. 12

| | SCAN | | | |
|---|---|---|---|---|
| | 1 | 2 | 3 | 4 |
| | | 25 | | 0 |
| | 38 | | 13 | |
| | | 26 | | 1 |
| | 39 | | 14 | |
| | | 27 | | 2 |
| | 40 | | 15 | |
| | | 28 | | 3 |
| | 41 | | 16 | |
| | | 29 | | 4 |
| | 42 | | 17 | |
| | | 30 | | 5 |
| NOZZLE ROW | 43 | | 18 | |
| | | 31 | | 6 |
| | 44 | | 19 | |
| | | 32 | | 7 |
| | 45 | | 20 | |
| | | 33 | | 8 |
| | 46 | | 21 | |
| | | 34 | | 9 |
| | 47 | | 22 | |
| | | 35 | | 10 |
| | 48 | | 23 | |
| | | 36 | | 11 |
| | 49 | | 24 | |
| | | 37 | | 12 |

| 25 | 0 | 25 | 0 | 25 | 0 | 25 | 0 | 25 | 0 |
|---|---|---|---|---|---|---|---|---|---|
| 38 | 13 | 38 | 13 | 38 | 13 | 38 | 13 | 38 | 13 |
| 26 | 1 | 26 | 1 | 26 | 1 | 26 | 1 | 26 | 1 |
| 39 | 14 | 39 | 14 | 39 | 14 | 39 | 14 | 39 | 14 |
| 27 | 2 | 27 | 2 | 27 | 2 | 27 | 2 | 27 | 2 |
| 40 | 15 | 40 | 15 | 40 | 15 | 40 | 15 | 40 | 15 |
| 28 | 3 | 28 | 3 | 28 | 3 | 28 | 3 | 28 | 3 |
| 41 | 16 | 41 | 16 | 41 | 16 | 41 | 16 | 41 | 16 |
| 29 | 4 | 29 | 4 | 29 | 4 | 29 | 4 | 29 | 4 |
| 42 | 17 | 42 | 17 | 42 | 17 | 42 | 17 | 42 | 17 |

NOZZLE PATTERN

FIG. 13

| 1.00 | 0.00 | 1.00 | 0.00 | 1.00 | 0.00 | 1.00 | 0.00 | 1.00 | 0.00 |
|------|------|------|------|------|------|------|------|------|------|
| 0.85 | 1.00 | 0.85 | 1.00 | 0.85 | 1.00 | 0.85 | 1.00 | 0.85 | 1.00 |
| 1.00 | 0.08 | 1.00 | 0.08 | 1.00 | 0.08 | 1.00 | 0.08 | 1.00 | 0.08 |
| 0.77 | 1.00 | 0.77 | 1.00 | 0.77 | 1.00 | 0.77 | 1.00 | 0.77 | 1.00 |
| 1.00 | 0.15 | 1.00 | 0.15 | 1.00 | 0.15 | 1.00 | 0.15 | 1.00 | 0.15 |
| 0.69 | 1.00 | 0.69 | 1.00 | 0.69 | 1.00 | 0.69 | 1.00 | 0.69 | 1.00 |
| 1.00 | 0.23 | 1.00 | 0.23 | 1.00 | 0.23 | 1.00 | 0.23 | 1.00 | 0.23 |
| 0.62 | 1.00 | 0.62 | 1.00 | 0.62 | 1.00 | 0.62 | 1.00 | 0.62 | 1.00 |
| 1.00 | 0.31 | 1.00 | 0.31 | 1.00 | 0.31 | 1.00 | 0.31 | 1.00 | 0.31 |
| 0.54 | 1.00 | 0.54 | 1.00 | 0.54 | 1.00 | 0.54 | 1.00 | 0.54 | 1.00 |

JETTING RATE PATTERN

FIG. 14

| 1.00 | 0.00 | 1.00 | 0.00 | 1.00 | 0.00 | 1.00 | 0.00 | 1.00 | 0.00 |
|------|------|------|------|------|------|------|------|------|------|
| 0.72 | 1.00 | 0.72 | 1.00 | 0.72 | 1.00 | 0.72 | 1.00 | 0.72 | 1.00 |
| 1.00 | 0.01 | 1.00 | 0.01 | 1.00 | 0.01 | 1.00 | 0.01 | 1.00 | 0.01 |
| 0.59 | 1.00 | 0.59 | 1.00 | 0.59 | 1.00 | 0.59 | 1.00 | 0.59 | 1.00 |
| 1.00 | 0.02 | 1.00 | 0.02 | 1.00 | 0.02 | 1.00 | 0.02 | 1.00 | 0.02 |
| 0.48 | 1.00 | 0.48 | 1.00 | 0.48 | 1.00 | 0.48 | 1.00 | 0.48 | 1.00 |
| 1.00 | 0.05 | 1.00 | 0.05 | 1.00 | 0.05 | 1.00 | 0.05 | 1.00 | 0.05 |
| 0.38 | 1.00 | 0.38 | 1.00 | 0.38 | 1.00 | 0.38 | 1.00 | 0.38 | 1.00 |
| 1.00 | 0.10 | 1.00 | 0.10 | 1.00 | 0.10 | 1.00 | 0.10 | 1.00 | 0.10 |
| 0.29 | 1.00 | 0.29 | 1.00 | 0.29 | 1.00 | 0.29 | 1.00 | 0.29 | 1.00 |

OVERLAP PROBABILITY PATTERN

FIG. 15

| 0.72 | 0.72 | 0.72 | 0.72 | 0.72 | 0.72 | 0.72 | 0.72 | 0.72 | 0.72 |
|---|---|---|---|---|---|---|---|---|---|
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |

JETTING RATE PATTERN

FIG. 16

| 0.52 | 0.52 | 0.52 | 0.52 | 0.52 | 0.52 | 0.52 | 0.52 | 0.52 | 0.52 |
|---|---|---|---|---|---|---|---|---|---|
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |

OVERLAP PROBABILITY PATTERN

FIG. 17

| 0.00 | 0.00 | 0.00 | 0.00 | 0.00 | 0.00 | 0.00 | 0.00 | 0.00 | 0.00 |
|---|---|---|---|---|---|---|---|---|---|
| 0.85 | 0.85 | 0.85 | 0.85 | 0.85 | 0.85 | 0.85 | 0.85 | 0.85 | 0.85 |
| 0.08 | 0.08 | 0.08 | 0.08 | 0.08 | 0.08 | 0.08 | 0.08 | 0.08 | 0.08 |
| 0.77 | 0.77 | 0.77 | 0.77 | 0.77 | 0.77 | 0.77 | 0.77 | 0.77 | 0.77 |
| 0.15 | 0.15 | 0.15 | 0.15 | 0.15 | 0.15 | 0.15 | 0.15 | 0.15 | 0.15 |
| 0.69 | 0.69 | 0.69 | 0.69 | 0.69 | 0.69 | 0.69 | 0.69 | 0.69 | 0.69 |
| 0.23 | 0.23 | 0.23 | 0.23 | 0.23 | 0.23 | 0.23 | 0.23 | 0.23 | 0.23 |
| 0.62 | 0.62 | 0.62 | 0.62 | 0.62 | 0.62 | 0.62 | 0.62 | 0.62 | 0.62 |
| 0.31 | 0.31 | 0.31 | 0.31 | 0.31 | 0.31 | 0.31 | 0.31 | 0.31 | 0.31 |
| 0.54 | 0.54 | 0.54 | 0.54 | 0.54 | 0.54 | 0.54 | 0.54 | 0.54 | 0.54 |

OVERLAP PROBABILITY PATTERN IN CASE OF BEING SHIFTED
BY ONE PIXEL IN MAIN SCAN DIRECTION

FIG. 18

| 0.85 | 0.00 | 0.85 | 0.00 | 0.85 | 0.00 | 0.85 | 0.00 | 0.85 | 0.00 |
|---|---|---|---|---|---|---|---|---|---|
| 0.85 | 0.08 | 0.85 | 0.08 | 0.85 | 0.08 | 0.85 | 0.08 | 0.85 | 0.08 |
| 0.77 | 0.08 | 0.77 | 0.08 | 0.77 | 0.08 | 0.77 | 0.08 | 0.77 | 0.08 |
| 0.77 | 0.15 | 0.77 | 0.15 | 0.77 | 0.15 | 0.77 | 0.15 | 0.77 | 0.15 |
| 0.69 | 0.15 | 0.69 | 0.15 | 0.69 | 0.15 | 0.69 | 0.15 | 0.69 | 0.15 |
| 0.69 | 0.23 | 0.69 | 0.23 | 0.69 | 0.23 | 0.69 | 0.23 | 0.69 | 0.23 |
| 0.62 | 0.23 | 0.62 | 0.23 | 0.62 | 0.23 | 0.62 | 0.23 | 0.62 | 0.23 |
| 0.62 | 0.31 | 0.62 | 0.31 | 0.62 | 0.31 | 0.62 | 0.31 | 0.62 | 0.31 |
| 0.54 | 0.31 | 0.54 | 0.31 | 0.54 | 0.31 | 0.54 | 0.31 | 0.54 | 0.31 |
| 0.54 | 0.38 | 0.54 | 0.38 | 0.54 | 0.38 | 0.54 | 0.38 | 0.54 | 0.38 |

OVERLAP PROBABILITY PATTERN IN CASE OF BEING SHIFTED
BY ONE PIXEL IN SUB SCAN DIRECTION

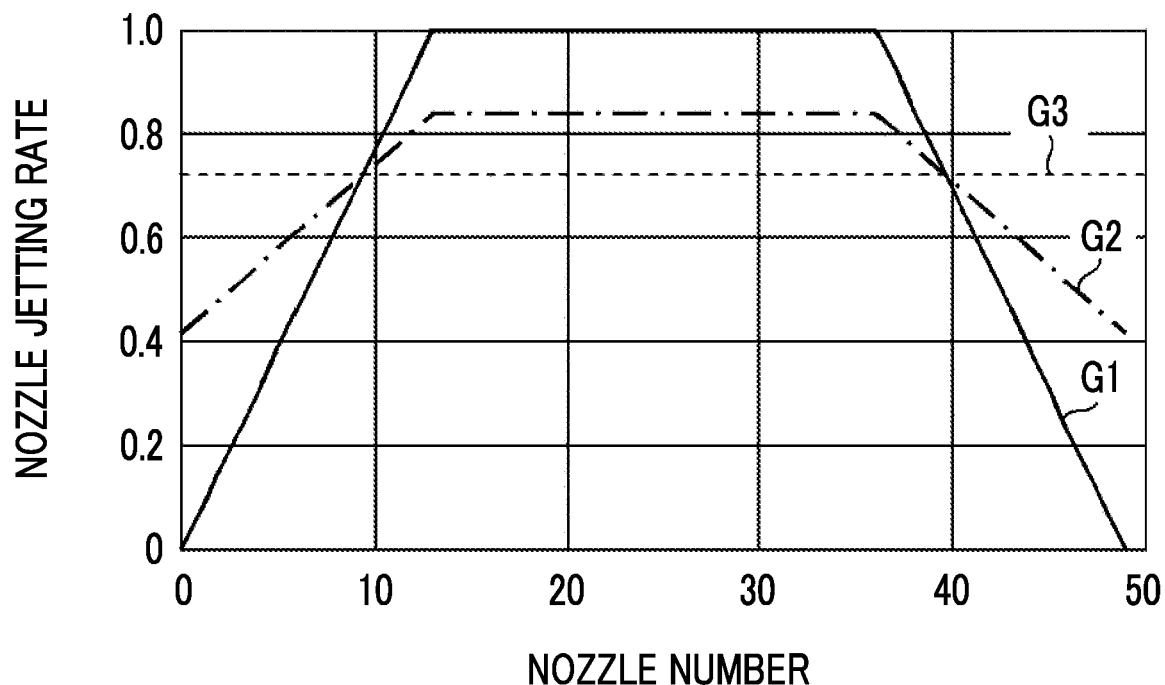

FIG. 24

| 0.71 | 0.18 | 0.71 | 0.18 | 0.71 | 0.18 | 0.71 | 0.18 | 0.71 | 0.18 |
|---|---|---|---|---|---|---|---|---|---|
| 0.59 | 0.71 | 0.59 | 0.71 | 0.59 | 0.71 | 0.59 | 0.71 | 0.59 | 0.71 |
| 0.71 | 0.20 | 0.71 | 0.20 | 0.71 | 0.20 | 0.71 | 0.20 | 0.71 | 0.20 |
| 0.55 | 0.71 | 0.55 | 0.71 | 0.55 | 0.71 | 0.55 | 0.71 | 0.55 | 0.71 |
| 0.71 | 0.23 | 0.71 | 0.23 | 0.71 | 0.23 | 0.71 | 0.23 | 0.71 | 0.23 |
| 0.50 | 0.71 | 0.50 | 0.71 | 0.50 | 0.71 | 0.50 | 0.71 | 0.50 | 0.71 |
| 0.71 | 0.27 | 0.71 | 0.27 | 0.71 | 0.27 | 0.71 | 0.27 | 0.71 | 0.27 |
| 0.46 | 0.71 | 0.46 | 0.71 | 0.46 | 0.71 | 0.46 | 0.71 | 0.46 | 0.71 |
| 0.71 | 0.30 | 0.71 | 0.30 | 0.71 | 0.30 | 0.71 | 0.30 | 0.71 | 0.30 |
| 0.41 | 0.71 | 0.41 | 0.71 | 0.41 | 0.71 | 0.41 | 0.71 | 0.41 | 0.71 |

OVERLAP PROBABILITY PATTERN

FIG. 25

| 0.35 | 0.35 | 0.35 | 0.35 | 0.35 | 0.35 | 0.35 | 0.35 | 0.35 | 0.35 |
|---|---|---|---|---|---|---|---|---|---|
| 0.65 | 0.65 | 0.65 | 0.65 | 0.65 | 0.65 | 0.65 | 0.65 | 0.65 | 0.65 |
| 0.38 | 0.38 | 0.38 | 0.38 | 0.38 | 0.38 | 0.38 | 0.38 | 0.38 | 0.38 |
| 0.62 | 0.62 | 0.62 | 0.62 | 0.62 | 0.62 | 0.62 | 0.62 | 0.62 | 0.62 |
| 0.40 | 0.40 | 0.40 | 0.40 | 0.40 | 0.40 | 0.40 | 0.40 | 0.40 | 0.40 |
| 0.60 | 0.60 | 0.60 | 0.60 | 0.60 | 0.60 | 0.60 | 0.60 | 0.60 | 0.60 |
| 0.44 | 0.44 | 0.44 | 0.44 | 0.44 | 0.44 | 0.44 | 0.44 | 0.44 | 0.44 |
| 0.57 | 0.57 | 0.57 | 0.57 | 0.57 | 0.57 | 0.57 | 0.57 | 0.57 | 0.57 |
| 0.46 | 0.46 | 0.46 | 0.46 | 0.46 | 0.46 | 0.46 | 0.46 | 0.46 | 0.46 |
| 0.54 | 0.54 | 0.54 | 0.54 | 0.54 | 0.54 | 0.54 | 0.54 | 0.54 | 0.54 |

OVERLAP PROBABILITY PATTERN IN CASE OF BEING SHIFTED BY ONE PIXEL IN MAIN SCAN DIRECTION

| 0.65 | 0.35 | 0.65 | 0.35 | 0.65 | 0.35 | 0.65 | 0.35 | 0.65 | 0.35 |
|------|------|------|------|------|------|------|------|------|------|
| 0.65 | 0.38 | 0.65 | 0.38 | 0.65 | 0.38 | 0.65 | 0.38 | 0.65 | 0.38 |
| 0.62 | 0.38 | 0.62 | 0.38 | 0.62 | 0.38 | 0.62 | 0.38 | 0.62 | 0.38 |
| 0.62 | 0.40 | 0.62 | 0.40 | 0.62 | 0.40 | 0.62 | 0.40 | 0.62 | 0.40 |
| 0.60 | 0.40 | 0.60 | 0.40 | 0.60 | 0.40 | 0.60 | 0.40 | 0.60 | 0.40 |
| 0.60 | 0.44 | 0.60 | 0.44 | 0.60 | 0.44 | 0.60 | 0.44 | 0.60 | 0.44 |
| 0.57 | 0.44 | 0.57 | 0.44 | 0.57 | 0.44 | 0.57 | 0.44 | 0.57 | 0.44 |
| 0.57 | 0.46 | 0.57 | 0.46 | 0.57 | 0.46 | 0.57 | 0.46 | 0.57 | 0.46 |
| 0.54 | 0.46 | 0.54 | 0.46 | 0.54 | 0.46 | 0.54 | 0.46 | 0.54 | 0.46 |
| 0.54 | 0.49 | 0.54 | 0.49 | 0.54 | 0.49 | 0.54 | 0.49 | 0.54 | 0.49 |

OVERLAP PROBABILITY PATTERN IN CASE OF BEING SHIFTED BY ONE PIXEL IN SUB SCAN DIRECTION

FIG. 28

| 0.84 | 0.00 | 0.84 | 0.00 | 0.84 | 0.00 | 0.84 | 0.00 | 0.84 | 0.00 |
|------|------|------|------|------|------|------|------|------|------|
| 0.65 | 0.84 | 0.65 | 0.84 | 0.65 | 0.84 | 0.65 | 0.84 | 0.65 | 0.84 |
| 0.84 | 0.04 | 0.84 | 0.04 | 0.84 | 0.04 | 0.84 | 0.04 | 0.84 | 0.04 |
| 0.57 | 0.84 | 0.57 | 0.84 | 0.57 | 0.84 | 0.57 | 0.84 | 0.57 | 0.84 |
| 0.84 | 0.07 | 0.84 | 0.07 | 0.84 | 0.07 | 0.84 | 0.07 | 0.84 | 0.07 |
| 0.49 | 0.84 | 0.49 | 0.84 | 0.49 | 0.84 | 0.49 | 0.84 | 0.49 | 0.84 |
| 0.84 | 0.12 | 0.84 | 0.12 | 0.84 | 0.12 | 0.84 | 0.12 | 0.84 | 0.12 |
| 0.42 | 0.84 | 0.42 | 0.84 | 0.42 | 0.84 | 0.42 | 0.84 | 0.42 | 0.84 |
| 0.84 | 0.17 | 0.84 | 0.17 | 0.84 | 0.17 | 0.84 | 0.17 | 0.84 | 0.17 |
| 0.35 | 0.84 | 0.35 | 0.84 | 0.35 | 0.84 | 0.35 | 0.84 | 0.35 | 0.84 |

OVERLAP PROBABILITY PATTERN

FIG. 29

| 0.42 | 0.00 | 0.42 | 0.00 | 0.42 | 0.00 | 0.42 | 0.00 | 0.42 | 0.00 |
|------|------|------|------|------|------|------|------|------|------|
| 0.71 | 0.77 | 0.71 | 0.77 | 0.71 | 0.77 | 0.71 | 0.77 | 0.71 | 0.77 |
| 0.45 | 0.07 | 0.45 | 0.07 | 0.45 | 0.07 | 0.45 | 0.07 | 0.45 | 0.07 |
| 0.65 | 0.74 | 0.65 | 0.74 | 0.65 | 0.74 | 0.65 | 0.74 | 0.65 | 0.74 |
| 0.48 | 0.13 | 0.48 | 0.13 | 0.48 | 0.13 | 0.48 | 0.13 | 0.48 | 0.13 |
| 0.58 | 0.71 | 0.58 | 0.71 | 0.58 | 0.71 | 0.58 | 0.71 | 0.58 | 0.71 |
| 0.52 | 0.19 | 0.52 | 0.19 | 0.52 | 0.19 | 0.52 | 0.19 | 0.52 | 0.19 |
| 0.52 | 0.68 | 0.52 | 0.68 | 0.52 | 0.68 | 0.52 | 0.68 | 0.52 | 0.68 |
| 0.55 | 0.26 | 0.55 | 0.26 | 0.55 | 0.26 | 0.55 | 0.26 | 0.55 | 0.26 |
| 0.45 | 0.64 | 0.45 | 0.64 | 0.45 | 0.64 | 0.45 | 0.64 | 0.45 | 0.64 |

OVERLAP PROBABILITY PATTERN IN CASE OF BEING SHIFTED BY ONE PIXEL IN MAIN SCAN DIRECTION

| 0.77 | 0.00 | 0.77 | 0.00 | 0.77 | 0.00 | 0.77 | 0.00 | 0.77 | 0.00 |
|------|------|------|------|------|------|------|------|------|------|
| 0.71 | 0.45 | 0.71 | 0.45 | 0.71 | 0.45 | 0.71 | 0.45 | 0.71 | 0.45 |
| 0.74 | 0.07 | 0.74 | 0.07 | 0.74 | 0.07 | 0.74 | 0.07 | 0.74 | 0.07 |
| 0.65 | 0.48 | 0.65 | 0.48 | 0.65 | 0.48 | 0.65 | 0.48 | 0.65 | 0.48 |
| 0.71 | 0.13 | 0.71 | 0.13 | 0.71 | 0.13 | 0.71 | 0.13 | 0.71 | 0.13 |
| 0.58 | 0.52 | 0.58 | 0.52 | 0.58 | 0.52 | 0.58 | 0.52 | 0.58 | 0.52 |
| 0.68 | 0.19 | 0.68 | 0.19 | 0.68 | 0.19 | 0.68 | 0.19 | 0.68 | 0.19 |
| 0.52 | 0.55 | 0.52 | 0.55 | 0.52 | 0.55 | 0.52 | 0.55 | 0.52 | 0.55 |
| 0.64 | 0.26 | 0.64 | 0.26 | 0.64 | 0.26 | 0.64 | 0.26 | 0.64 | 0.26 |
| 0.45 | 0.58 | 0.45 | 0.58 | 0.45 | 0.58 | 0.45 | 0.58 | 0.45 | 0.58 |

OVERLAP PROBABILITY PATTERN IN CASE OF BEING SHIFTED BY ONE PIXEL IN SUB SCAN DIRECTION

IMAGE PROCESSING APPARATUS, IMAGE PROCESSING METHOD, PROGRAM, AND IMAGE RECORDING APPARATUS

CROSS-REFERENCE TO RELATED APPLICATIONS

This application is a Continuation of PCT International Application No. PCT/JP2018/014563 filed on Apr. 5, 2018, which claims priority under 35 U.S.C § 119(a) to Japanese Patent Application No. 2017-135542 filed on Jul. 11, 2017. Each of the above application(s) is hereby expressly incorporated by reference, in its entirety, into the present application.

BACKGROUND OF THE INVENTION

1. Field of the Invention

The present invention relates to an image processing apparatus, an image processing method, a program, and an image recording apparatus, and more particularly, to a halftone processing technique suitable for an ink jet control in a serial-type ink jet printer that records an image while relatively moving a recording head having a nozzle row with respect to a recording medium.

2. Description of the Related Art

The serial-type ink jet printer repeats a main scan operation of jetting ink from nozzles of a recording head while moving the recording head in a main scan direction to perform recording and a sub scan operation that is a medium feeding operation of intermittently transporting the recording medium in a sub scan direction, to thereby record an image on the recording medium.

In such an image recording method, a behavior of landed droplets, that is, a behavior of dots on the recording medium is changed due to a recording position error of each dot onto the recording medium from each nozzle of the recording head or a jetting amount error of each nozzle, or a dot recording order, a recording timing, or the like. As the dot behavior on the recording medium is changed, concentration unevenness called "banding", such as occurrence of a change in a recording concentration at a repetitive cycle of each printing path or a noticeable boundary of each printing path is generated. In a case where the banding is generated, there is a problem in that a printing image quality is lowered.

With respect to such a problem, for example, JP2005-088467A and JP2009-160876A disclose methods for controlling usage rates of respective nozzles using a mask pattern in allocating a halftone processing result to respective scans and respective nozzles. The usage rate of the nozzle represents a frequency at which liquid droplets are jetted from a nozzle for recording a dot, and may be understood as a nozzle usage frequency or a jetting rate.

JP2010-162770A discloses a serial-type ink jet printer that performs halftone processing by a systematic dither method using a dither mask to control a usage rate of each nozzle of a recording head.

In the printer disclosed in JP2010-162770A, a threshold value of a dither mask is set so that nozzle usage rates of at least one of nozzle groups respectively disposed at both end parts of a nozzle row of a recording head are smaller than nozzle usage rates of a medium nozzle group disposed between the end nozzle groups of the both end parts, and thus, suppression of banding is achieved. JP2010-162770A discloses a method for generating a dither mask that sets a dot density of pixels recorded by the end nozzle groups of the both end parts in the nozzle row to be lower than a dot density of pixels recorded by the medium nozzle group, in order to suppress banding.

The "printing head" disclosed in JP2010-162770A is a term corresponding to a "recording head" in the present specification. Further, the "nozzle usage rate" in JP2010-162770A is a term corresponding to a "nozzle jetting rate" in the present specification. The "nozzle jetting rate" may be simply expressed as a "jetting rate". Further, the "medium nozzle group" in JP2010-162770A is a term corresponding to a "central nozzle" in the present specification.

Further, JP2016-043651A discloses a method for determining a jetting rate of each nozzle and a nozzle pattern indicating which nozzle in a nozzle row is used to record each pixel in an image to be recorded on a recording medium, reflecting, in a gradation value of each pixel of input image data, a nozzle jetting rate of a nozzle that records the pixel to convert the image data, and then performing halftone processing with respect to the converted image data.

SUMMARY OF THE INVENTION

As in the methods disclosed in JP2005-088467A and JP2009-160876A, a method for controlling the jetting rate of each nozzle using a mask pattern that allocates the halftone processing result to each scan and each nozzle results in decrease in printing speed, that is, decrease in productivity. A premise of the technique capable of controlling which scan and nozzle perform recording for each pixel using the mask pattern is that the pixel can be recorded by any scan and nozzle, and thus, extra scanning is necessary as such, which results in decrease in productivity.

On the other hand, as in the method disclosed in JP2010-162770A, in the case of a method for controlling recording by reflecting a jetting rate of each nozzle in a dither mask of halftone processing, or as in the method disclosed in JP2016-043651A, in the case of a method for controlling recording by reflecting a jetting rate of each nozzle in an input gradation value in halftone processing, the above-described problem of productivity decrease can be eliminated. In other words, in a case where the jetting rate of each nozzle is reflected in the halftone processing itself or the input gradation value in the halftone processing, a halftone processing result in which the jetting rate of each nozzle is reflected is obtained to control recording, one scan and one nozzle capable of performing recording for each pixel are determined in advance, and thus, no extra scanning is necessary, which does not cause the productivity decrease.

In the method disclosed in JP2010-162770A, the dither mask is generated in which the usage rates of the end nozzle group in the nozzle row are smaller than the usage rates of the central (medium) nozzle group. By performing halftone processing using the dither mask generated by the method described in JP2010-162770A, a dot pattern in which the usage rates are non-uniform between the end nozzle group and the central nozzle group in the nozzle row is generated.

As disclosed in JP2010-162770A, since the method for reflecting the jetting rate of each nozzle in the halftone processing result is a method for controlling, for each nozzle, the ratio of pixels to be actually recorded among recordable pixels that are predetermined for each scan and each nozzle, there is no problem of the productivity decrease.

In the method described in JP2016-043651A, similarly, since the jetting rate of each nozzle is reflected in the input gradation value in the halftone processing, and the halftone processing is performed with respect to the converted gradation value, the jetting rate of each nozzle is reflected in the halftone processing result. Accordingly, since the method disclosed in JP2016-043651A is a method for controlling, for each nozzle, the ratio of pixels to be actually recorded among recordable pixels that are predetermined for each scan and each nozzle, there is no problem of the productivity decrease.

On the other hand, in the case of the method for controlling recording by reflecting the jetting rate of each nozzle in the halftone processing result, in a case the jetting rate of each nozzle in the nozzle row is unevenly biased, the probability of dot-ON in each pixel is unevenly biased in accordance with the non-uniform jetting rate. Further, as a result of the uneven dot disposition of each color, the overlap probability of dots of respective colors is also biased, which results in color unevenness. Specific details of the problem of such color unevenness and consideration of the cause will be described later.

The invention has been made in consideration of the above-mentioned problems, and an object of the invention is to provide an image processing apparatus, an image processing method, a program, and an image recording apparatus capable of suppressing occurrence of banding and occurrence of color unevenness without decrease in productivity.

In order to solve the problems, the following aspects of the invention are provided.

According to a first aspect of the invention, there is provided an image processing apparatus that generates dot data indicating a disposition pattern of dots for each color for recording an image on a recording medium, while relatively moving a recording head having a nozzle row in which a plurality of nozzles that jet, for each of a plurality of colors of ink, each ink are arranged in a sub scan direction, in a main scan direction perpendicular to the sub scan direction and the sub scan direction with respect to the recording medium, comprising: a gradation value converting section that performs a process of reflecting a first nozzle jetting rate in which a nozzle jetting rate of an end part nozzle that is located at each of both end parts of the nozzle row is suppressed to be smaller than a nozzle jetting rate of a central nozzle located at a central part of the nozzle row in a range of at least a part of a recording duty, in a gradation value of each pixel in image data of a first color among the plurality of colors, to convert the gradation value of each pixel in the image data of the first color, and a process of reflecting a second nozzle jetting rate having a smaller difference between the nozzle jetting rate of the end part nozzle and the nozzle jetting rate of the central nozzle compared with the first nozzle jetting rate in the range of at least the part of the recording duty, in a gradation value of each pixel in image data of a second color different from the first color among the plurality of colors, to convert the gradation value of each pixel in the image data of the second color; and a halftone processing section that performs halftone processing with respect to the image data of the first color and the image data of the second color that are converted by the gradation value converting section to generate the dot data of the first color and the second color.

In the image processing apparatus according to the first aspect of the invention, the nozzle jetting rate of each nozzle that records each pixel is reflected in the gradation value of each pixel in image data of a plurality of colors to perform conversion of the gradation value of each pixel, and the halftone processing is performed with respect to the gradation value after conversion of each converted pixel to generate dot data. According to the first aspect of the invention, the conversion of the gradation value of each pixel of the image data of the first color and the second color is performed with respect to image data of each of the first color and the second color that are two different colors among the plurality of colors, using different types of nozzle jetting rates (the first nozzle jetting rate and the second nozzle jetting rate). By performing the gradation value converting process of reflecting the first nozzle jetting rate in the gradation value of each pixel in the image data of the first color and performing the halftone processing with respect to the converted gradation value, it is possible to obtain dot data indicating a dot disposition for realizing the first nozzle jetting rate. Further, by performing the gradation value converting process of reflecting the second nozzle jetting rate in the gradation value of each pixel in the image data of the second color and performing the halftone processing with respect to the converted gradation value, it is possible to obtain dot data indicating a dot disposition for realizing the second nozzle jetting rate. A jetting operation of each nozzle is controlled on the basis of the dot data that is the halftone processing result.

According to the first aspect of the invention, it is possible to obtain a dot disposition of a different nozzle jetting rate for each color with respect to the first color and the second color. Thus, it is possible to realize a combination of dot dispositions capable of suppressing occurrence of color unevenness of a mixed color obtained by combining two or more colors. Obtaining the mixed color by combining two or more colors may be expressed as "overlap" of colors or "superimposition" of colors.

In obtaining the mixed color, a method for recording respective dots of two or more colors at the same position may be used, or a method for juxtaposing respective dots of two or more colors in a predetermined neighboring area to use a color mixing phenomenon by visual mixing may be used.

Further, according to the first aspect of the invention, since a nozzle that performs recording at each position on a recording medium and a scan order are specified in advance and the ratio of pixels to be actually recorded is controlled for each nozzle on the basis of the halftone processing result, there is no problem of productivity decrease. In addition, by setting a nozzle jetting rate of an end part nozzle in a nozzle row, with respect to at least one color, to a non-uniform nozzle jetting rate (first nozzle jetting rate) that is suppressed to be lower than a nozzle jetting rate of a central nozzle, it is possible to effectively suppress banding for the at least one color.

Here, the term "color" includes chromatic and achromatic colors.

Preferably, the "range of at least the part of the recording duty" includes a halftone range.

The "second nozzle jetting rate having the smaller difference between the nozzle jetting rate of the end part nozzle and the nozzle jetting rate of the central nozzle than that in the first nozzle jetting rate" means that the nozzle jetting rates of the respective nozzles are closer to be uniform, compared with the first nozzle jetting rate. The "difference" between the nozzle jetting rates means a difference of values of the nozzle jetting rates to be compared, that is, the size (absolute value) of the difference therebetween.

The second nozzle jetting rate may be a uniform nozzle jetting rate in which the nozzle jetting rates of the respective nozzles are uniform, or may be a non-uniform nozzle jetting rate in which the nozzle jetting rate of the end part nozzle is suppressed to be lower than the nozzle jetting rate of the central nozzle located at the central part of the nozzle row.

According to a second aspect of the invention, in the image processing apparatus according to the first aspect of the invention, the nozzle jetting rate of an end nozzle located at an end of the nozzle row at the first nozzle jetting rate is lower than the nozzle jetting rate of an end nozzle located at an end of the nozzle row at the second nozzle jetting rate.

As the nozzle jetting rate of the end nozzle is suppressed to be lower, it is possible to effectively suppress banding. It is preferable to obtain a dot disposition that provides the first nozzle jetting rate with respect to a banding-noticeable color such as an achromatic color such as black or a relatively dark color.

According to a third aspect of the invention, in the image processing apparatus according to the first or second aspect of the invention, the first color has a higher banding visibility than that of the second color.

According to a fourth aspect of the invention, in the image processing apparatus according to the first or second aspect of the invention, the first color has a lower visibility of color unevenness in a case where the first color overlaps a different color than that of the second color.

According to a fifth aspect of the invention, in the image processing apparatus according to the first or second aspect of the invention, a first color has a higher density compared with a second color.

According to a sixth aspect of the invention, in the image processing apparatus according to the first or second aspect of the invention, the first color has a lower saturation than that of the second color.

According to a seventh aspect of the invention, in the image processing apparatus according to any of the first to sixth aspects of the invention, the nozzle jetting rate of each nozzle of the nozzle row at the second nozzle jetting rate is constant.

The second nozzle jetting rate may be a uniform nozzle jetting rate, and a third nozzle jetting rate, a fourth nozzle jetting rate, or the like different from the second nozzle jetting rate may be a uniform nozzle jetting rate.

According to an eighth aspect of the invention, in the image processing apparatus according to any one of the first to seventh aspects of the invention, the plurality of colors include four colors of cyan, magenta, yellow, and black, the first color is black, and the second color is at least one color among cyan, magenta, and yellow.

The plurality of colors may include other colors, in addition to 4 colors of cyan, magenta, yellow, and black.

According to a ninth aspect of the invention, in the image processing apparatus according to any one of the first to seventh aspects of the invention, the plurality of colors include three colors of cyan, magenta, and yellow, the first color is at least one color among cyan and magenta, and the second color is yellow.

The plurality of colors may include other colors, in addition to 3 colors of cyan, magenta, and yellow.

According to a tenth aspect of the invention, in the image processing apparatus according to any one of the first to seventh aspects of the invention, the plurality of colors include two colors of cyan and magenta, the first color is one color among cyan and magenta, and the second color is the other color among cyan and magenta.

The plurality of colors may include a different color, in addition to two colors of magenta and cyan. When focusing on cyan and magenta included in the plurality of colors, different nozzle jetting rates may be respectively applied to cyan and magenta.

According to an eleventh aspect of the invention, in the image processing apparatus according to any one of the first to seventh aspects of the invention, the plurality of colors include four colors of cyan, magenta, yellow, and black, and a nozzle jetting rate of each nozzle that jets black ink as the first color is set so that the nozzle jetting rate of an end nozzle that is located at an end of the nozzle row is the lowest, compared with a nozzle jetting rate of each nozzle that jets ink of the other colors.

According to the eleventh aspect of the invention, it is possible to effectively suppress banding by setting the nozzle jetting rate of the end nozzle to the lowest for black for which banding is particularly noticeable.

According to a twelfth aspect of the invention, in the image processing apparatus according to any one of the first to seventh aspects of the invention, the plurality of colors include four colors of cyan, magenta, yellow, and black, and a nozzle jetting rate of each nozzle that jets black ink as the first color is set so that a difference between the nozzle jetting rate of the end part nozzle and the nozzle jetting rate of the central nozzle is the largest, compared with a nozzle jetting rate of each nozzle that jets ink of the other colors.

According to a thirteenth aspect of the invention, in the image processing apparatus according to any one of the first to seventh aspects of the invention, the plurality of colors include four colors of cyan, magenta, yellow, and black, and a nozzle jetting rate of each nozzle that jets at least one ink among cyan and magenta has a higher nozzle jetting rate of the end nozzle that is located at the end of the nozzle row, compared with a nozzle jetting rate of each nozzle that jets black ink as the first color.

According to a fourteenth aspect of the invention, in the image processing apparatus according to any one of the first to seventh aspects of the invention, the plurality of colors include four colors of cyan, magenta, yellow, and black, and a nozzle jetting rate of each nozzle that jets ink of at least one color among cyan and magenta is set so that a difference between the nozzle jetting rate of the end part nozzle and the nozzle jetting rate of the central nozzle is smaller, compared with a nozzle jetting rate of each nozzle that jets black ink as the first color.

According to a fifteenth aspect of the invention, in the image processing apparatus according to the thirteenth or fourteenth aspect of the invention, a nozzle jetting rate of each nozzle that jets cyan ink and a nozzle jetting rate of each nozzle that jets magenta ink are different from each other.

According to a sixteenth aspect of the invention, in the image processing apparatus according to any one of the first to seventh aspects of the invention, the plurality of colors include yellow, and a nozzle jetting rate of each nozzle that jets yellow ink that is the second color is set so that the nozzle jetting rate of the end nozzle that is located at the end of the nozzle row is the largest, compared with a nozzle jetting rate of each nozzle that jets ink of the other colors.

According to a seventeenth aspect of the invention, in the image processing apparatus according to any one of the first to seventh aspects of the invention, the plurality of colors include yellow, and a nozzle jetting rate of each nozzle that jets yellow ink that is the second color is set so that a difference between the nozzle jetting rate of the end part nozzle and the nozzle jetting rate of the central nozzle is the smallest, compared with a nozzle jetting rate of each nozzle that jets ink of the other colors.

According to an eighteenth aspect of the invention, in the image processing apparatus according to any one of the first to seventh aspects of the invention, the plurality of colors include yellow, and a nozzle jetting rate of each nozzle that jets yellow ink as the second color is constant.

According to a nineteenth aspect of the invention, the image processing apparatus according to any one of the first to eighteenth aspects of the invention further comprises: a nozzle jetting rate storing section that stores plural kinds of nozzle jetting rates including the first nozzle jetting rate and the second nozzle jetting rate; and a nozzle jetting rate selecting section that selects a nozzle jetting rate to be used for the gradation value converting process in the gradation value converting section from the plural kinds of nozzle jetting rates, in accordance with a color type of image data that is a target of the halftone processing.

According to a twentieth aspect of the invention, the image processing apparatus according to any one of the first to eighteenth aspects of the invention: wherein the gradation value converting section includes a first gradation value converting section that performs a process of reflecting the first nozzle jetting rate in the gradation value of each pixel in the image data of the first color to convert the gradation value of each pixel in the image data of the first color, and a second gradation value converting section that performs a process of reflecting the second nozzle jetting rate in the gradation value of each pixel in the image data of the second color to convert the gradation value of each pixel in the image data of second color.

According to a twenty first aspect of the invention, the image processing apparatus according to any one of the first to twentieth aspects of the invention further comprises: a nozzle pattern determining section that determines a nozzle pattern indicating which one of the plurality of nozzles records each pixel of image data to be recorded on the recording medium using the recording head, in which the gradation value converting section reflects the nozzle jetting rate of the nozzle that records each pixel in the gradation value of each pixel in the image data of the respective colors of the first color and the second color, on the basis of the nozzle pattern determined by the nozzle pattern determining section, to convert the gradation value of each pixel.

According to a twenty second aspect of the invention, there is provided an image processing method for generating dot data indicating a disposition pattern of dots for each color for recording an image on a recording medium, while relatively moving a recording head having a nozzle row in which a plurality of nozzles that jet, for each of a plurality of colors of ink, each ink are arranged in a sub scan direction, in a main scan direction perpendicular to the sub scan direction and the sub scan direction with respect to the recording medium, comprising: a gradation value converting process of performing a process of reflecting a first nozzle jetting rate in which a nozzle jetting rate of an end part nozzle that is located at each of both end parts of the nozzle row is suppressed to be smaller than a nozzle jetting rate of a central nozzle located at a central part of the nozzle row in a range of at least a part of a recording duty, in a gradation value of each pixel in image data of a first color among the plurality of colors, to convert the gradation value of each pixel in the image data of the first color, and a process of reflecting a second nozzle jetting rate having a smaller difference between the nozzle jetting rate of the end part nozzle and the nozzle jetting rate of the central nozzle compared with the first nozzle jetting rate in the range of at least the part of the recording duty, in a gradation value of each pixel in image data of a second color different from the first color among the plurality of colors, to convert the gradation value of each pixel in the image data of the second color; and a halftone processing process of performing halftone processing with respect to the image data of the first color and the image data of the second color that are converted in the gradation value converting process to generate the dot data of the first color and the second color.

With respect to the image recording method according to the twenty second aspect of the invention, the same matters as specific matters of the image processing apparatus specified in the second to twenty first aspects of the invention may be appropriately combined. In this case, elements of a processing unit and a functional unit that are means for performing processes and operations specified in the invention of the image processing apparatus may be understood as elements of steps of corresponding processes and operations.

According to a twenty third aspect of the invention, there is provided a program that causes a computer to execute a function of generating dot data indicating a disposition pattern of dots for each color for recording an image on a recording medium, while relatively moving a recording head having a nozzle row in which a plurality of nozzles that jet, for each of a plurality of colors of ink, each ink are arranged in a sub scan direction, in a main scan direction perpendicular to the sub scan direction and the sub scan direction with respect to the recording medium, the program causing the computer to execute: a gradation value converting function of performing a process of reflecting a first nozzle jetting rate in which a nozzle jetting rate of an end part nozzle that is located at each of both end parts of the nozzle row is suppressed to be smaller than a nozzle jetting rate of a central nozzle located at a central part of the nozzle row in a range of at least a part of a recording duty, in a gradation value of each pixel in image data of a first color among the plurality of colors, to convert the gradation value of each pixel in the image data of the first color, and a process of reflecting a second nozzle jetting rate having a smaller difference between the nozzle jetting rate of the end part nozzle and the nozzle jetting rate of the central nozzle compared with the first nozzle jetting rate in the range of at least the part of the recording duty, in a gradation value of each pixel in image data of a second color different from the first color among the plurality of colors, to convert the gradation value of each pixel in the image data of the second color; and a halftone processing function of performing halftone processing with respect to the image data of the first color and the image data of the second color that are converted by the gradation value converting function to generate the dot data of the first color and the second color.

With respect to the program according to the twenty third aspect of the invention, the same matters as the specific matters of the image processing apparatus specified in the second to twenty first aspects may be appropriately combined. In this case, elements of the processing unit or the functional unit that is means responsible for the processes and operations specified in the invention of the image processing apparatus may be considered as elements of a program that realizes functions of corresponding processes and operations.

According to a twenty fourth aspect of the invention, there is provided an image recording apparatus comprising: a recording head having a nozzle row in which a plurality of nozzles that jet, for each of a plurality of colors of ink, each ink are arranged in a sub scan direction; a gradation value converting section that performs a process of reflecting a first nozzle jetting rate in which a nozzle jetting rate of an end part nozzle that is located at each of both end parts of the nozzle row is suppressed to be smaller than a nozzle jetting rate of a central nozzle located at a central part of the nozzle row in a range of at least a part of a recording duty, in a gradation value of each pixel in image data of a first color among the plurality of colors, to convert the gradation value of each pixel in the image data of the first color, and a process of reflecting a second nozzle jetting rate having a smaller difference between the nozzle jetting rate of the end part nozzle and the nozzle jetting rate of the central nozzle compared with the first nozzle jetting rate in the range of at least the part of the recording duty, in a gradation value of each pixel in image data of a second color different from the first color among the plurality of colors, to convert the gradation value of each pixel in the image data of the second color; and a halftone processing section that performs halftone processing with respect to the image data of the first color and the image data of the second color that are converted by the gradation value converting section to generate dot data indicating dot disposition patterns of the first color and the second color; and a recording control section that controls the jetting of the ink from the nozzles on the basis of the dot data obtained through the halftone processing and performs a control for recording an image on a recording medium by repeating a main scan operation of jetting the ink from the nozzles while relatively moving the recording head with respect to the recording medium in a main scan direction that is perpendicular to the sub scan direction to perform recording and a sub scan operation of relatively moving the recording medium with respect to the recording head in the sub scan direction.

With respect to the image recording apparatus according to the twenty fourth aspect of the invention, the same matters as the specific matters of the image processing apparatus specified in the second to twenty first aspects may be appropriately combined.

According to the invention, in a configuration in which an image is recorded on a recording medium by repeating a main scan operation and a sub scan operation, it is possible to suppress occurrence of banding (density unevenness) and occurrence of color unevenness, without productivity decrease.

A left diagram of FIG. 12 is a diagram illustrating a relationship between scans for recording each raster and nozzles, and a right diagram of FIG. 12 is a chart showing a part of a nozzle pattern.

Figure 8:
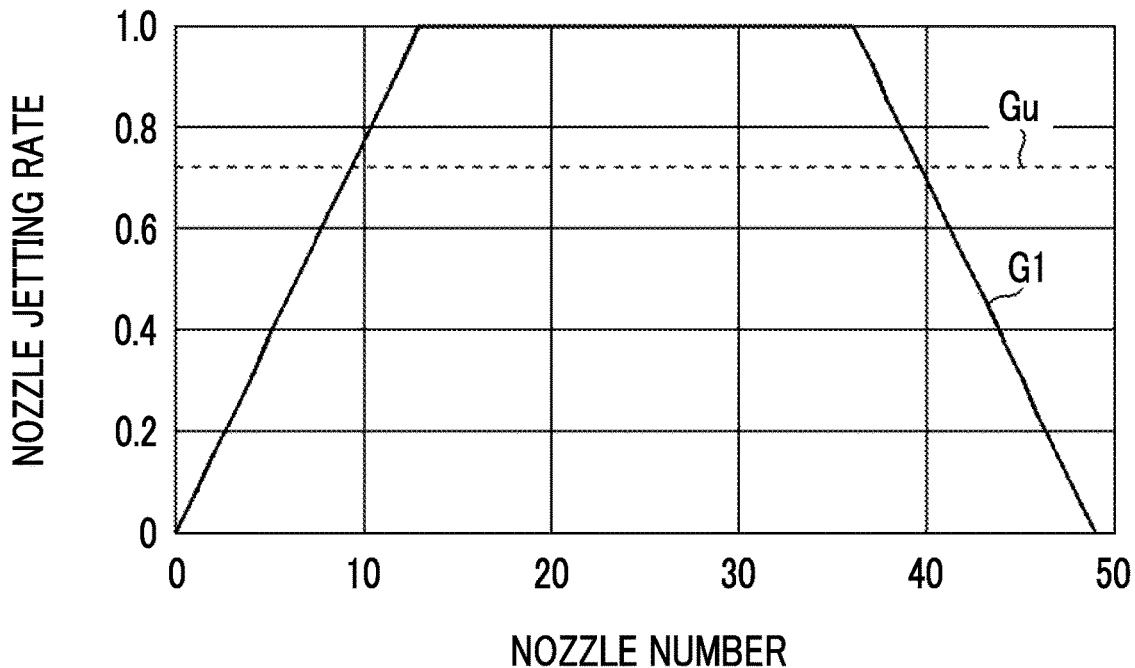
FIG. 8 is a diagram showing an example of data of a nozzle jetting rate determined for each nozzle.

FIG. 13 is a chart showing a jetting rate pattern obtained by expanding a nozzle jetting rate shown in graph G1 shown in FIG. 8 in accordance with the nozzle pattern shown in the right diagram of FIG. 12.

FIG. 14 is a chart showing an overlap probability pattern in which two colors having the jetting rate pattern shown in FIG. 13 are superimposed.

FIG. 15 is a chart showing an example of a jetting rate pattern in the case of a uniform nozzle jetting rate shown in graph Gu shown in FIG. 8.

FIG. 16 is a chart showing an overlap probability pattern in the case of the uniform nozzle jetting rate shown in FIG. 15.

FIG. 17 is a chart showing an overlap probability pattern in a case where a dot disposition of color B is shifted by one pixel in the main scan direction with respect to disposition of dots of color A.

FIG. 18 is a chart showing an overlap probability pattern in a case where disposition of dots of color B is shifted by one pixel in the sub scan direction with respect to disposition of dots of color A.

Figure 19:
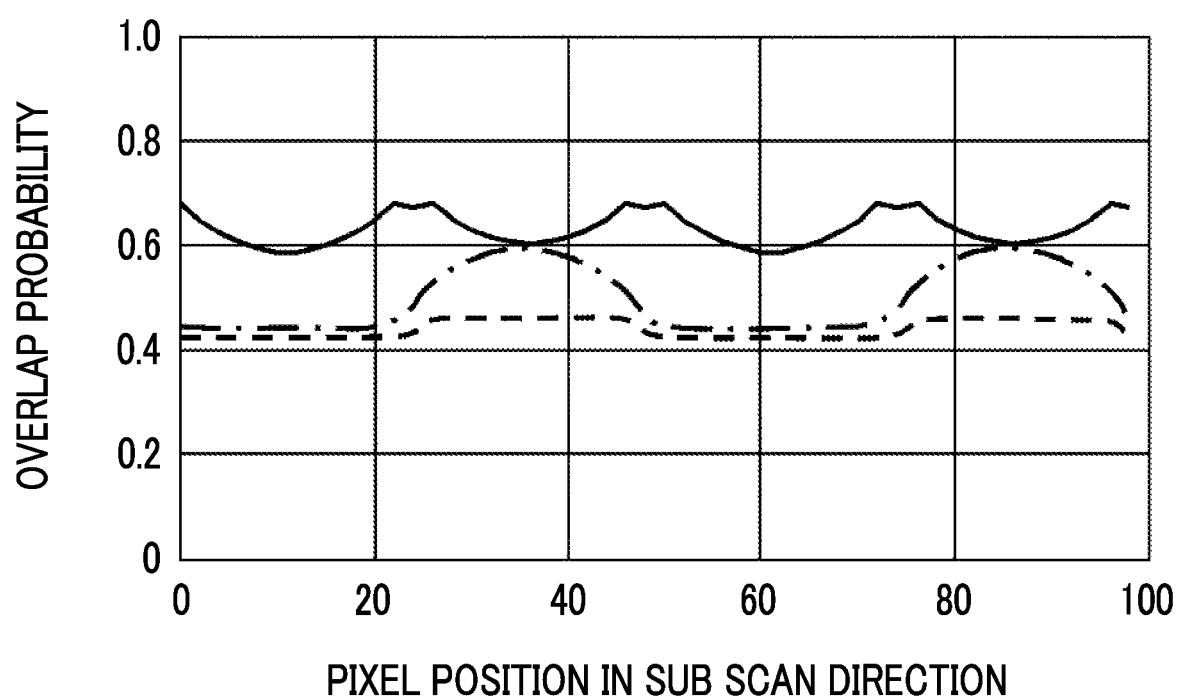

FIG. 19 is a graph showing an average overlap probability per unit area at each position in the sub scan direction in the case of a non-uniform nozzle jetting rate.

Figure 20:
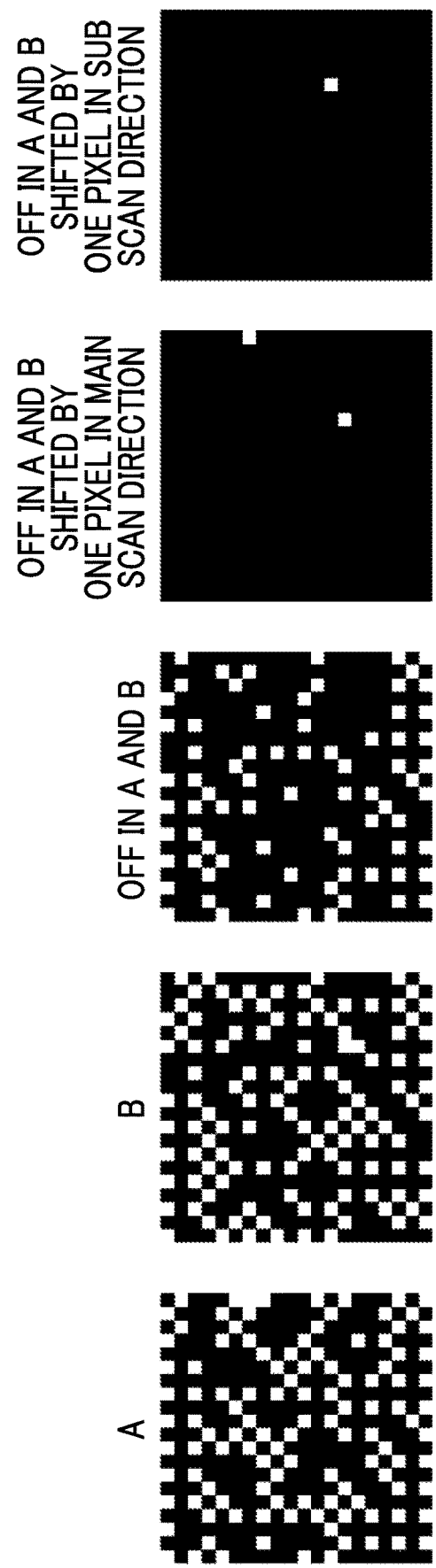

FIG. 20 is a diagram showing a specific example of dot dispositions of color A and color B in the case of the non-uniform nozzle jetting rate shown in the graph G1 shown in FIG. 8.

Figure 21:
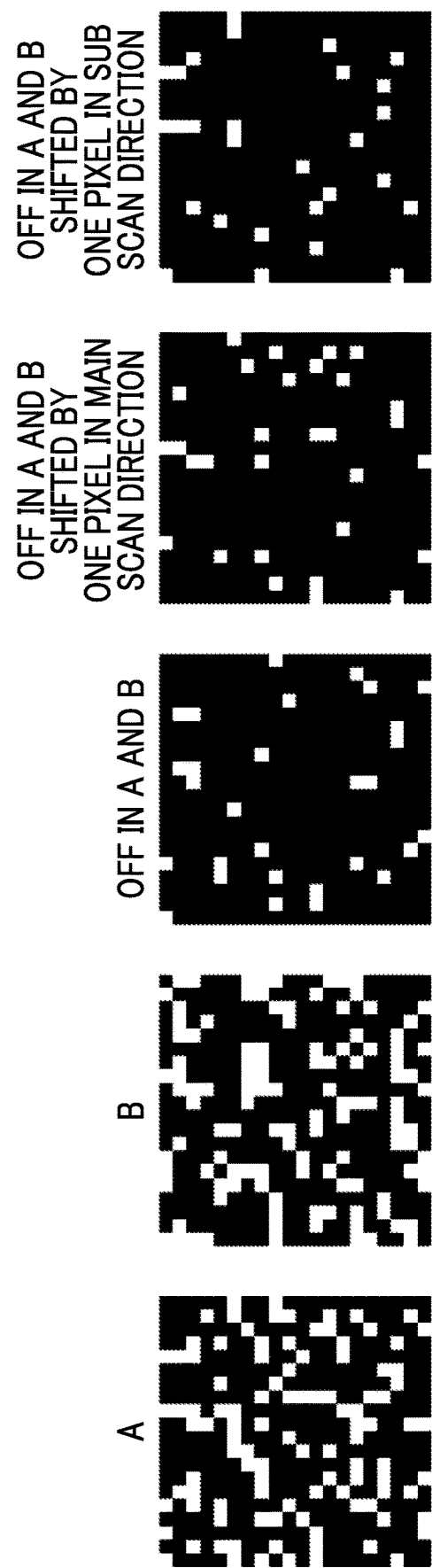

FIG. 21 is a diagram showing a specific example of dot dispositions of color A and color B in the case of the uniform nozzle jetting rate shown in the graph Gu shown in FIG. 8.

FIG. 22 is a graph showing an example of a nozzle jetting rate applied to an embodiment of the invention.

FIG. 23 is a chart showing a jetting rate pattern obtained by developing the nozzle jetting rate shown in graph G2 of FIG. 22 in accordance with the nozzle pattern shown in FIG. 12.

FIG. 24 is a chart showing an example of an overlap probability pattern of two colors of cyan and magenta.

FIG. 25 is a chart showing an example of an overlap probability pattern in a case where dot dispositions of two colors of cyan and magenta are shifted by one pixel in the main scan direction.

Figures 26, 27:
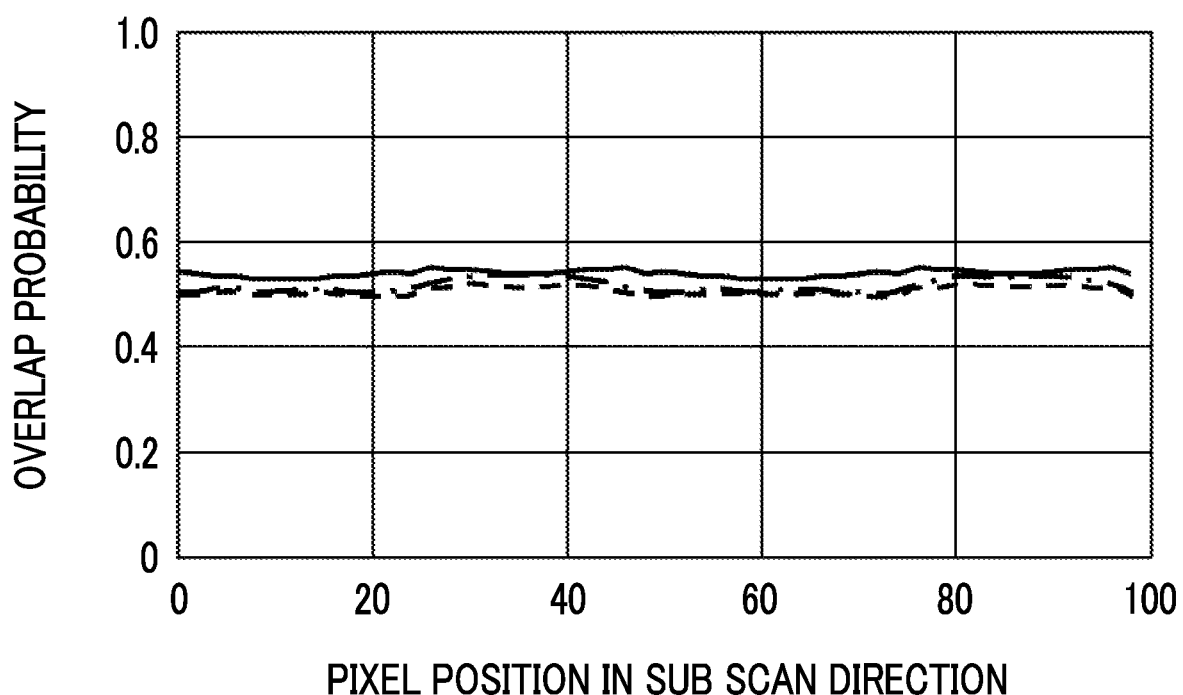

FIG. 26 is a chart showing an example of an overlap probability pattern in a case where dot dispositions of two colors of cyan and magenta are shifted by one pixel in the sub scan direction.

FIG. 27 is a graph showing an average overlap probability per unit area at each position in the sub scan direction in a case where the nozzle jetting rate shown in the graph G2 of FIG. 22 is employed.

FIG. 28 is a chart showing an example of an overlap probability pattern in a case where a nozzle jetting rate of one color among two colors is the nozzle jetting rate shown in the graph G1 of FIG. 22 and a nozzle jetting rate of the other color is the nozzle jetting rate shown in the graph G2 of FIG. 22.

FIG. 29 is a chart showing an example of an overlap probability pattern in a case where dot dispositions of two colors are shifted by one pixel in the main scan direction.

Figures 30, 31:
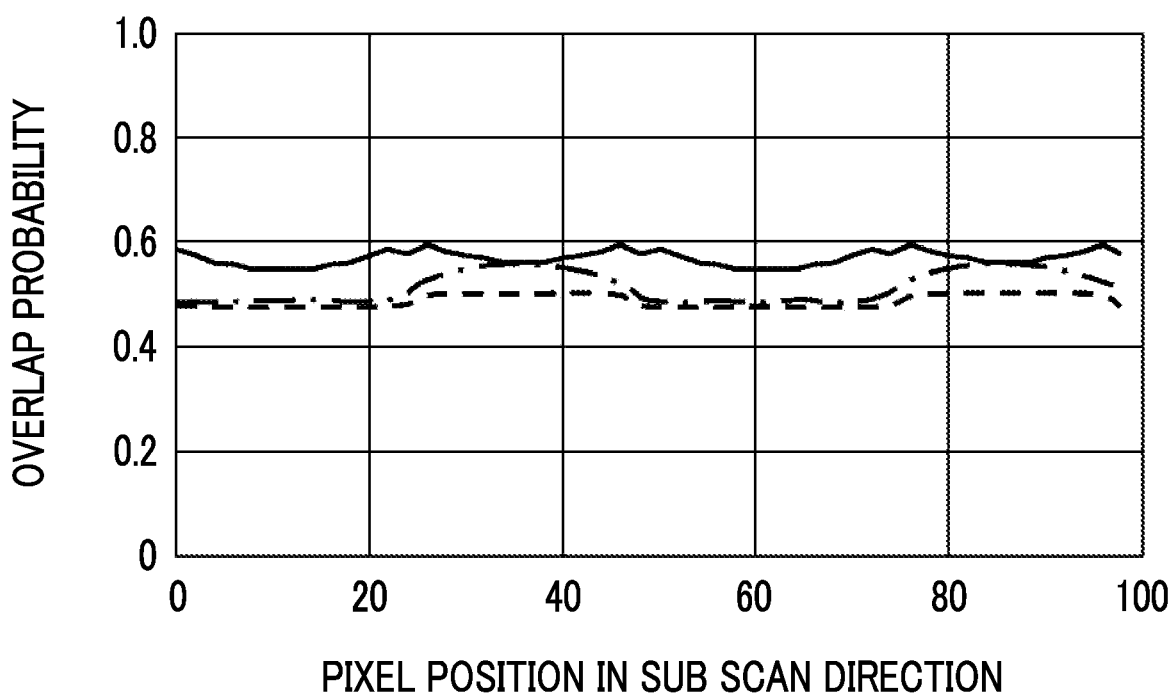

FIG. 30 is a chart showing an example of an overlap probability pattern in a case where dot dispositions of two colors are shifted by one pixel in the sub scan direction.

FIG. 31 is a graph showing an average overlap probability per unit area at each position in the sub scan direction.

Figure 32:
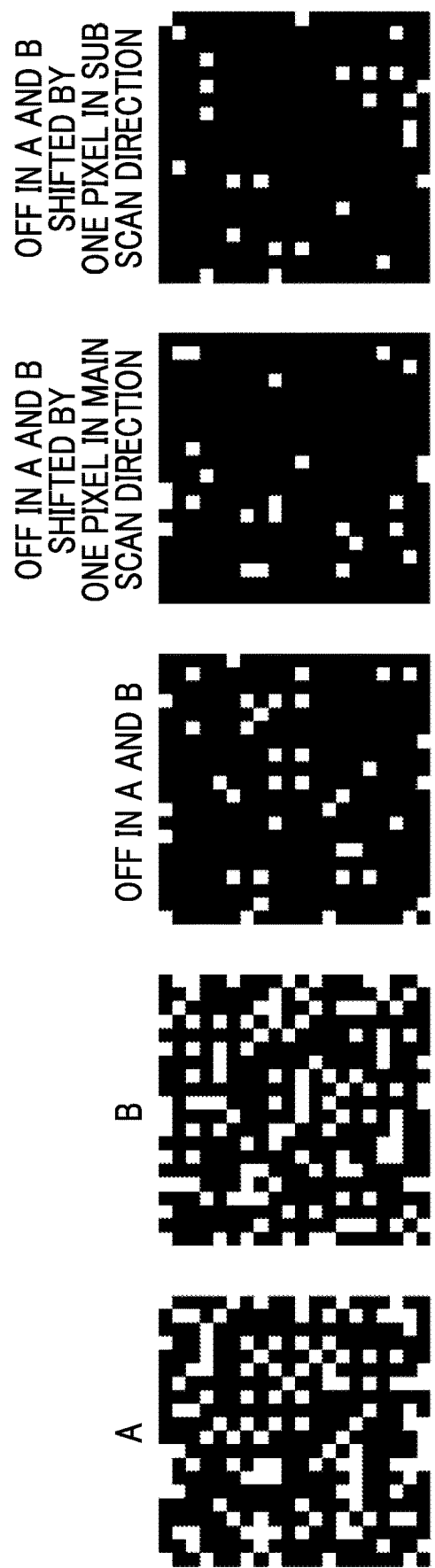

FIG. 32 is a diagram showing an example of dot dispositions in a case where both nozzle jetting rates of two colors match the nozzle jetting rate shown in the graph G2 of FIG. 22.

Figure 33:
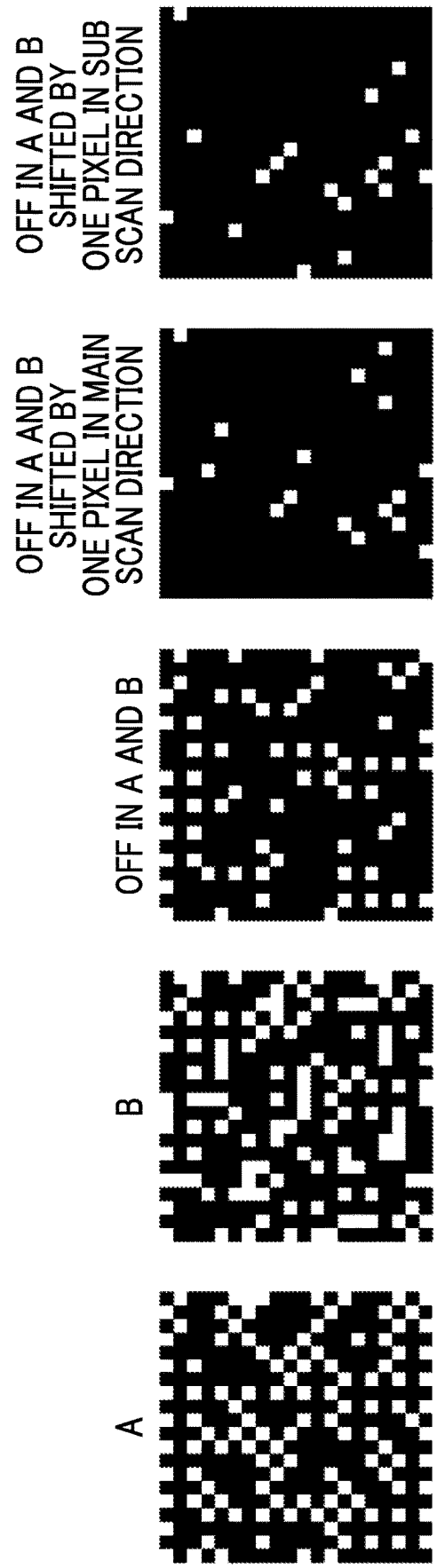

FIG. 33 is a diagram showing an example of dot disposition in a case where a nozzle jetting rate of one color among two colors is the nozzle jetting rate shown in the graph G1 of FIG. 22 and a nozzle jetting rate of the other color is the nozzle jetting rate shown in the graph G2 of FIG. 22.

Figure 34:
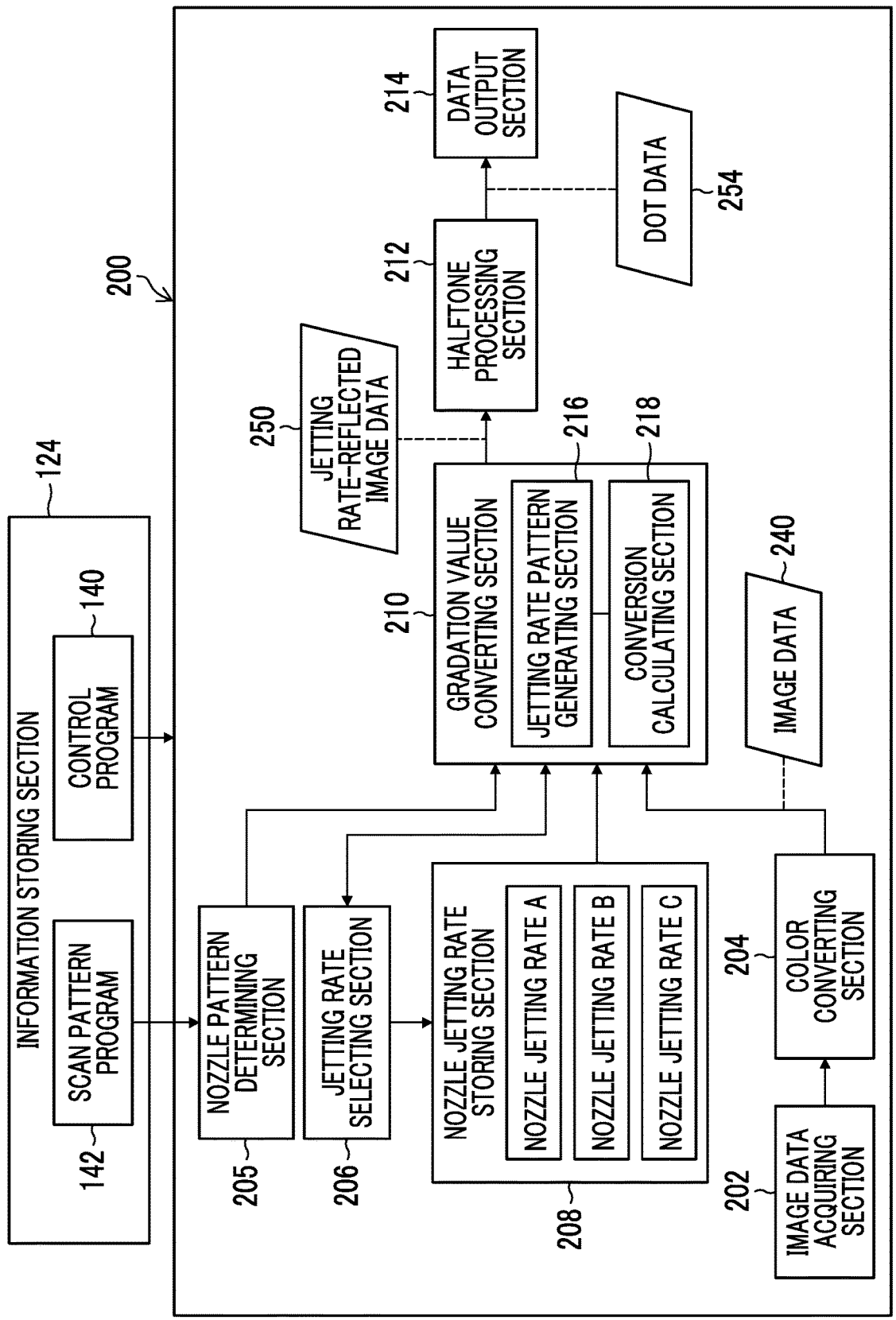

FIG. 34 is a block diagram showing functions of an image processing apparatus according to an embodiment of the invention.

Figure 35:
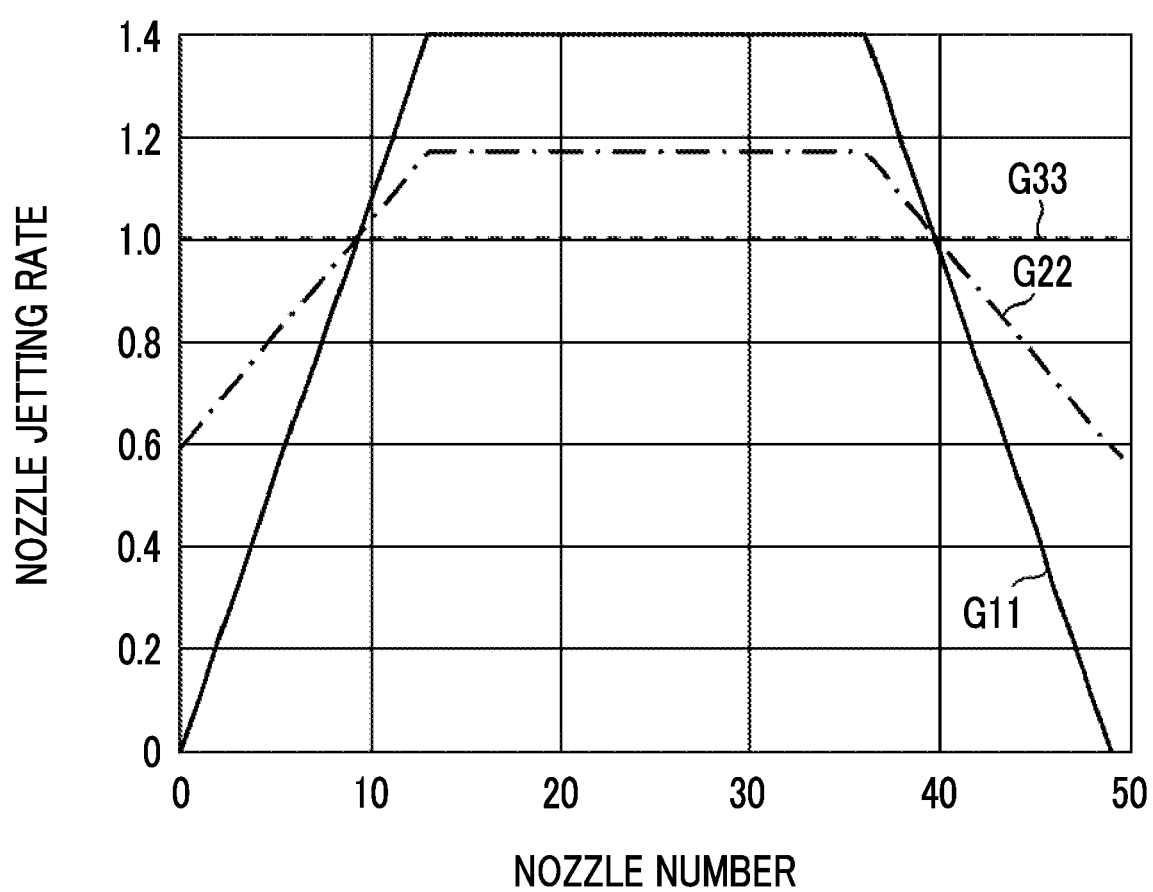

FIG. 35 is a diagram for illustrating a jetting rate-reflected image data generating process.

Figure 36:
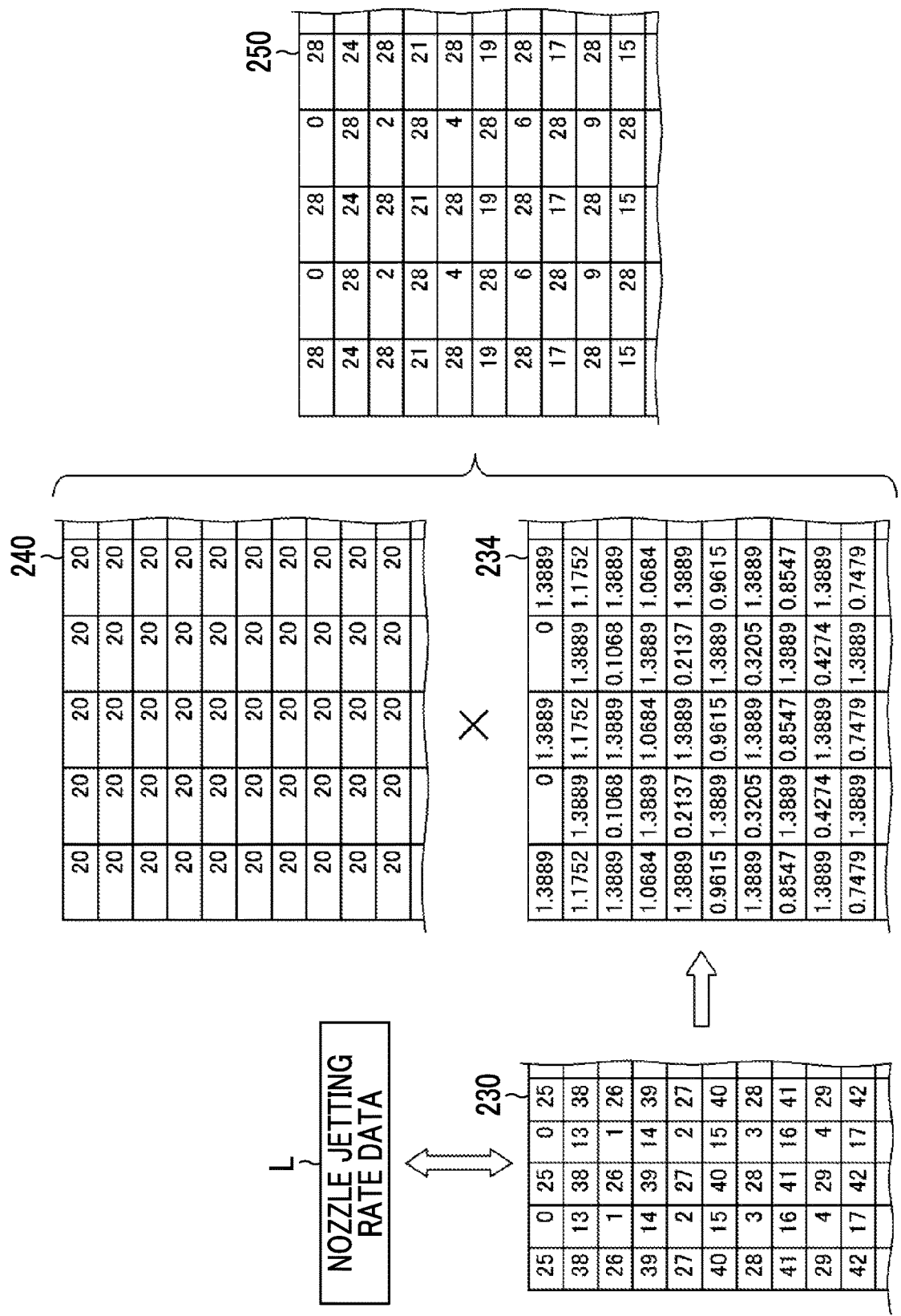

FIG. 36 is a graph showing an example of a nozzle jetting rate used for conversion of a gradation value, instead of FIG. 22.

Figure 37:
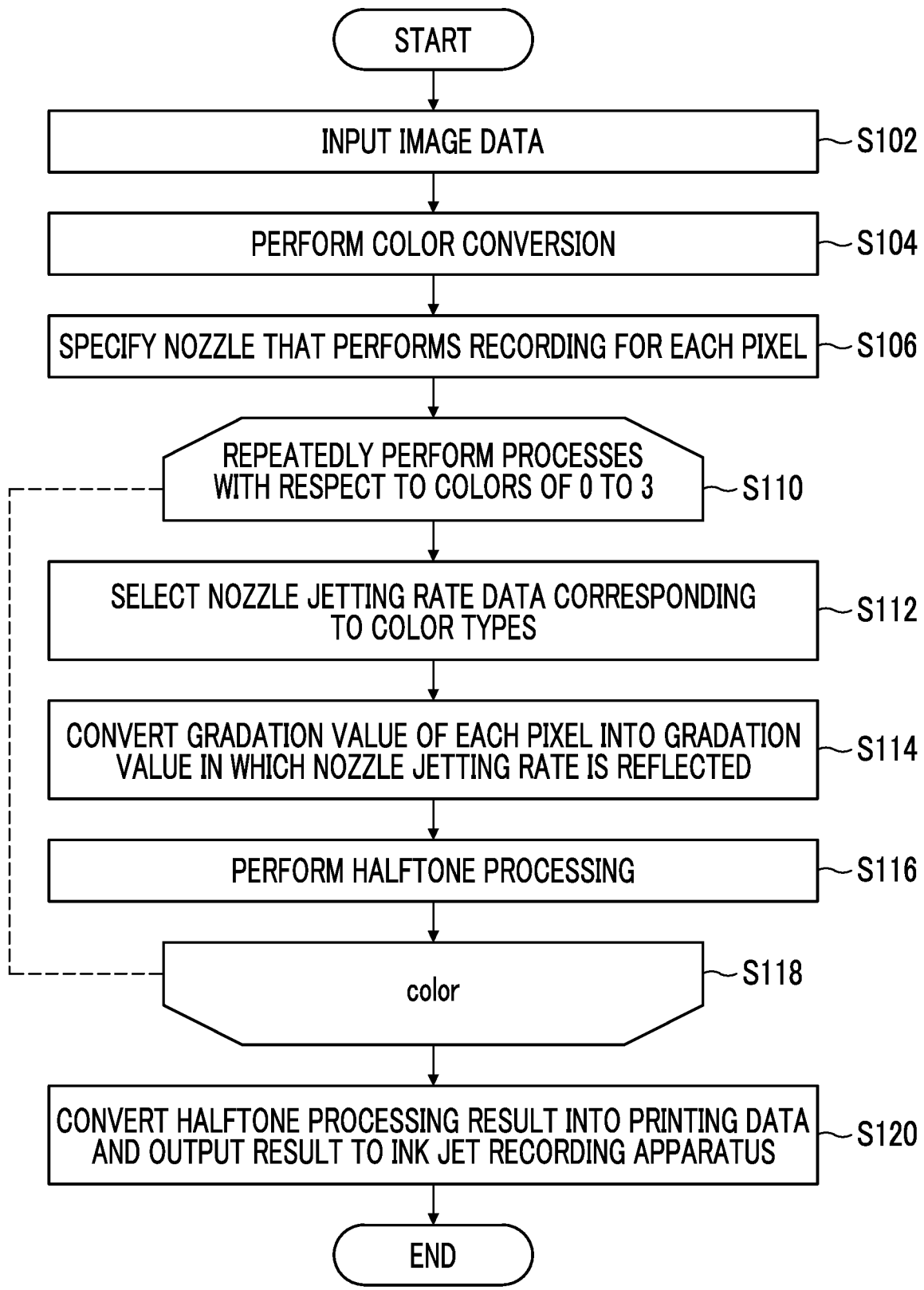

FIG. 37 is a flowchart showing a processing flow of the image processing apparatus.

Figure 38:
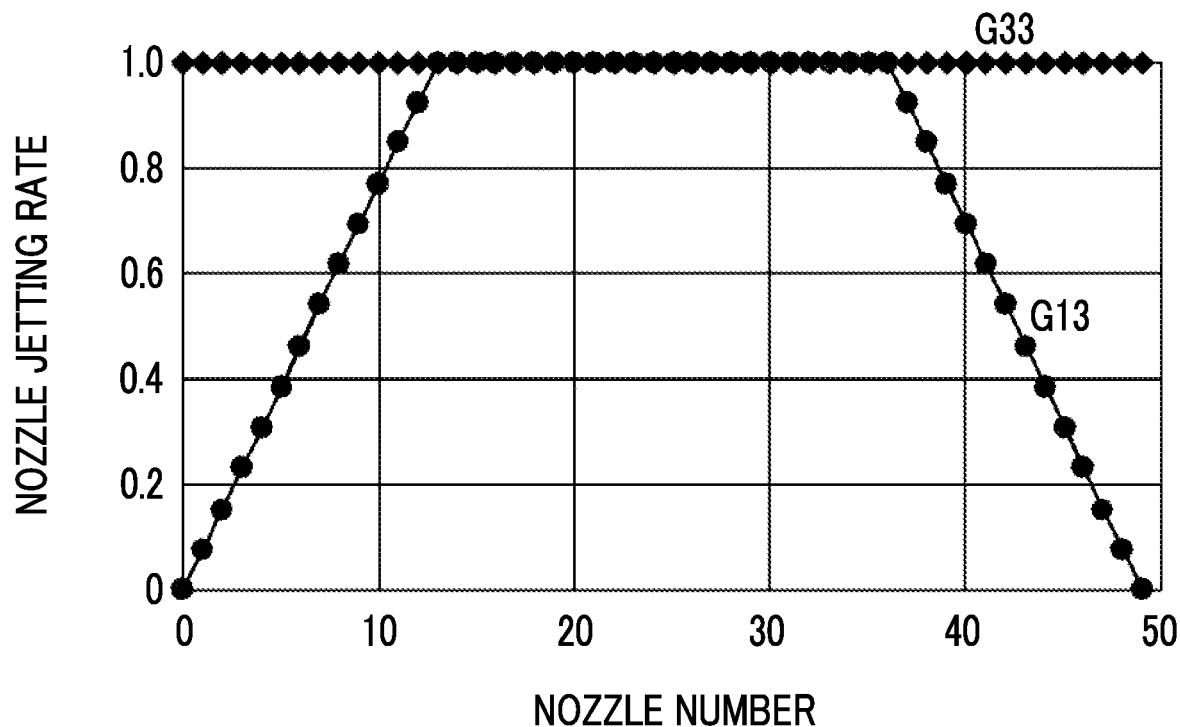

FIG. 38 is a graph showing an example of a nozzle jetting rate used for conversion of a gradation value.

Figure 39:
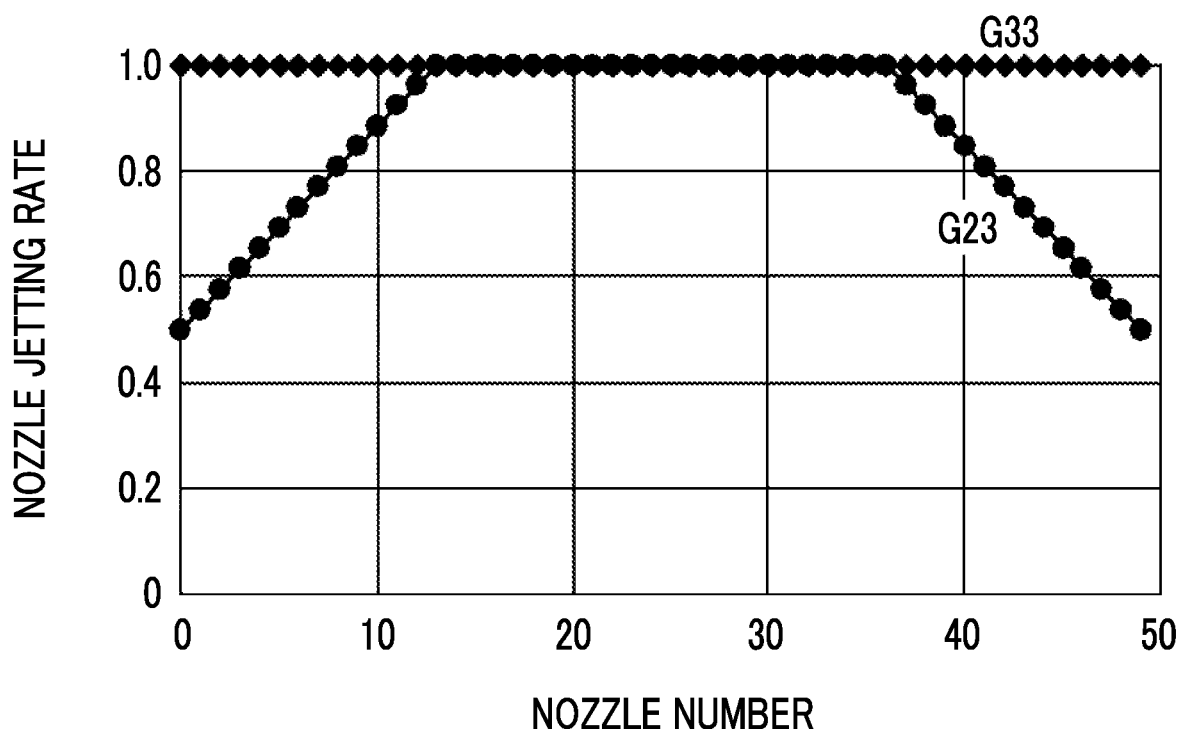

FIG. 39 is a graph showing an example of a nozzle jetting rate used for conversion of a gradation value.

Figure 40:
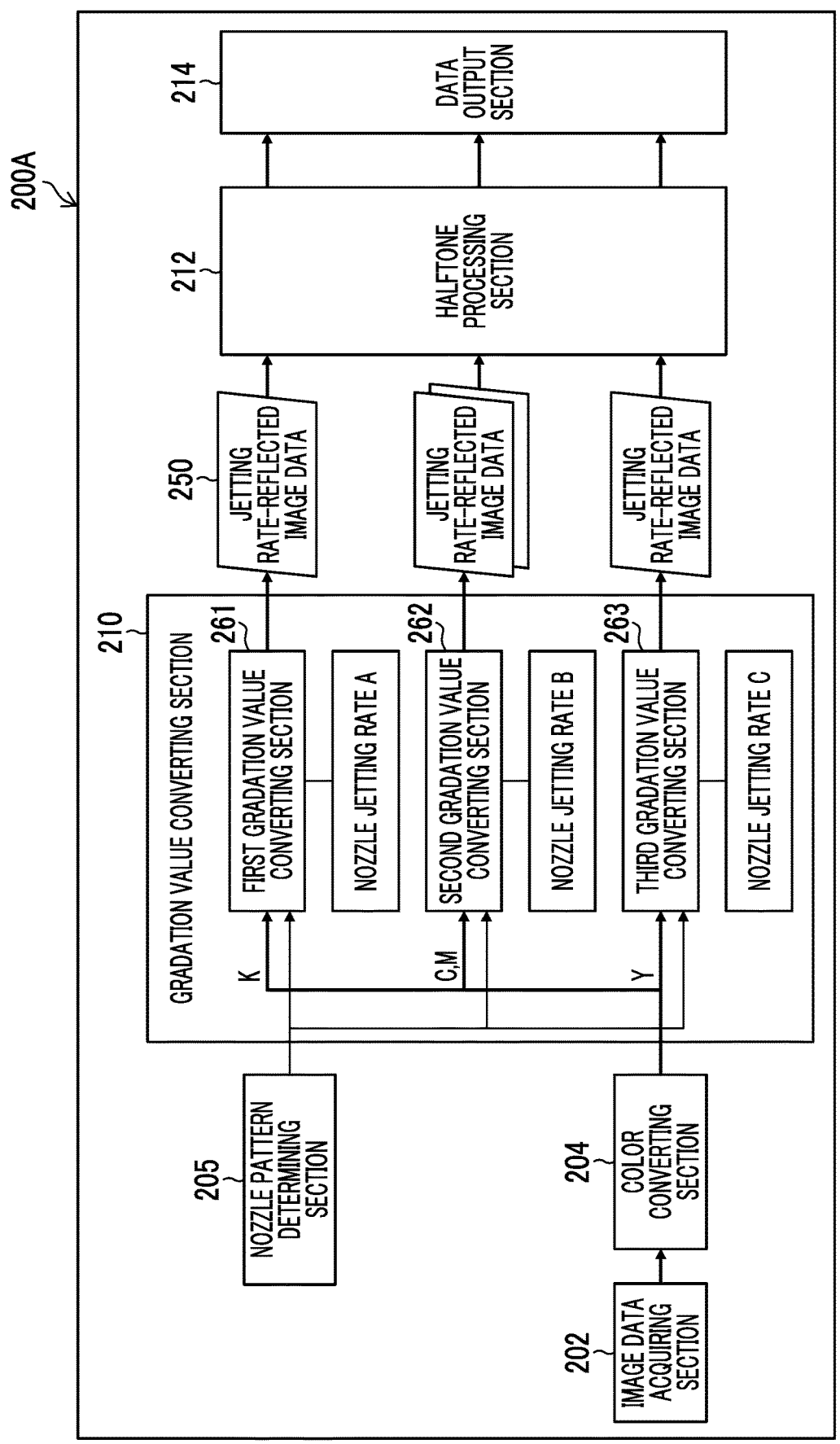

FIG. 40 is a block diagram showing another configuration example of the image processing apparatus.

DESCRIPTION OF THE PREFERRED EMBODIMENTS

Hereinafter, preferred embodiments of the invention will be described with reference to the accompanying drawings.

«Configuration Example of Ink Jet Recording Apparatus»

Figure 1:
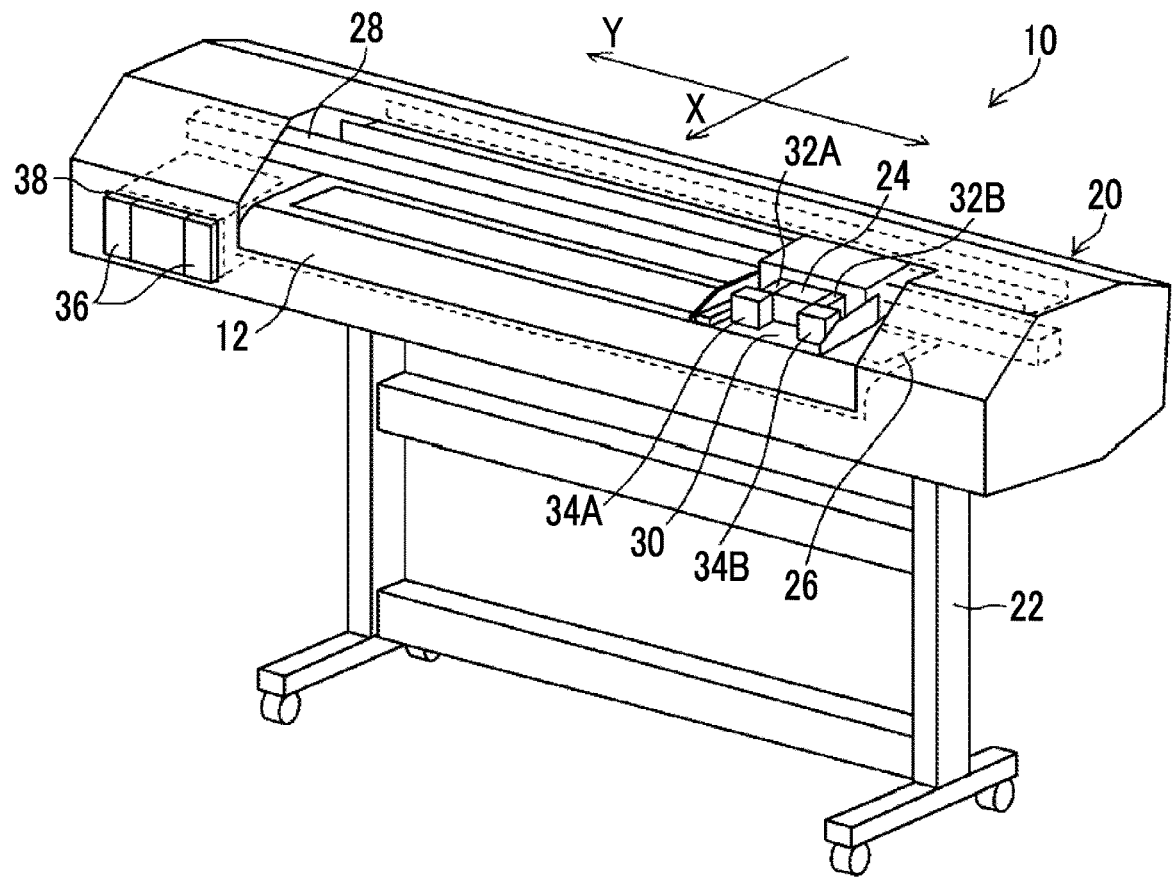
FIG. 1 is an external perspective view showing a configuration example of an ink jet recording apparatus.

FIG. 1 is an external perspective view showing a configuration example of an ink jet recording apparatus. An ink jet recording apparatus 10 is an example of a serial-type ink jet printer, which is a wide format printer for recording a color image on a recording medium 12 using an ultraviolet curable ink.

The ink jet recording apparatus 10 comprises an apparatus body 20 and support feet 22 that supports the apparatus body 20. A recording head 24, a platen 26, a guide mechanism 28, and a carriage 30 are provided in the apparatus body 20.

The recording head 24 is a drop-on-demand type ink jet head that jets ink toward the recording medium 12. The term "recording head" is synonymous with a term such as a printing head, a print head, a plotting head, an ink jet head, a liquid jet head, a liquid droplet jet head, or a liquid droplet spray head. Further, the term "ink jet recording apparatus" is synonymous with a term such as an ink jet printing apparatus, an ink jet printer, or an ink jet type image forming apparatus. The term "recording" is used as a term that includes a meaning of "printing", "print", "plotting" or "image forming".

A variety of mediums may be used as the recording medium 12, regardless of materials such as paper, non-woven fabric, vinyl chloride, synthetic chemical fibers, polyethylene, polyester, or tarpaulin. The recording medium 12 may be a permeable medium, or may be a non-permeable medium. The term "recording medium" is a generic term for mediums to which ink is attached, and may include mediums called a variety of terms such as a printing medium, a medium for recording, a medium for image forming, an image receiving medium, a medium for jetting, a print medium, a recording sheet, or a printing sheet. In this specification, the term "sheet" is synonymous with a "recording medium".

The platen 26 is a member that supports the recording medium 12. The guide mechanism 28 and the carriage 30 function as head moving means for supporting the recording head 24 to be movable. The guide mechanism 28 is disposed to extend along a head scan direction that crosses a transport direction of the recording medium 12 and is a direction parallel to a medium support surface of the platen 26, above the platen 26. The "above the platen 26" means that the guide mechanism 28 is disposed at an upper and higher position with reference to the platen 26 when a gravity direction is a "downward" direction. The transport direction of the recording medium 12 may be referred to as a "paper feed direction". Further, a direction that is perpendicular to the paper feed direction and is parallel to a recording surface of the recording medium 12 may be referred to as a "sheet width direction".

The carriage 30 is supported to be reciprocally movable in the sheet width direction along the guide mechanism 28. A direction that is parallel to the reciprocal direction of the carriage 30 corresponds to a "main scan direction". Further, a direction that is parallel to the transport direction of the recording medium 12 corresponds to a "sub scan direction". That is, the paper width direction is the main scan direction, and the paper feed direction is the sub scan direction. In FIG. 1, the sub scan direction is expressed as an X direction, and the main scan direction is expressed as a Y direction.

The recording head 24, precuring light sources 32A and 32B, and main curing light sources 34A and 34B are mounted on the carriage 30. The recording head 24, the precuring light sources 32A and 32B, and the main curing light sources 34A and 34B integrally move together with the carriage 30 along the guide mechanism 28. By reciprocating the carriage 30 along the guide mechanism 28 in the main scan direction, the recording head 24 may be relatively moved in the main scan direction with respect to the recording medium 12.

The precuring light sources 32A and 32B emit infrared rays for temporarily curing ink landed on the recording medium 12. The precuring means partially curing ink to such a degree as to prevent movement or deformation of ink drops after dropping. A precuring process may be referred to as "partial curing", "half curing", "pinning", "set", or the like. In the present specification, the term "precuring" is used.

On the other hand, a process of further emitting infrared rays after the precuring and sufficiently curing ink is referred to as "main curing" or "curing". In the present specification, the term "main curing" is used. The main curing light sources 34A and 34B are light sources that perform additional exposure after the precuring and finally emit infrared rays for mainly curing ink.

The apparatus body 20 is provided with a mounting section 38 for mounting of an ink cartridge 36. The ink cartridge 36 is an exchangeable ink tank that stores ultraviolet curable ink. The ink cartridge 36 is provided corresponding to ink of each color used in the ink jet recording apparatus 10. The ink jet recording apparatus 10 in this example has a configuration in which ink of four colors, that is, cyan (C), magenta (M), yellow (Y), and black (K) is used. The respective color ink cartridges 36 are connected to the recording head 24 by ink supply paths that are independently formed. In a case where an ink remaining amount of each color becomes small, exchange of the ink cartridge 36 is performed.

Although not shown, a maintenance portion of the recording head 24 is provided on a right side when looking at the front of the apparatus body 20. The maintenance portion is provided with a cap for moisturization or nozzle suction of the recording head 24 when printing is not performed, and a dispense member for cleaning a nozzle surface that is an ink jet face of the recording head 24. A blade and/or a web may be used as the dispense member.

<Configuration of Recording Medium Transport Path>

Figure 2:
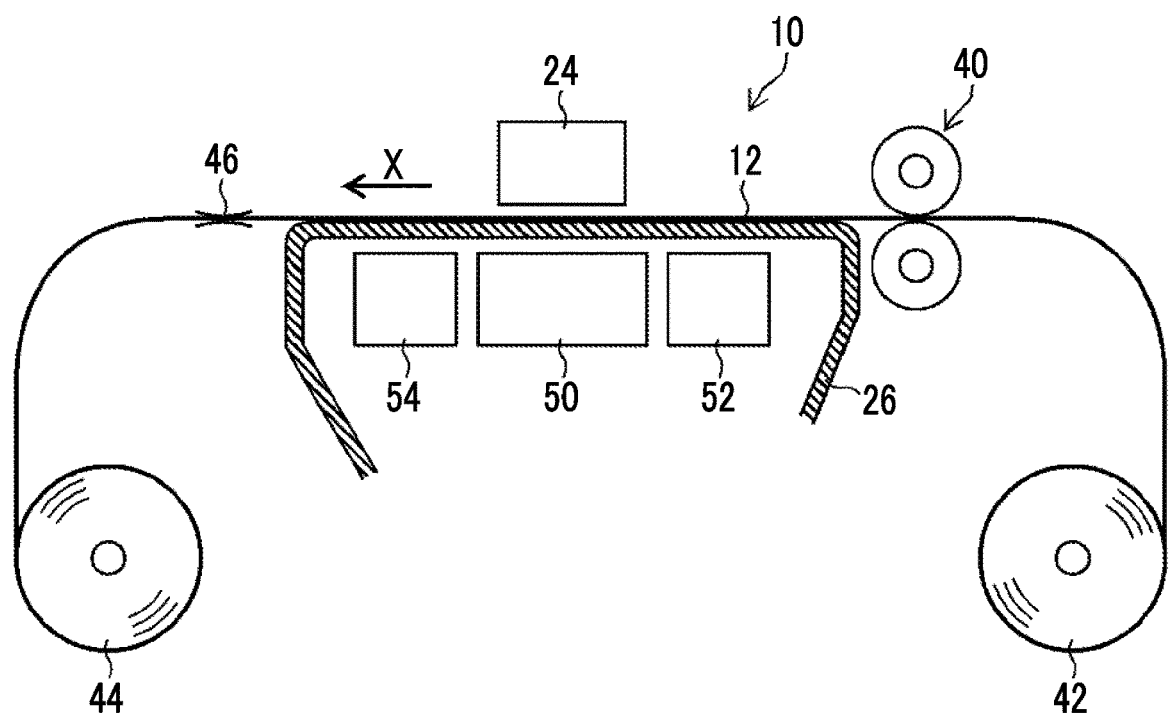
FIG. 2 is a diagram schematically showing a recording medium transport path of the ink jet recording apparatus.

FIG. 2 is a diagram schematically showing a recording medium transport path of the ink jet recording apparatus 10. As shown in FIG. 2, the platen 26 has an upper face that is a support face of the recording medium 12. On an upstream side in the paper feed direction with reference to a position of the platen 26, nip rollers 40 are disposed.

The recording medium 12 in this example is supplied in the form of rolled continuous paper. The recording medium 12 sent out from a supply side roll 42 is transported by the nip rollers 40. With respect to the recording medium 12 that reaches an area directly below the recording head 24, an image is recorded by the recording head 24. On a downstream side in the paper feed direction with reference to the position of the recording head 24, a winding roll 44 that winds the recording medium 12 after image recording is provided. Further, a guide 46 is provided on a transport path of the recording medium 12 between the platen 26 and the winding roll 44.

In the ink jet recording apparatus 10 of the present embodiment, roll-to-roll type paper transport means in which the recording medium 12 sent from the supply side roll 42 is wound by the winding roll 44 through the platen 26 is employed. Here, in execution of the invention, a configuration of the paper transport means is not limited to this example. For example, a configuration in which the winding roll 44 is not provided, or a configuration in which a cutter that cuts the recording medium 12 in a desired size is provided, or other configurations may be used. Further, the recording medium 12 is not limited to the continuous paper, and cut paper, that is, flat paper separated one by one may be used.

On a rear surface side of the platen 26, that is, on a side opposite to a medium support face that supports the recording medium 12 in the platen 26, a temperature control section 50 that controls temperature of the recording medium 12 during image recording is provided. By the temperature control of the temperature control section 50, it is possible to obtain desired values of physical properties such as a viscosity and a surface tension of ink landed on the recording medium 12, and to obtain desired dot diameters. Further, a pre-temperature control section 52 is provided on an upstream side of the temperature control section 50 in the paper feed direction, and an after-temperature control section 54 is provided on a downstream side of the temperature control section 50 in the paper feed direction. A configuration in which the pre-temperature control section 52 and/or the after-temperature control section 54 are not provided may be used.

<Configuration Example of Recording Head>

Figure 3:
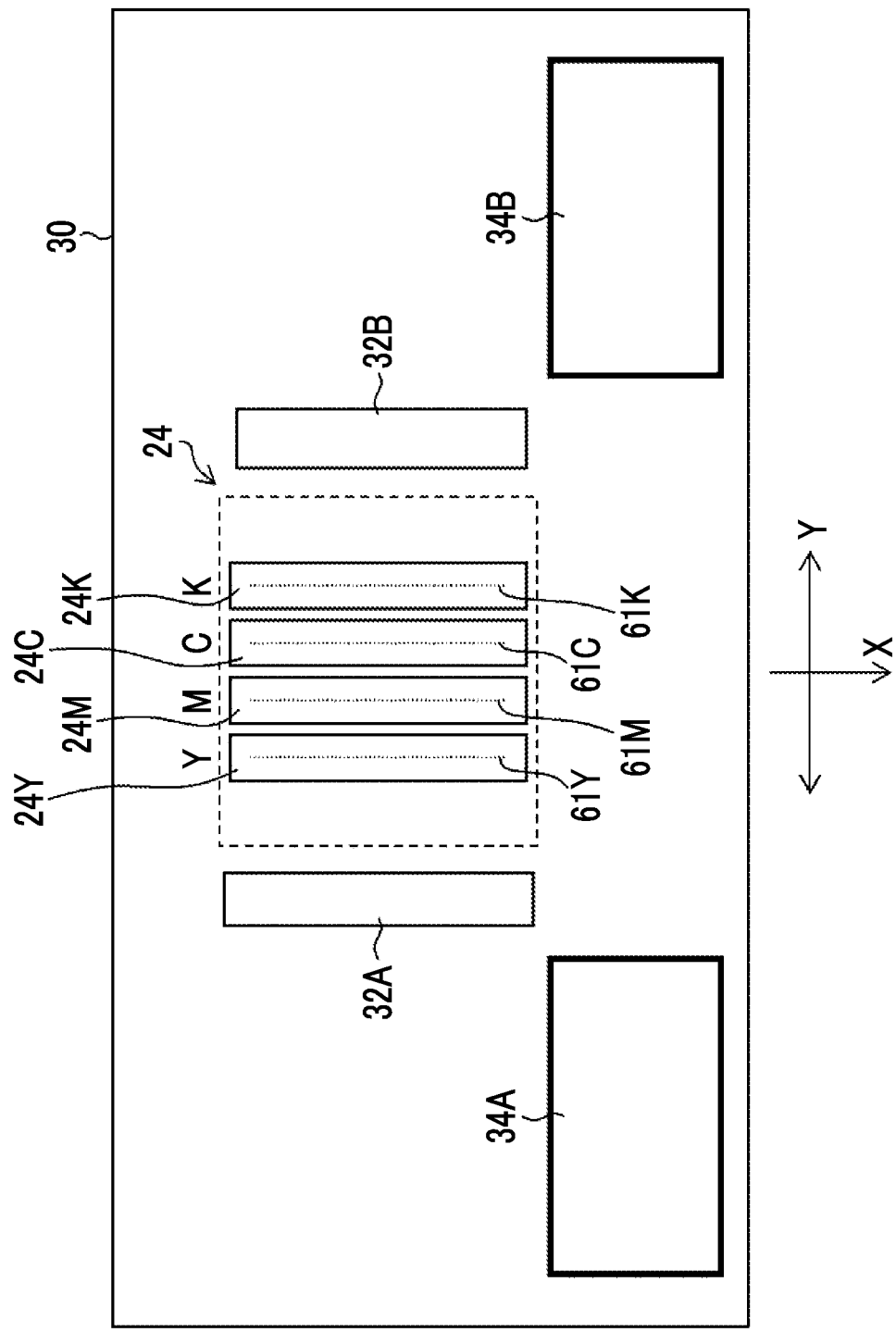
FIG. 3 is a planar perspective view showing an example of a disposition configuration of a recording head, a precuring light source, and a main curing light source disposed on a carriage.
Figure 4:
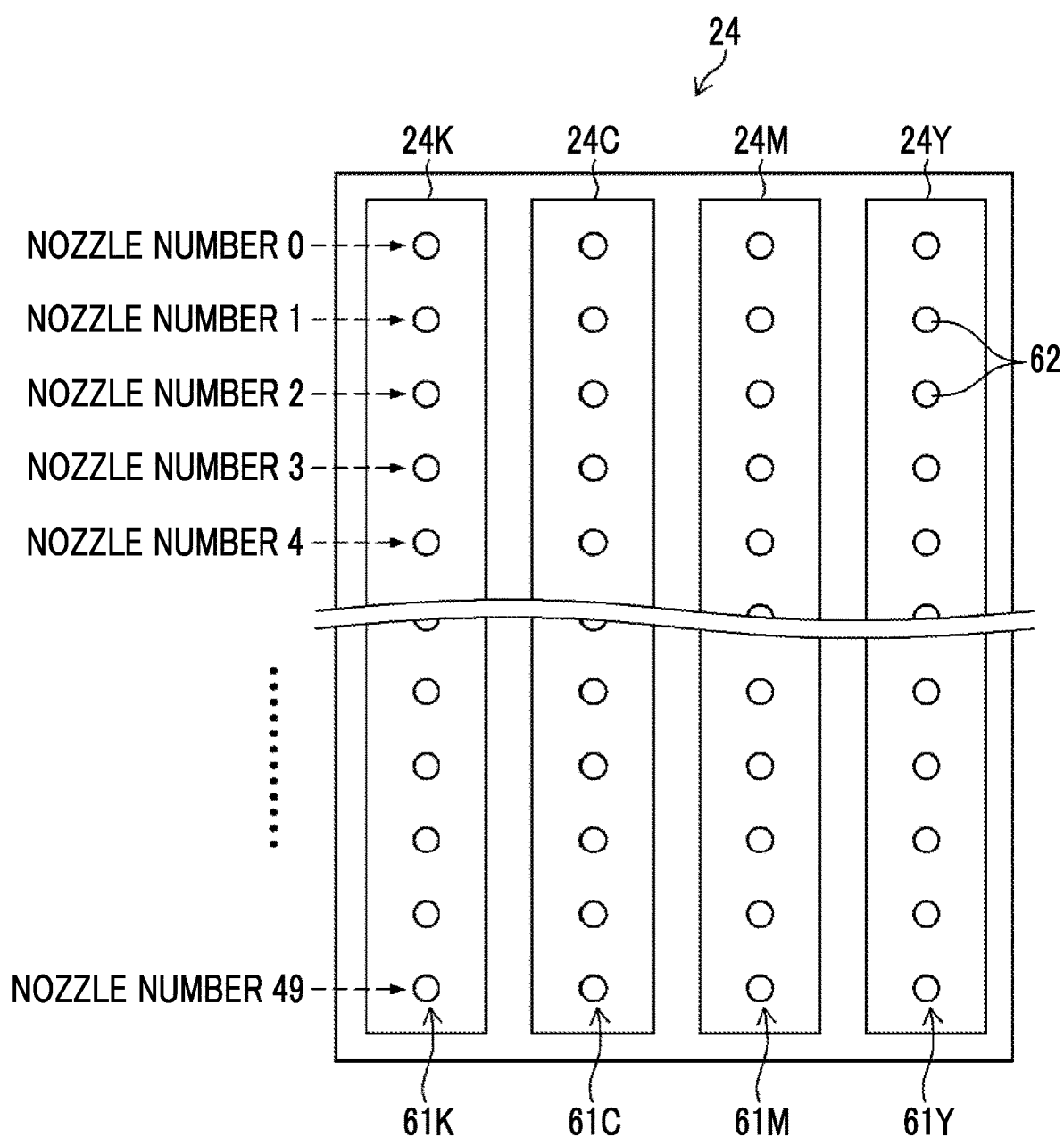
FIG. 4 is an enlarged view of the recording head shown in FIG. 3.

FIG. 3 is a planar perspective view showing an example of a disposition configuration of the recording head 24, the precuring light sources 32A and 32B, and the main curing light sources 34A, and 34B, disposed on the carriage 30. FIG. 4 is an enlarged view of the recording head 24 in FIG. 3.

As shown in FIGS. 3 and 4, nozzle rows 61C, 61M, 61Y, and 61K in which nozzles 62 (see FIG. 4) for jetting ink of the respective colors of cyan (C), magenta (M), yellow (Y), and black (K) are arranged in the sub scan direction are provided in the recording head 24.

In FIG. 3, the nozzle rows are indicated by dotted lines, and individual illustrations of the nozzles are not shown. In the recording head 24 shown in FIG. 3, an example in which the respective nozzle rows are disposed in the order of the nozzle row 61Y of yellow, the nozzle row 61M of magenta, the nozzle row 61C of cyan, and the nozzle row 61K of black from the left of FIG. 3 is shown, but kinds (color numbers) of ink colors or color combinations are not limited to the present embodiment.

For example, in addition to four colors of C, M, Y, and K, a configuration in which light ink such as light cyan or light magenta is used, or a configuration in which ink of a special color instead of the light ink or in combination thereof is used may be used. In accordance with the kind of an ink color to be used, a configuration in which a nozzle row that jets ink corresponding thereto is added may be used. Further, the disposition order of the nozzle rows of the colors is not particularly limited. Here, it is preferable that a configuration in which a nozzle row of ink that has a relatively low curing sensitivity with respect to ultraviolet rays among a plurality of kinds of ink is disposed on a side close to the precuring light source 32A or 32B is used.

In this embodiment, the recording head 24 is configured by forming a head module for each of the nozzle rows 61C, 61M, 61Y, and 61K of the respective colors and arranging the head modules. Specifically, a head module 24Y having the nozzle row 61Y that jets yellow ink, a head module 24M having the nozzle row 61M that jets magenta ink, a head module 24C having the nozzle row 61C that jets cyan ink, and a head module 24K having the nozzle row 61K that jets black ink are disposed at equal intervals to be parallel to each other in the reciprocal direction of the carriage 30. The reciprocal direction of the carriage 30 is the main scan direction.

The entirety of the module group of the head modules 24Y, 24M, 24C, and 24K of the respective colors may be considered as the "recording head", or each head module may be considered as the "recording head". Further, instead of a configuration in which the head modules 24Y, 24M, 24C, and 24K of the respective colors are combined, a configuration in which ink passages for respective colors are dividedly formed inside one recording head and nozzle rows that jet ink of a plurality of colors are provided may be used.

As shown in FIG. 4, the respective nozzle rows 61C, 61M, 61Y, and 61K are formed so that a plurality of nozzles 62 are arranged in parallel at regular intervals in the sub scan direction. In FIG. 4, an example in which 50 nozzles 62 are respectively arranged in the nozzle rows 61C, 61M, 61Y, and 61K of the respective colors is shown. Nozzle numbers 0 to 49 are assigned to the respective nozzles 62.

The nozzle numbers in this example are sequentially assigned to the respective nozzles 62 as consecutive numbers from one end side toward the other end side of the nozzle row in the sub scan direction. In this example, the nozzle number starts from the number 0, but a leading number among the nozzle numbers may be the number 1. The leading number may be a random integer that is equal to or greater than 0. The nozzle numbers may be used as identification numbers indicating positions of the respective nozzles 62.

Further, this example shows a nozzle row in which 50 nozzles 62 are arranged in a row along the sub scan direction, but the number of nozzles that form the nozzle row and a alignment style of the nozzles are not limited to this example. For example, a nozzle row in which nozzles are arranged at equal intervals in the sub scan direction using a two-dimensional nozzle arrangement in which a plurality of nozzle rows are combined may be formed.

As an ink jet method of the recording head 24, a piezo jet method for jetting ink through deformation of a piezoelectric element is employed. As a configuration in which an electrostatic actuator instead of the piezoelectric element is used a jet energy generating element may be used. Further, a thermal jet method for heating ink using a heating body (a heat generating element) such as a heater to generate an air bubble and jetting ink drops by its pressure may be employed. Here, since the ultraviolet curable ink generally has a viscosity higher than that of solvent ink, in a case where the ultraviolet curable ink is used, it is preferable to employ the piezo jet method having a relatively large jetting force.

The recording head 24 jets ink onto the recording medium 12 while being moved in the main scan direction to perform image recording in a region having a predetermined length of the recording medium 12 in the sub scan direction. Further, in a case where the recording medium 12 is moved by a predetermined distance in the sub scan direction after the image recording, the recording head 24 performs the same image recording in the next region, and thereafter, the same image recording is repeated whenever the recording medium 12 is moved by the predetermined distance in the sub scan direction, so that the image recording may be performed over the entire surface of the recording region of the recording medium 12.

As described above, the recording head 24 is a serial-type recording head. The ink jet recording apparatus 10 (see FIG. 1) of the present embodiment employs a multipath method in which a predetermined recording resolution is realized through a plurality of scans of the recording head 24 in the main scan direction.

<Configuration of Control System of Ink Jet Recording Apparatus>

Figure 5:
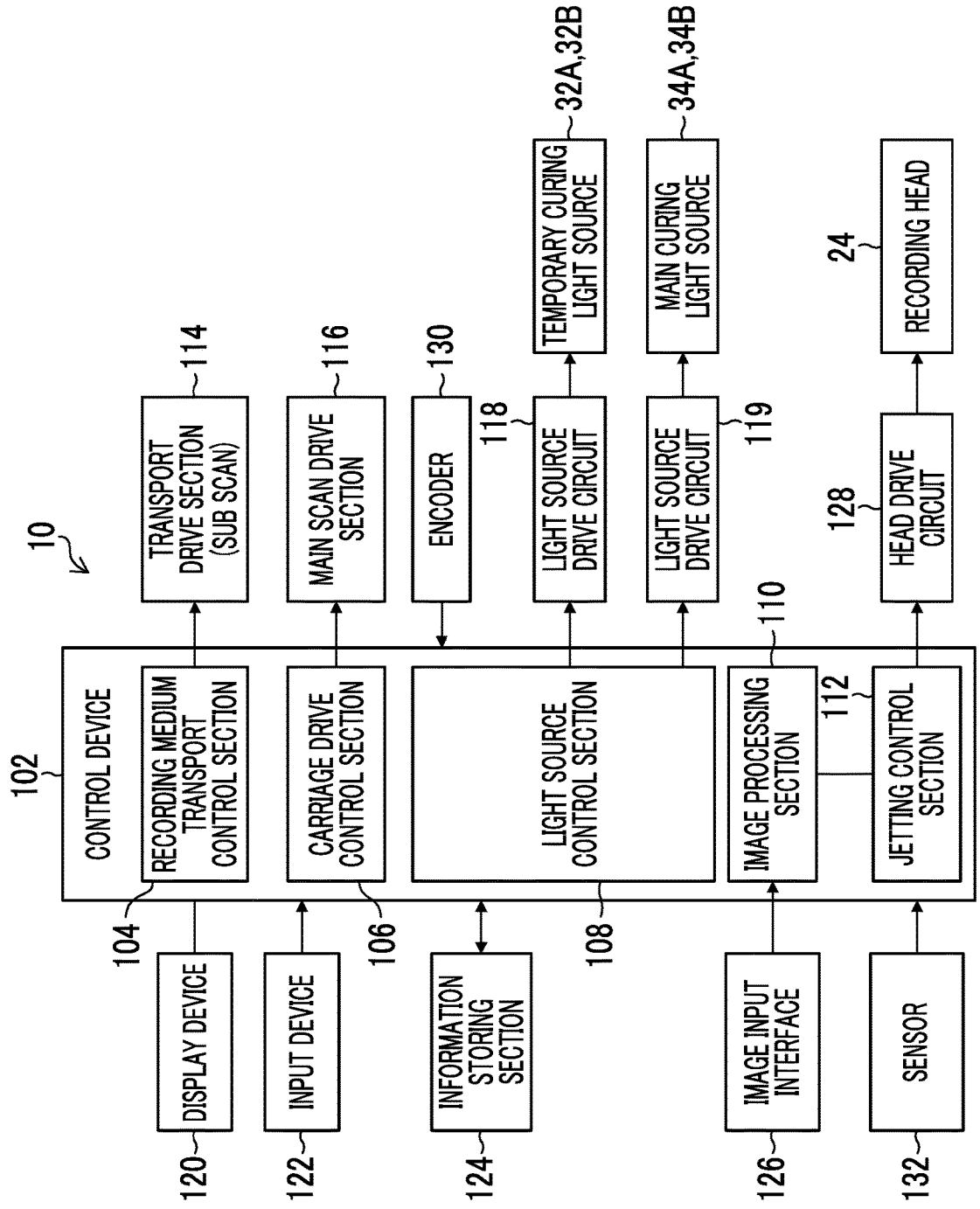
FIG. 5 is a block diagram showing a configuration of the ink jet recording apparatus.

FIG. 5 is a block diagram showing a configuration of the ink jet recording apparatus 10. As shown in FIG. 5, the ink jet recording apparatus 10 comprises a control device 102. A computer that comprises a central processing unit (CPU) may be used as the control device 102, for example. The control device 102 executes a variety of programs read from an information storing section 124 to generally control the entirety of the ink jet recording apparatus 10.

The control device 102 includes a recording medium transport control section 104, a carriage drive control section 106, a light source control section 108, an image processing section 110, and a jetting control section 112. The respective sections may be realized by hardware or software, or a combination thereof. The "software" is synonymous with a "program" or an "application".

The recording medium transport control section 104 controls the transport drive section 114 that transports the recording medium 12. The transport drive section 114 includes a drive motor that drives the nip rollers 40 (see FIG. 2), and a drive circuit thereof. The recording medium 12 transported on the platen 26 is intermittently fed in the sub scan direction in a swath width unit in accordance with a scan (a movement of a printing path) in the main scan direction performed by the recording head 24. Here, the "swath width" refers to a length in the sub scan direction determined at a repetitive scan cycle by reciprocation of the carriage 30, and is calculated by dividing a nozzle row length that is the length of the nozzle row in the sub scan direction by the number of paths that is the number of repetitive scans. The number of paths that is the number of repetitive scans is the number of scans necessary for completing drawing of a set recording resolution, and is determined by a drawing mode.

The carriage drive control section 106 controls the main scan drive section 116 that moves the carriage 30 in the main scan direction. The main scan drive section 116 includes a drive motor connected to a moving mechanism of the carriage 30, and a control circuit thereof.

An encoder 130 is provided in the drive motor of the main scan drive section 116 and the drive motor of the transport drive section 114. The encoder 130 inputs a pulse signal based on a rotation amount and a rotating speed of each drive motor to the control device 102. Thus, the control device 102 may recognize a position of the carriage 30 and a position of the recording medium 12 on the basis of the pulse signal input from the encoder 130.

The light source control section 108 controls emission of light of the precuring light sources 32A and 32B through a light source drive circuit 118, and controls emission of light of the main curing light sources 34A and 34B through a light source drive circuit 119.

The image processing section 110 performs image processing with respect to image data input through an image input interface 126, and converts the result into dot data for printing. In FIG. 5, for ease of notation, "IF" is simply used instead of "the interface. IF is an abbreviation of "interface".

The image processing section 110 corresponds to an example of the image processing apparatus of the invention, and performs image processing with respect to image data input through the image input interface 126 to convert the image-processed data into dot data for printing. The dot data refers to data indicating a disposition of dots.

The jetting control section 112 controls the head drive circuit 128 that drives the recording head 24 on the basis of dot data generated in the image processing section 110, to thereby control jetting of ink from each nozzle 62 of the recording head 24. The control device 102 is a form of a recording control section.

As the information storing section 124, for example, a non-volatile memory is used, and the information storing section 124 stores a variety of programs or a variety of data necessary for control of the control device 102. For example, the information storing section 124 stores a control program executed by the respective sections of the control device 102, a scan pattern program, and the like, as the programs. The scan pattern program is a multipath type image recording program, and defines a reciprocating scan (a movement of a printing path) of the recording head 24 in the main scan direction with respect to the recording medium 12 that is intermittently transported in the sub scan direction or the number of paths (the number of repetitive scans). The movement of the printing path that is accompanied by the movement of the recording head 24 in the main scan direction includes at least one of a movement direction of the recording head 24 in formation of dots, selection of a nozzle for jetting ink, or a jetting timing. A pattern of scans determined by a combination of the movement of the printing path and the number of paths is referred to as a "scan pattern".

To the control device 102, an input device 122 and a display device 120 are connected. The input device 122 may employ a variety of units such as a keyboard, a mouse, a touch panel, or an operating button, for example, and may employ an appropriate combination thereof. The input device 122 inputs an external operating signal that is manually operated by an operator who is a user to the control device 102.

A liquid crystal display or the like is used as the display device 120. An operator may input a variety of information using the input device 122. Further, the operator may confirm input content, and additionally, various types of information, a status of a system, and the like, through display on the display device 120.

A sensor 132 is provided in the carriage 30. The control device 102 may recognize the width of the recording medium 12 on the basis of a sensor signal input from the sensor 132.

<Description of Multipath Type Image Recording Method>

Figure 6:
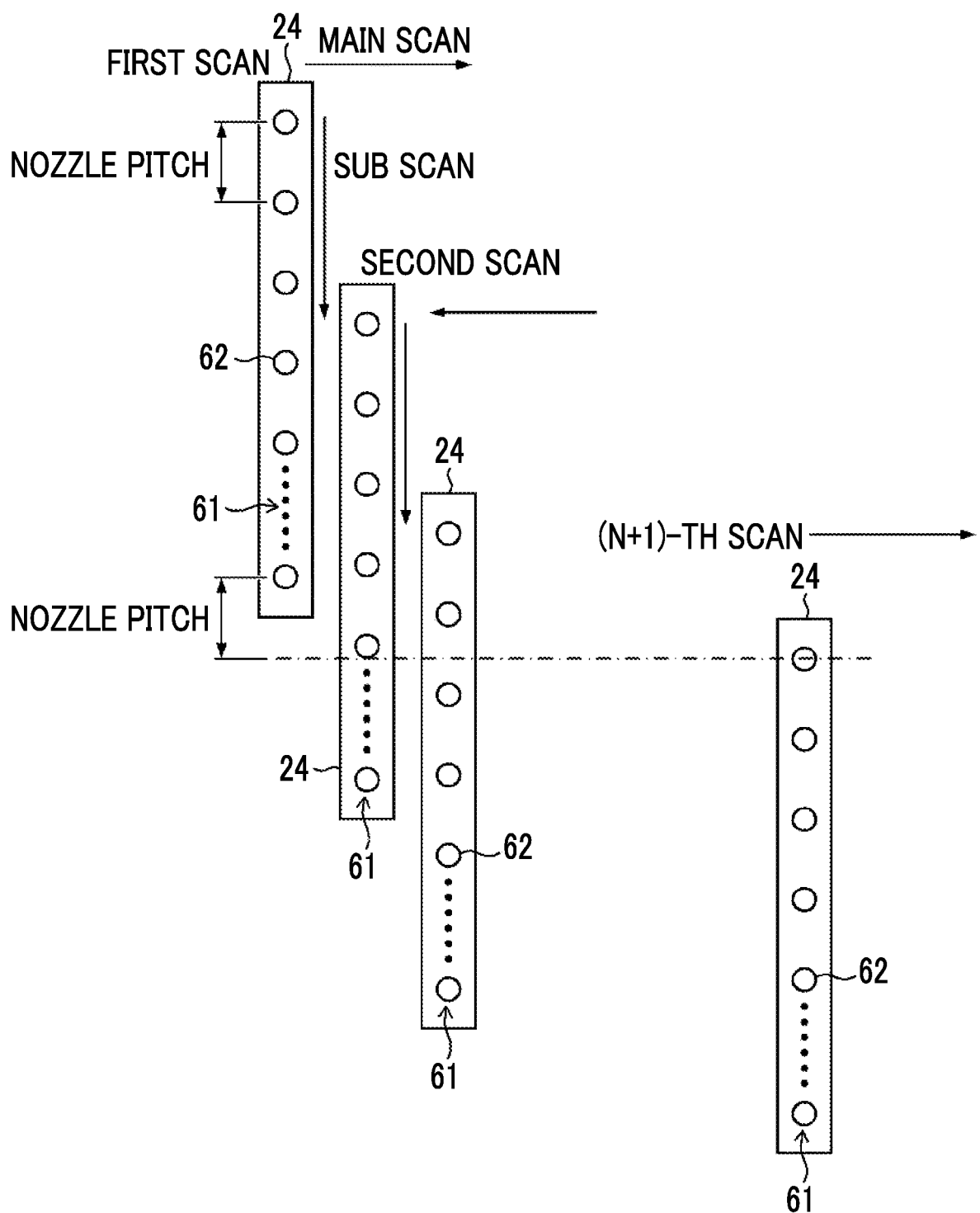
FIG. 6 is a diagram for illustrating an example of an image recording method of a multipath type.

FIG. 6 is a diagram for illustrating an example of an image recording method of a multipath type. Here, for ease of description, a case where a configuration of the recording head 24 is simplified, the number of nozzle rows of the recording head 24 is set to only one row, and recording is performed by the one-row nozzle row 61 will be described as an example. It may be understood that the nozzle row 61 represents any one row among the nozzle rows 61C, 61M, 61Y, and 61K described in FIG. 4.

Further, with respect to a configuration in which a recording medium is intermittently fed in the sub scan direction, for ease of illustration, in FIG. 6, a configuration in which the recording medium is at a stopped state and the recording head 24 is intermittently moved in the sub scan direction is shown. In FIG. 6, the recording medium is not shown, and only the movement of the recording head 24 is shown.

As shown in FIG. 6, in a case where the recording head 24 is moved in the main scan direction (lateral direction in FIG. 6), jetting of ink is performed from the nozzles 62. Further, two-dimensional image recording is performed on the recording medium by a combination of reciprocation of the recording head 24 along the main scan direction and the intermittent feeding of the recording medium in the sub scan direction (longitudinal direction in FIG. 6). The term "image recording" may be replaced with a term such as drawing, printing, or image formation.

A main scan operation for performing recording of dots by jetting of ink from the nozzles 62 while the recording head 24 is being moved in the main scan direction may include a scan performed at a forward path and a scan performed at a backward path in the main scan direction. An image may be recorded by a bidirectional scan at the forward path and the backward path, or may be recorded by a certain one-directional scan at the forward path or the backward path. In a case where the bidirectional scan at the forward path and the backward path is performed, one reciprocating scan is counted as execution of two scans of the forward path scan and the backward path scan.

In a case where an image of a desired recording resolution is completed by N scans where N is a natural number, a relative positional relationship (here, a positional relationship in the sub scan direction) between the recording medium and the recording head 24 in an (N+1)-th scan becomes a relationship as shown in FIG. 6. That is, in order to perform image recording of the desired recording resolution by N writings, the recording medium is intermittently fed in the sub scan direction in the first writing, the second writing, the third writing, and so on, and a positional relationship in which connection is performed at a position corresponding to the length of the nozzle row is obtained just in the (N+1)-th scan is obtained. In order to connect N writing operations in a seamless manner, the recording medium is moved in the sub scan direction by an amount of "nozzle row length+1 nozzle pitch" from the sub scan directional position of the first scan, and the (N+1)-th scan is performed. Here, the "nozzle row length" represents the length of the nozzle row 61 in the sub scan direction in which the nozzles 62 are arranged in a row in the sub scan direction, and corresponds to a distance between nozzles located at opposite ends of the nozzle row. The "nozzle pitch" represents a nozzle interval in the nozzle row in the sub scan direction.

For example, a case where, using the recording head 24 having the nozzle row 61 in which nozzles 62 of which a nozzle arrangement density is 300 npi are arranged, a recording resolution of 600 dpi in the sub scan direction× 600 dpi in the main scan direction is realized by four paths (four writings) of two paths in the main scan direction and two paths in the sub scan direction (2 in main×2 in sub) is considered.

npi (nozzles per inch) is a unit indicating the number of nozzles per inch. dpi (dots per inch) is a unit indicating the number of dots per inch. 1 inch corresponds to about 25.4 millimeters.

For example, an interval of jetting points (pixels) determined from a recording resolution is referred to as a "jetting point interval" (synonymous with a "pixel interval" and a "dot interval"), and a lattice (matrix) indicating positions of recordable jetting points is referred to as a "jetting point lattice" (synonymous with a "pixel lattice").

In the case of a recording resolution of 600 dpi in the main scan direction and 600 dpi in the sub scan direction, a jetting point interval in the main scan direction is 42.3 micrometers (25.4 millimeters/600), and a jetting point interval in the sub scan direction is also 42.3 micrometers (=25.4 millimeters/ 600). This represents the size of one cell (corresponding to one pixel) of the jetting point lattice, that is, "42.3 micrometers×42.3 micrometers". With respect to feed control of the recording medium 12 or control of a jetting position (jetting timing) from the recording head 24, the amount of feed or the position is controlled using a jetting point interval determined from the recording resolution as a unit. The jetting point interval determined from the recording resolution may be referred to as a "resolution pitch" or a "pixel pitch".

In the case of N=4 (2 in main scan direction×2 in sub scan direction), recording of a 2×2 jetting point lattice is performed by four scans (paths) so that jetting point lines (rasters (scan lines)) in the main scan direction are filled by two scans and jetting point lines (scan lines) in the sub scan direction are filled by two scans.

Figure 7:
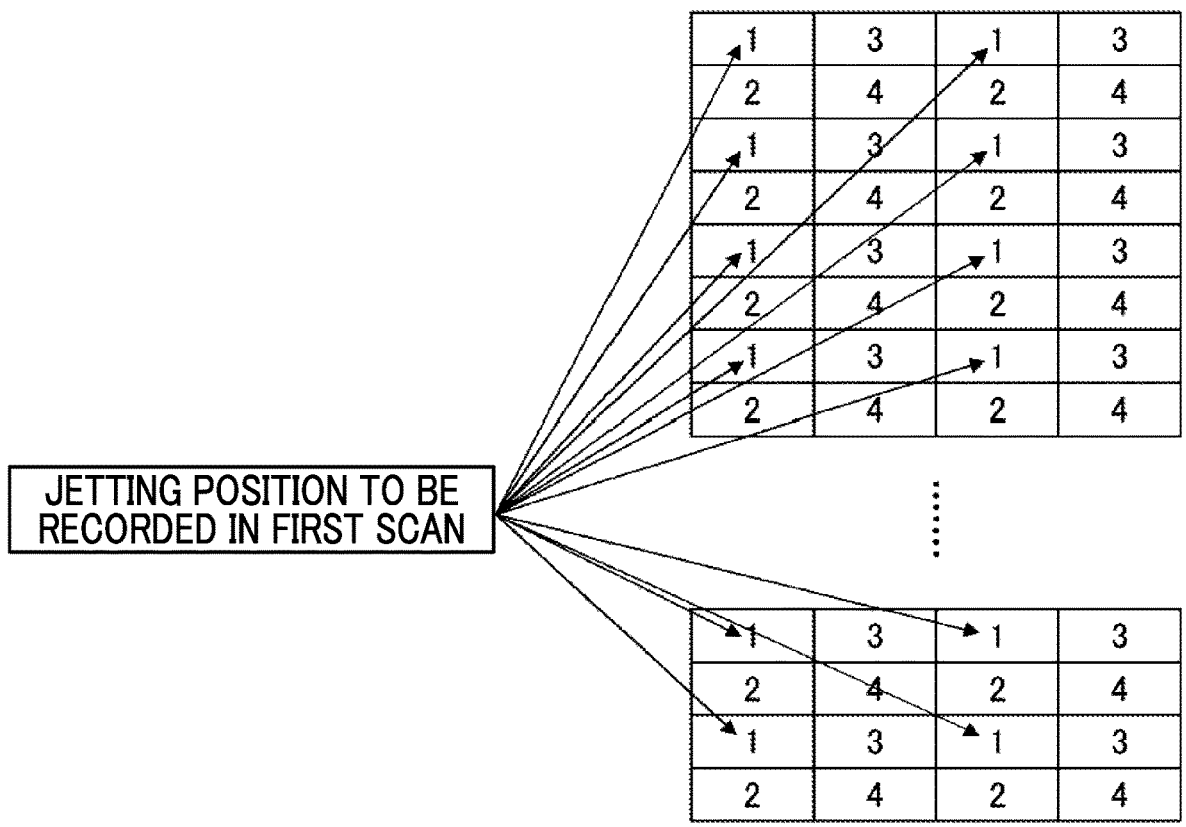
FIG. 7 is a diagram schematically showing a relationship between numbers of respective scans based on four-time recording operations and jetting positions recorded by the scans.

FIG. 7 is a diagram schematically showing a relationship between numbers (from 1 to 4) of respective scans based on the above-described four-time drawing operations and jetting positions recorded by the scans. In FIG. 7, cells numbered 1 to 4 represent jetting positions (pixel positions) recorded by the nozzle 62, and each numeral of 1 to 4 represents a scan number indicating the order of a scan in which each pixel position is to be recorded. For example, a cell (pixel) to which the numeral "1" is given represents a jetting position to be recorded in the first scan.

As is obvious from FIG. 7, in the arrangement distribution of the numerals of 1 to 4 indicating a scan order for recording respective jetting positions, a lattice of "2×2" of 2 in main scan direction×2 in sub scan direction is a basic unit for repetition. The 2×2 lattice is referred to as a "basic unit lattice" or a "2×2 lattice". A filling method (jetting order) of the 2×2 lattice is not limited to the example shown in FIG. 7, and various methods may be considered.

《Jetting Rate》

Here, the "jetting rate" will be described. A nozzle jetting rate includes an absolute jetting rate and a relative jetting rate. The absolute nozzle jetting rate is a value indicating a ratio of recording pixels of which dots are recorded by ink jetting of each nozzle, among recording allocated pixels that are allocated to each nozzle, which are pixels of which recording is allocated to each of a plurality of nozzles in the recording head.

The absolute nozzle jetting rate is determined for each nozzle. The absolute nozzle jetting rate is expressed as a quotient of division in a case where the number of recording allocated pixels that are allocated to each nozzle is a denominator and the number of recording pixels of which dots are recorded by ink jetting of each nozzle is a numerator, which may be expressed as a numerical value that is equal to or greater than 0 and is equal to or smaller than 1. Further, the absolute nozzle jetting rate may also be expressed as a percentage. The absolute nozzle jetting rate increases as a recording duty increases, and becomes "1.0" or "100%" that is a maximum value at a recording duty of 100%.

Here, the "recording duty" refers to a ratio of pixels that are in a dot-ON state among respective pixels of an image to be recorded on a recording medium. The recording duty may be referred to as a term such as a printing duty, an ink duty, a printing rate, or a recording rate, or may be simply referred to as a duty. In this specification, hereinafter, the recording duty is expressed as the "duty".

In short, the absolute nozzle jetting rate represents an ink jetting rate of each nozzle. The ink jetting rate of each nozzle is equal to a recording pixel rate of each nozzle. The absolute nozzle jetting rate may be understood as a rate of usage of a nozzle, which may be considered as a nozzle usage rate, or a nozzle operating rate.

Specifically, the absolute nozzle jetting rate represents a usage rate of each nozzle in a case where a usage rate of each nozzle in performing recording of a solid pattern that corresponds to a uniform gradation image of a maximum concentration is set to "1.0" or "100%" that is a reference value. The usage rate of each nozzle may be replaced with an ink jetting amount of each nozzle, or may be replaced with the number of recording pixels for each nozzle.

On the other hand, a relative usage rate of each nozzle is referred to as a nozzle jetting rate. The nozzle jetting rate becomes a control target of the absolute nozzle jetting rate. The nozzle jetting rate is a relative jetting rate indicating a relative ratio of each nozzle with respect to the absolute nozzle jetting rate. The nozzle jetting rate means a relative ratio between nozzles, of the absolute nozzle jetting rates of the respective nozzles, and an absolute value or a maximum value of a numerical value of the nozzle jetting rate does not mean a particular physical quantity. The absolute value of the nozzle jetting rate of each nozzle may be set by standardizing a sum of nozzle jetting rates of all nozzles to 1, or may be set by standardizing a maximum value to 1 or "100%". In this embodiment, for ease of description, the absolute nozzle jetting rate of a maximum jetting (maximum usage rate) is set to "1.0", and the nozzle jetting rate is expressed as a ratio with respect to the maximum value. In this embodiment, a value of the nozzle jetting rate is expressed as a numerical value in a range of "0 to 1". Hereinafter, in a case where the "jetting rate" is simply used, the jetting rate indicates the nozzle jetting rate that represents the relative usage rate of each nozzle.

FIG. 8 is a diagram showing an example of data of a nozzle jetting rate determined for each nozzle. A lateral axis in FIG. 8 represents a nozzle number, and a longitudinal axis represents a nozzle jetting rate associated with a nozzle of each nozzle number. FIG. 8 shows a relative rate of each nozzle in a state where a jetting rate of a maximum jetting nozzle is set to "1.0".

A trapezoidal graph G1 indicated by a solid line in FIG. 8 is an example of nozzle jetting rates in which jetting rates of nozzle groups (for example, a nozzle group of nozzle numbers 0 to 12, and a nozzle group of nozzle numbers 37 to 49) that belong to an end part of a nozzle row are set to values lower than jetting rates of a nozzle group (a nozzle group of nozzle numbers 13 to 36) that belongs to a central part of the nozzle row in order to suppress banding.

A straight line graph Gu indicated by a dotted line in the figure represents a uniform jetting rate at the same duty as in the graph G1. In the example of FIG. 8, it is assumed that the duty is 72%. The graph Gu is shown for comparison with the graph G1.

As illustrated in the graph Gu, a case where a nozzle jetting rate of each nozzle in the nozzle row is constant will be referred to as a "uniform nozzle jetting rate". On the other hand, as illustrated in the graph G1, a case where the jetting rate of each nozzle in the nozzle row is not constant, particularly, a case where the nozzle jetting rates of the nozzle groups at both end parts of the nozzle row are suppressed to be lower than the nozzle jetting rates of the nozzle group at the central part and the nozzle jetting rates in the nozzle row are not uniform is referred to as a "non-uniform nozzle jetting rate".

Nozzles located at both end parts of the nozzle row are referred to as end part nozzles, and particularly, a nozzle located at the end of the nozzle row is referred to as an end nozzle. A nozzle located at the central part of the nozzle row is referred to as a central nozzle.

《Description of Problems》

Here, the problems to be solved will be described with reference to specific examples. Here, for ease of description, a case where a recording resolution of an ink jet recording apparatus is 600 dpi in a main scan direction and is 600 dpi in a sub scan direction, a nozzle arrangement density in the sub scan direction in the recording head is 300 npi, the number of nozzles is 50, a paper feed amount of an intermittent paper feeding operation is 25 pixels/600 dpi, and the number of paths in the main scan direction is "2 paths" will be described as an example.

The paper feed amount refers to the amount of transportation of a sheet in a sub scan direction in one main scan. In a case where a relative movement of a recording head with respect to a sheet in the sub scan direction is present, it may be understood that the paper feed amount is the amount of relative movement of the recording head with respect the sheet in the sub scan direction in one main scan. The paper feed amount is expressed as the number of rasters in the sub scan direction. The number of rasters may be expressed as the number of pixels. The paper feed amount corresponds to a sub scan movement amount per sub scan operation.

Expression of "pixel/600 dpi" indicating a paper feed amount unit represents the size of one pixel in a recording resolution of 600 dpi, and 1 pixel/600 dpi corresponds to about 42.3 micrometers [μm].

The number of paths in the main scan direction refers to the number of times of main scan necessary for entirely filling one raster to be formed in the main scan direction with dots. The number of paths in the main scan direction is synonymous with "the number of overlaps". A case where the number of overlaps is "2" means that one raster in the main scan direction is completed by two main scans.

Figure 9:
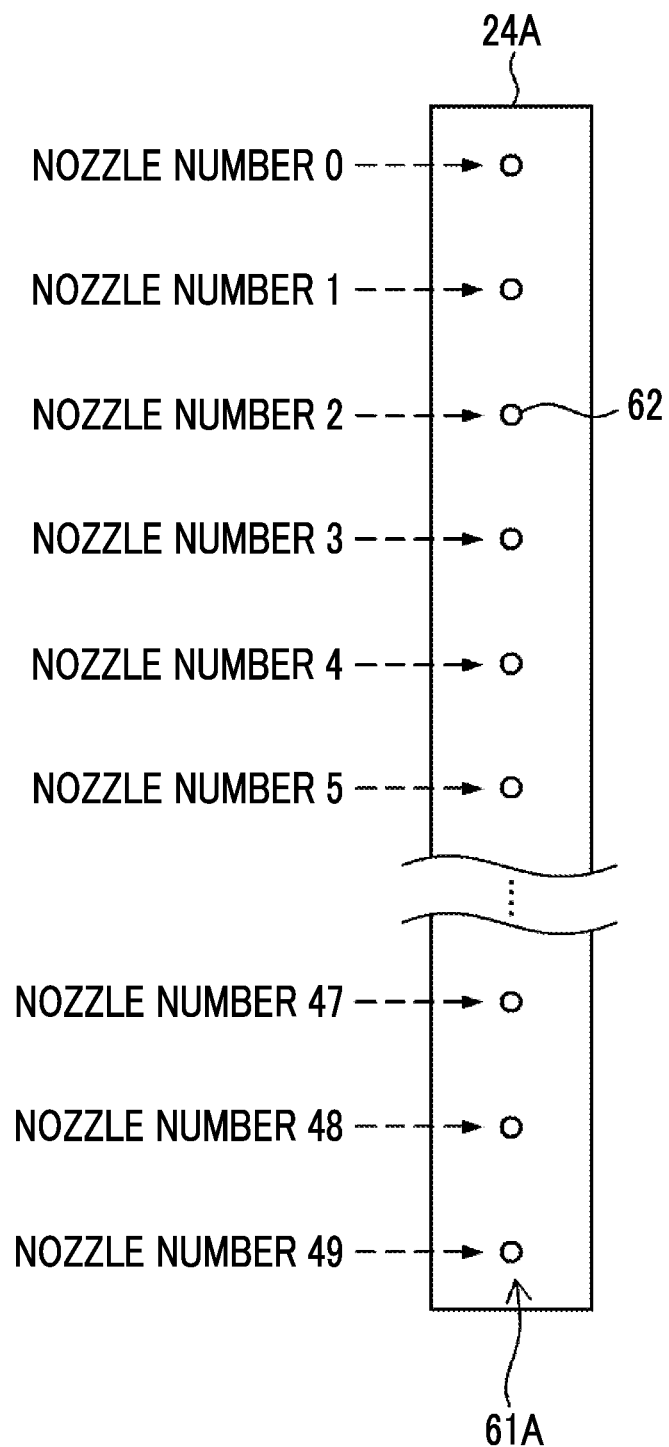
FIG. 9 is a diagram schematically showing an example of a recording head having a nozzle row in which the number of nozzles is 50.

FIG. 9 is a diagram schematically showing an example of a recording head having a nozzle row in which the number of nozzles is 50. As shown in FIG. 9, the recording head 24A has a nozzle row 61A in which 50 nozzles 62 are arranged in a row at equal intervals in the sub scan direction. The recording head 24A corresponds to a representative one of the head modules 24C, 24M, 24Y, and 24K described in FIG. 4.

Unique nozzle numbers 0, 1, 2, ... , and 49 are sequentially assigned to the respective nozzles 62, from the nozzle 62 at an upper end in FIG. 9 that is one end of the nozzle row 61A toward a lower end of FIG. 9 that is the other end thereof. A nozzle arrangement density of the nozzle row 61A may be variously designed, in this example, the nozzle arrangement density is set to 300 npi in the sub scan direction.

The nozzle arrangement density 300 npi of the recording head 24A corresponds to 300 dpi in terms of a dot recording density, that is, a recording resolution. Here, "npi" may be rephrased as "dpi".

In this example, since a recording resolution assumed at the time of printing is 600 dpi in the main scan direction, and 600 dpi in the sub scan direction, a nozzle pitch of the nozzle row 61A of 300 npi corresponds to two pixels in the unit of the size of a pixel of 600 dpi.

Figure 10:
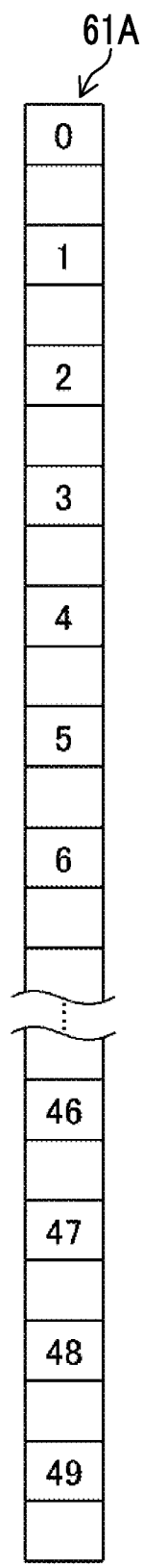
FIG. 10 is a diagram illustrating a state where the nozzle row of the recording head shown in FIG. 9 is symbolized.

FIG. 10 is a diagram illustrating that the nozzle row of the recording head shown in FIG. 9 is symbolized. In order to easily understand a relationship between the position of each nozzle 62 that forms the nozzle row 61A and a pixel, a writing method as shown in FIG. 10 is introduced with respect to writing of the nozzle row.

FIG. 10 shows that the nozzle row 61A is divided into cells in units of pixels, and numbers 0 to 49 indicating nozzle numbers are written in the cells. The position of a cell to which the nozzle number is assigned represents the position of the nozzle. That is, the writing of the nozzle row 61A shown in FIG. 10 is an alternative to the writing of the recording head 24A shown in FIG. 9.

Figure 11:
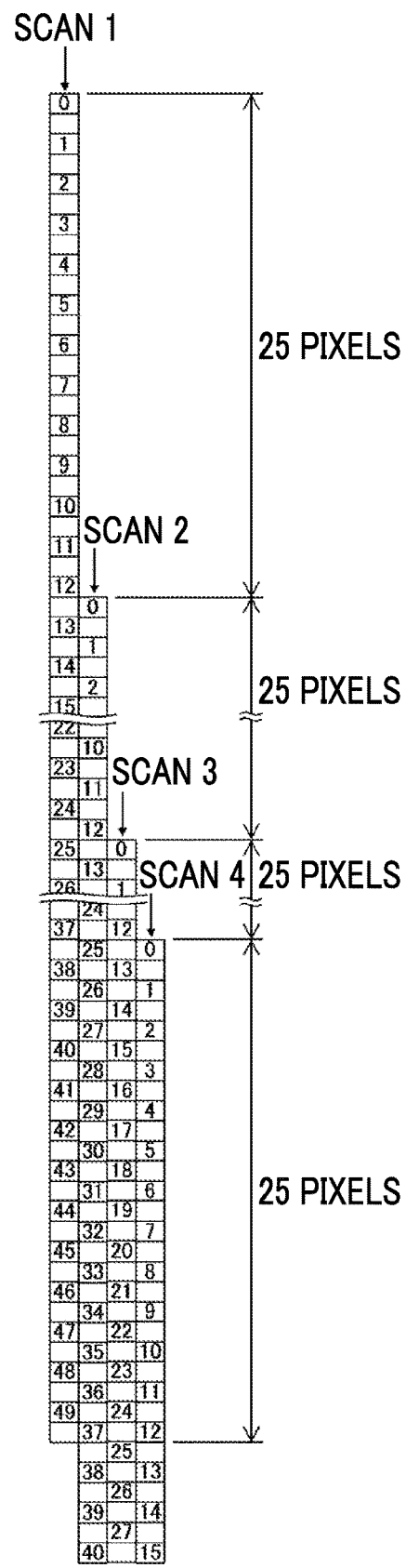
FIG. 11 is a diagram illustrating an intermittent feeding state where 25 pixels are relatively moved in a sub scan direction whenever a printing path in a main scan direction is performed once.

FIG. 11 shows an intermittent feeding state where 25 pixels are relatively moved in the sub scan direction whenever a printing path in the main scan direction is performed once. In FIG. 11, for ease of illustration, the recording head 24A is drawn as being moved in the sub scan direction with respect to a stopped recording medium. In the drawing method shown in FIG. 11, recording of 600 dpi is completed in two paths for a main scan line, which is a jetting point line in the main scan direction, and recording of 600 dpi is completed in two paths for a sub scan line, which is a jetting point line in the sub scan direction.

The main scan line is synonymous with "raster". The "raster" means a scan line in the main scan direction, and indicates a row of pixels arranged in the main scan direction. The paper feed amount in the sub scan direction for each path is 25 pixels, that is, 25 rasters. In the case of this example, recording of 600×600 dpi is performed using recording by 4 scans as a repeating unit.

A left diagram of FIG. 12 is a diagram illustrating a relationship between scans for recording each raster and nozzles. The left diagram of FIG. 12 shows a range of 25 rasters. A right diagram of FIG. 12 is an example of a nozzle pattern. The nozzle pattern is an array pattern of nozzle numbers indicating a correspondence relationship between the position of each pixel in a certain image region and a nozzle number of a nozzle that records each pixel. The nozzle pattern may be a chart corresponding to a relationship diagram that specifies the relationship between pixels and nozzle numbers. That is, the nozzle pattern is information indicating "which nozzle each pixel is recorded by?".

The nozzle pattern in this example has a periodicity in which a repetitive minimum unit of "2×100 pixels" of 2 pixels in the main scan direction×100 pixels in the sub scan direction (=25 pixels×4) is repeated in the main scan direction and the sub scan direction. The periodicity of the nozzle pattern relates to repetition of a "filling order" that is an order in which a unit region of a predetermined pixel range is filled with dots. In the main scan direction, the repetition occurs in the unit of the number of overlaps, and in the sub scan direction, the repetition occurs in the unit of a product of a paper feed amount and the number of filling order repeating units. The number of filling order repeating units is expressed as a product of a nozzle pitch and the number of overlaps.

The size of the unit region matches the number of overlaps in the main scan direction, and matches the nozzle pitch in the sub scan direction. In this example in which the number of overlaps is "2" and the nozzle pitch is "2", the unit region corresponds to a pixel range of 2×2. The area of the unit region is referred to as a "unit area". The unit area represents the area of the unit region formed by the number of overlaps in the main scan direction and the number of pixels corresponding to the nozzle pitch in the sub scan direction. That is, the unit area is the area of the unit region formed by a pixel range of "the number of overlaps×nozzle pitch". In the case of this example, the unit area is filled by four scans (=2×2).

The nozzle pattern shown on the right side of FIG. 12 shows a range of 10×10 pixels at a position corresponding to a range of 10 rasters from the top of 25 rasters shown on the left side of FIG. 12. For example, a pixel in which the nozzle number 25 is written in the right diagram of FIG. 12 is a pixel for which the nozzle with the nozzle number 25 is in charge of recording, which indicates are recording charge pixel of the nozzle with the nozzle number 25. That is, the nozzle pattern indicates a recording charge pixel for each nozzle number.

FIG. 13 is an example of a jetting rate pattern. The jetting rate pattern refers to an array pattern of nozzle jetting rates indicating a correspondence relationship in which a nozzle jetting rate of a nozzle that records each pixel is specified for each pixel. The jetting rate pattern may be a chart corresponding to a relationship diagram in which a relationship between the pixels and the nozzle jetting rates is specified. The jetting rate pattern shown in FIG. 13 is obtained by specifying nozzle jetting rates corresponding to the respective nozzle numbers of the nozzle pattern shown on the right side of FIG. 12 from the graph G1 in FIG. 8.

As described above, in the case of this example, the nozzle pattern and the jetting rate pattern are repeated at a cycle of 100 pixels in the sub scan direction and at a cycle of 2 pixels in the main scan direction.

<Description of Phenomenon in which Color Unevenness Occurs>

For example, in the case of an ink jet recording apparatus capable of recording a color image using ink of four colors of cyan, magenta, yellow, and black, a nozzle row is provided for each of the plurality of colors of ink (see FIG. 4).

Here, consideration is given to an overlap of two color dots of color A and color B, which are different colors from each other. It is assumed that both a recording operation of color A dot and a recording operation of color B dot satisfy the nozzle pattern shown in FIG. 12 and the jetting rate pattern shown in FIG. 13.

As an example in a case where a nozzle pattern of color A and a nozzle pattern of color B are different from each other, there may be a case where a nozzle row of color A and a nozzle row of color B are relatively offset in the sub scan direction, or a case where a recording order of color A in the main scan direction and a recording order of color B in the main scan direction are different from each other.

However, in any case, due to the non-uniform nozzle jetting rates as shown in the graph G1 in FIG. 8, disposition of the dots of color A and disposition of the dots of color B are biased, which results in color unevenness. Accordingly, here, a phenomenon in which color unevenness occurs will be described by focusing on only a case where both the nozzle pattern of color A and the nozzle pattern of color B have a common configuration shown in FIG. 12 and both the jetting rate pattern of color A and the jetting rate pattern of color B have a common configuration shown in FIG. 13.

A specific color combination of color A and color B is not particularly limited. As an example of the color combination, a combination in which color A is cyan and color B is magenta may be employed.

The jetting rate pattern shown in FIG. 13 is a pattern of a probability of dot-ON in each pixel, which indicates that the probability of dot-ON is unevenly biased. The probability that a dot of color A and a dot of color B overlap each other is represented by the square of the dot-ON probability, that is, the square of the nozzle jetting rate. The probability that dots of two colors overlap each other is referred to as an "overlap probability". An array pattern of the overlap probabilities indicating a correspondence relationship in which the overlap probabilities of respective pixels are specified for each pixel is referred to as an "overlap probability pattern". The overlap probability pattern may be a chart corresponding to a relationship diagram showing specification of a relationship between a pixel and its overlap probability.

FIG. 14 shows an example of the overlap probability pattern. The overlap probability pattern shown in FIG. 14 is obtained by squaring the nozzle jetting rate of each pixel in the jetting rate pattern shown in FIG. 13. As shown in FIG. 13, it can be understood that the nozzle jetting rate of color A and the nozzle jetting rate of color B are both unevenly biased, and thus, the probability that the dot of color A and the dot of color B overlap each other is also unevenly biased (See FIG. 14). In FIG. 14, pixels with overlap probabilities of "0.00" to "1.00" are unevenly distributed in an image region.

For comparison, FIG. 15 shows an example of a jetting rate pattern in the case of a uniform nozzle jetting rate, and FIG. 16 shows an example of an overlap probability pattern in the case of a uniform nozzle jetting rate. FIG. 15 shows a jetting rate pattern in the case of the uniform nozzle jetting rate shown in the graph Gu displayed by the dotted line in FIG. 8.

FIG. 16 shows an overlap probability pattern in the case of the uniform nozzle jetting rate exemplified in the graph Gu displayed by the dotted line in FIG. 8. It can be understood that the overlap probability pattern in the case of the uniform jetting rate pattern shown in FIG. 15 is a uniform pattern having an overlap probability of "0.52" for all pixels, as shown in FIG. 16.

On the other hand, an average value of the overlap probabilities for the non-uniform overlap probability pattern shown in FIG. 14 is "0.63". That is, the non-uniform nozzle jetting rate has more overlaps between the dots of color A and the dots of color B than in the case of the uniform nozzle jetting rate. This is because in the case of the non-uniform nozzle jetting rate, there are a lot of dot overlaps in pixels with high nozzle jetting rates. As the nozzle jetting rate increases, the dot overlap increases in proportion to the square of the nozzle jetting rate, and thus, the average overlap probability also increases.

In FIG. 13, in a pixel with a nozzle jetting rate of "1.00", the dot of color A and the dot of color B always overlap each other. In the case of the non-uniform nozzle jetting rate, the overlap between the dots of color A and the dots of color B increases. This means that the overlap is likely to decrease in a case where disposition of the dots of color A and disposition of the dots of color B slightly shift at the same time. It should be noted that "the overlap is likely to decrease" does not mean that the overlap necessarily decreases.

FIG. 17 shows an overlap probability pattern in a case where the dot disposition of color B is shifted by one pixel in the main scan direction with respect to the disposition of the dots of color A. Further, FIG. 18 shows an overlap probability pattern in a case where the dot disposition of color B is shifted by one pixel in the sub scan direction with respect to the disposition of the dots of color A. The overlap probability in a case where the dot disposition of the dots of color B is relatively shifted by one pixel with respect to the disposition of the dots of color A is obtained by multiplication of nozzle jetting rates of pixels corresponding to a positional relationship indicating one pixel shifting in the jetting rate pattern.

As is clear from comparison between FIG. 14 and FIG. 17 or comparison between FIG. 14 and FIG. 18, it can be understood that the overlap probability of each pixel in a case where the disposition of the dots of color B is relatively shifted by one pixel with respect to the disposition of the dots of color A greatly changes from a case where the disposition of the dots of color B is not shifted and an average value of the overlap probabilities (average overlap probability) becomes smaller than an overlap probability of "0.52" (FIG. 16) in the case of the uniform nozzle jetting rate.

As shown in FIG. 17, in a case where one pixel shift is performed in the main scan direction, an average value of overlap probabilities becomes "0.42". As shown in FIG. 18, in a case where one pixel shift is performed in the sub scan direction, an average value of overlap probabilities becomes "0.44". On the other hand, in the case of the uniform nozzle jetting rate indicated by the dotted line in FIG. 8, as is clear from FIG. 15, the overlap probability is "0.52" for all pixels, regardless of the presence or absence of the pixel shift in the main scan direction and/or the presence or absence of the pixel shift in the sub scan direction.

In the case of the non-uniform nozzle jetting rate, in a case where the shift amount of the dispositions of the dots of color A and the dots of color B is a shift corresponding to the number of pixels that matches the multiple of the number of paths (in this example, 2) in the main scan direction, and/or in a case where the shift amount of the dispositions of the dots of color A and the dots of color B is a shift corresponding to the number of pixels that matches the multiple of the nozzle pitch (in this example, 2) in the sub scan direction, since the jetting rate patterns of two colors match or are similar to each other, the overlap probability becomes large, and the overlap probability periodically increases or decreases as the shift amount changes.

Further, in the case of the non-uniform nozzle jetting rate, the overlap probability periodically changes in the sub scan direction. However, in the case of the non-uniform nozzle jetting rate shown in the graph G1 of FIG. 8, even though the numerical value of the nozzle jetting rate of each pixel is not uniform in the jetting rate pattern of FIG. 13, an average jetting rate per unit area becomes uniform. Here, the unit area means the area of a unit region formed by the number of paths (number of overlaps) in the main scan direction and the number of pixels corresponding to the nozzle pitch in the sub scan direction. In this example, 2×2 pixels become the unit area.

In a case where the average jetting rate per unit area is not uniform, unevenness naturally occurs. Accordingly, the jetting rate of each nozzle is set so that the average jetting rate per unit area becomes uniform.

However, even though the average jetting rate per unit area is uniform, an average overlap probability per unit area is not uniform. That is, even though the average value of the jetting rates per unit area is uniform, the average value of the squares of the jetting rates per unit area is not uniform. Similarly, an average value per unit area of the multiplication values of the nozzle jetting rates of pixels according to the relative pixel shift in the main scan direction and/or the sub scan direction is not uniform.

FIG. 19 shows an average overlap probability per unit area at each position in the sub scan direction in the case of a non-uniform nozzle jetting rate. A lateral axis in FIG. 19 represents a pixel position in the sub scan direction, and indicates a range of 100 pixels that is a repeating unit in the sub scan direction. A longitudinal axis in FIG. 19 represents an overlap probability.

A graph indicated by a solid line in FIG. 19 shows an average overlap probability per unit area in a case where there is no shift in the dispositions of the dots of color A and color B (FIG. 14). A graph indicated by a dotted line in FIG. 19 shows an average overlap probability per unit area in a case where the disposition of the dots of color A and the disposition of the dots of color B are relatively shifted by one pixel in the main scan direction (FIG. 17). A graph indicated by a dotted chain line in FIG. 19 shows an average overlap probability per unit area in a case where the disposition of the dots of color A and the disposition of the dots of color B are relatively shifted by one pixel in the sub scan direction (FIG. 18).

As can be clearly understood from FIG. 19, the average overlap probability per unit area periodically changes in the sub scan direction. The cycle of the change in the overlap probability and the way of the change vary depending on a scanning method in performing drawing, that is, the nozzle pattern and the nozzle jetting rate of each nozzle.

In the case of the uniform nozzle jetting rate, the overlap probability is "0.52" at all positions, regardless of the shift of the dot disposition in the main scan direction and/or the shift of the dot disposition in the sub scan direction.

In FIG. 14 and FIGS. 17 to 18, an example in which the overlap probability of the dots of color A and color B in the case of the non-uniform nozzle jetting rate, and the average overlap probability per unit area in the case of the uniform nozzle jetting rate (FIG. 16) has been described. Further, in FIG. 14 and FIGS. 17 to 18, an example in which the overlap probability greatly changes due to a slight shift of the dot dispositions of the colors A and B and the overlap probability periodically changes in the sub scan direction has been described (see FIG. 19).

Hereinbefore, the overlap probability that the dots of color A and color B overlap each other has been described, but according to the same principle, it can be understood that a probability that only color A is in a dot-ON state, a probability that only color B is in a dot-ON state, or a probability that both color A and color B are in a dot-OFF state is similarly different from that in the case of the uniform nozzle jetting rate. The dot-ON probability corresponds to a nozzle jetting rate, and the dot-ON probability pattern means a jetting rate pattern. On the other hand, since the dot-OFF probability is a value obtained by subtracting the dot-ON probability from 1, the dot-OFF probability pattern becomes a pattern obtained by subtracting the nozzle jetting rate from 1.

Further, the pattern of the probability that only color A is in the dot-ON state is a pattern obtained by multiplying the value of each pixel of the dot-ON probability pattern by the value of each corresponding pixel of the dot-OFF probability pattern. Here, a case where the dot dispositions of color A and color B are shifted, the pixel of the dot-OFF probability pattern to be multiplied may be relatively shifted with respect to each pixel of the dot-ON probability pattern.

Further, the pattern of the probability that both color A and color B are in the dot-OFF state is a pattern obtained by squaring the value of each pixel of the dot-OFF probability pattern. In a case where the dot dispositions of color A and color B are shifted, values of the shifted pixels may be multiplied in the dot-OFF probability pattern. In this way, by obtaining probability patterns and/or graphs corresponding to FIG. 14 and FIGS. 17 to 19 with respect to the probability that only color A is in the dot-ON state, the probability that only color B is in the dot-ON state, or the probability that both color A and color B are in the dot-OFF state in the case of the non-uniform nozzle jetting rate, it can be understood that the case of the non-uniform nozzle jetting rate and the case of the uniform nozzle jetting rate are different from each other.

[Comparison Based on Specific Examples of Dot Disposition]

FIG. 20 is a diagram showing a specific example of dispositions of dots of color A and color B in the case of the non-uniform nozzle jetting rate shown in the graph G1 indicated by the solid line of FIG. 8. A pattern shown in a leftmost part of FIG. 20 is an example of a dot disposition of color A. A second pattern from the left of FIG. 20 is an example of a dot disposition of color B. A third pattern from the left of FIG. 20 shows a dot-OFF disposition in a case where the dot disposition of color A and the dot disposition of color B overlap each other.

A second pattern from the right of FIG. 20 shows a dot-OFF disposition in a case where the dot disposition of color A and the dot disposition of color B are relatively shifted by one pixel in the main scan direction to overlap each other. A pattern shown in a rightmost part of FIG. 20 shows a dot-OFF disposition in a case where the dot disposition of color A and the dot disposition of color B are relatively shifted by one pixel in the sub scan direction to overlap each other.

Each pattern shown in FIG. 20 corresponds to a disposition chart of dots in the range of 20×20 pixels, in which a black cell represents a dot-ON pixel, and a white cell represents a dot-OFF pixel.

FIG. 21 is a diagram showing a specific example of dispositions of dots of color A and color B in the case of the uniform nozzle jetting rate shown in the graph Gu indicated by the dotted line in FIG. 8. Similar to FIG. 20, each pattern shown in FIG. 21 corresponds to a disposition chart of dots in the range of 20×20 pixels, in which a black cell represents a dot-ON pixel, and a white cell represents a dot-OFF pixel.

A pattern shown in a leftmost part of FIG. 21 is an example of a dot disposition of color A. A second pattern from the left of FIG. 21 is an example of a dot disposition of color B. A third pattern from the left of FIG. 21 shows a dot-OFF disposition in a case where the dot disposition of color A and the dot disposition of color B overlap each other.

A second pattern from the right of FIG. 21 shows a dot-OFF disposition in a case where the dot disposition of color A and the dot disposition of color B are relatively shifted by one pixel in the main scan direction to overlap each other. A pattern shown in a rightmost part of FIG. 21 shows a dot-OFF disposition in a case where the dot disposition of color A and the dot disposition of color B are relatively shifted by one pixel in the sub scan direction to overlap each other.

As shown in FIG. 21, in the case of the uniform nozzle jetting rate, the number of dot-OFF pixels nearly does not change, regardless of the presence or absence of the relative shift of the dot dispositions between colors of color A and color B. On the other hand, as shown in FIG. 20, in the case of the non-uniform nozzle jetting rate, the number of dot-OFF pixels in a case where there is no relative shift between colors is larger than that in the case of the uniform nozzle jetting rate. Further, in a case where the relative positional relationship between the colors slightly shifts, the number of dot-OFF pixels greatly decreases and the number of dot-OFF pixels becomes smaller than that in the case of the uniform nozzle jetting rate.

At the same time, this shows that in the case of the non-uniform nozzle jetting rate, the number of pixels where the dots of color A and color B overlap each other in a case where there is no relative position shift between colors is larger than that in the case of the uniform nozzle jetting rate, and in a case where the relative positional relationship between the colors is slightly shifted, the number of pixels where the dots of color A and color B overlap each other is greatly reduced and the number of pixels where the dots overlap each other becomes smaller than that in the case of the uniform nozzle jetting rate.

According to the above-description, it can be shown that in a case where the nozzle jetting rate of each nozzle is unevenly biased, the probability that each pixel is in the dot-ON state or the probability that each pixel is in the dot-OFF state is unevenly biased, and as a result, the probability that the dispositions of two colors of color A and color B overlap each other changes compared with the case of the uniform nozzle jetting rate, and the probability of the overlap greatly changes and the probability of the overlap periodically changes in the sub scan direction, due to a slight relative shift in the dispositions of color A and color B.

Further, as well as "the probability of the overlap" (overlap probability) that is the probability that two colors A and B are in the dot-ON state, it can be shown that any one of the probability that only one of two colors is in the dot-ON state and the probability that both the two colors are in the dot-OFF state also changes compared with the case of the uniform nozzle jetting rate, and the probability greatly changes and the probability periodically changes in the sub scan direction, due to a slight relative shift in the dispositions of color A and color B.

As a result, in a case where at least one of two colors of color A or color B is a chromatic color, color unevenness occurs. That is, as the probability that the dispositions of the dots of the color A and the color B overlap each other changes in the sub scan direction, unevenness in which the colors change in the sub scan direction occurs. Further, in a case where there is shift in the dot dispositions of two colors in the main scan direction and/or the sub scan direction and the shift amount changes in the main scan direction and/or the sub scan direction, the probability that the dot dispositions of the two colors overlap each other changes in accordance with the change in the shift amount, and as a result, unevenness of color change occurs.

This is not limited to the probability that two color dots overlap each other, and with respect to any one of the probability that only one of the two colors is in the dot-ON state and the probability that both the two colors are in the dot-OFF state, similarly, as each probability changes in the sub scan direction, unevenness in which the colors change in the sub scan direction occurs. Further, in a case where there is a shift in the dot dispositions of two colors in the main scan direction and/or the sub scan direction and the shift amount changes in the main scan direction and/or the sub scan direction, the probability that only one of the dot dispositions of two colors is in the dot-ON state and the probability that both the two colors are in the dot-OFF state respectively change in accordance with the change in the shift amount, and as a result, unevenness of color change occurs. In this way, in a case where at least one of two colors is a chromatic color, color unevenness may occur.

[Combinations of 3 colors or more] In the above description, an example in which in a case where the nozzle jetting rate is not uniform, the probability that the dot dispositions of two colors overlap each other in the sub scan direction changes to cause color unevenness, and in a case where the nozzle jetting rate is not uniform, the overlapping probability changes due to a shift in the dot dispositions of the two colors to cause color unevenness has been described.

Similarly, an example in which in a case where the nozzle jetting rate is not uniform, the overlap probability of dispositions of three or more colors changes in the sub scan direction, and the overlap probability changes due to a relative shift of the dot dispositions of three or more colors may be described.

First, with respect to dot dispositions of three or more colors, a pattern of an overlap probability in a desired combination of dot-ON and dot-OFF may be calculated from a pattern obtained by multiplying a value of each pixel of a jetting rate pattern by a value of each pixel of a pattern obtained by subtracting a jetting rate from 1 three or more times in the desired combination (by the same number of times as the number of colors).

For example, in the case of three colors of color A, color B, and color C, a pattern of a probability that color A and color B are in the dot-ON state and color C is in the dot-OFF state may be calculated by multiplying a value of each pixel of a jetting rate pattern corresponding to dot-ON of color A by a value of each pixel of a jetting rate pattern corresponding to dot-ON of color B, and multiplying the result by a "value of each pixel of a pattern obtained by subtracting a jetting rate from 1", corresponding to dot-OFF of color C.

In this case, in a case where the dot dispositions of three colors are shifted, values of shifted pixels may be multiplied. For example, in a case where the dot dispositions of color A and color B are shifted by one pixel in the main scan direction, in multiplying values of respective pixels of the jetting rate pattern corresponding to the dot-ON of color A and the jetting rate pattern corresponding to the dot-ON of color B, values of the pixels that are shifted by one pixel in the main scan direction may be multiplied. From the pattern of the overlap probability of dot-ON or dot-OFF of dot dispositions of three or more colors obtained in this way, it is possible to check a change in the overlap probability of the dot dispositions or three or more colors in the sub scan direction or a change in the overlap probability due to shift of the dot dispositions of three or more colors, and as a result, it can be understood that the overlap probability changes in a similar way to the case of two colors.

In the case of a plurality of colors of three or more colors, since the overlap probability of dot dispositions of any two colors of the plurality of colors changes and the overlap probability of dot dispositions of three or more colors also changes, similar to the case of two colors, color unevenness occurs. In a case where one color among the three or more colors includes a chromatic color, color unevenness may occur.

Outline of Embodiments of the Invention

According to embodiments of the invention, there is provided a technique for reducing banding and color unevenness in a method for reflecting jetting rates of respective nozzles in input gradation values in halftone processing to control jetting of the respective nozzles. For example, with respect to ink of a relatively dark color among multiple color inks used for image recording, for example, with respect to black in a case where ink of four colors of C, M, Y, and K is used, it is necessary to suppress a nozzle jetting rate of an end part nozzle in order to suppress banding.

However, with respect to a relatively light color among multiple color inks, even though the nozzle jetting rate of the end part nozzle is not suppressed as much as the dark color, banding is not noticeable in reality. On the other hand, for chromatic colors, there is a risk that color unevenness occurs as the nozzle jetting rate of the end part nozzle is suppressed to increase a difference from the nozzle jetting rate of the central nozzle, that is, as the nozzle jetting rate becomes non-uniform.

Accordingly, for example, in the case of a lighter color than black, such as cyan, magenta, or yellow, banding is not noticeable even though the nozzle jetting rate of the end part nozzle is not suppressed to be as low as black, and there is a room for increasing the nozzle jetting rate of the end part nozzle. Further, in a case where there is a risk that color unevenness occurs when overlapping with other colors in a case where the nozzle jetting rate of the end part nozzle is kept low like black since it is a chromatic color, by making a jetting rate of each nozzle of at least one color among cyan, magenta, and yellow close to a uniform nozzle jetting rate by increasing the jetting rate of the end part nozzle compared with black, it is possible to reduce banding and color unevenness.

With respect to the problem of color unevenness, as the jetting rate of each nozzle becomes uniform, it is likely that the probability that each pixel is in the dot-ON state (jetting rate pattern) or the probability that each pixel is in the dot-OFF state (pattern obtained by subtracting the jetting rate from 1) is nearly uniform, and the probability that dispositions of respective colors overlap each other also becomes uniform, and thus, color unevenness is reduced.

FIG. 22 is a graph showing an example of a nozzle jetting rate applied to an embodiment of the invention. It is shown that a nozzle jetting rate shown in a graph G2 indicated by a dotted chain line in FIG. 22 is larger than a nozzle jetting rate shown in a graph G1 indicated by a solid line in FIG. 22, in a jetting rate of an end nozzle, and is close to a uniform nozzle jetting rate (graph G3). That is, the nozzle jetting rate shown in the graph G2 is smaller than the nozzle jetting rate shown in the graph G1 in a difference between the nozzle jetting rate of the end part nozzle and the nozzle jetting rate of the central nozzle, and is close to a uniform nozzle jetting rate.

The graph G1 of the nozzle jetting rate indicated by the solid line in FIG. 22 is the same as the graph G1 of the nozzle jetting rate indicated by the solid line in FIG. 8. The graph G3 of a nozzle jetting rate indicated by a dotted line in FIG. 22 is the same as the graph Gu of the nozzle jetting rate indicated by the dotted line in FIG. 8.

Focusing on the graph G2 and the graph G3, the nozzle jetting rate shown in the graph G2 is a nozzle jetting rate in which the nozzle jetting rate of the end part nozzle is suppressed to be lower than the nozzle jetting rate of the central nozzle. The nozzle jetting rate shown in the graph G3 is a nozzle jetting rate in which the difference between the nozzle jetting rate of the end part nozzle and the nozzle jetting rate of the central nozzle is small compared with the nozzle jetting rate shown in the graph G2.

Focusing on the graph G1 and the graph G3, the nozzle jetting rate shown in the graph G1 is a nozzle jetting rate in which the nozzle jetting rate of the end part nozzle is suppressed to be lower than the nozzle jetting rate of the central nozzle. The nozzle jetting rate shown in the graph G3 is a nozzle jetting rate in which the difference between the nozzle jetting rate of the end part nozzle and the nozzle jetting rate of the central nozzle is small compared with the nozzle jetting rate shown in the graph G1.

The nozzle jetting rate shown in the graph G1 among the graphs G1, G2, and G3 has the lowest nozzle jetting rate of the end nozzle.

The nozzle jetting rate shown in the graph G1 among the graphs G1, G2, and G3 has the largest difference between the nozzle jetting rate of the end part nozzle and the nozzle jetting rate of the central nozzle.

The nozzle jetting rate shown in the graph G3 among the graphs G1, G2, and G3 has the highest nozzle jetting rate of the end nozzle.

The nozzle jetting rate shown in the graph G3 among the graphs G1, G2, and G3 has the smallest difference between the nozzle jetting rate of the end part nozzle and the nozzle jetting rate of the central nozzle.

For example, in the case of a four-color system of cyan, magenta, yellow, and black, the nozzle jetting rate shown in the graph G1 is set as a jetting rate of each nozzle in a nozzle row for jetting black ink, and the nozzle jetting rate shown in the graph G2 is set as a jetting rate of each nozzle of at least one color among cyan, magenta, or yellow.

<Example in a Case where Both Jetting Rates of Respective Nozzles of Two Colors Match Nozzle Jetting Rate of the Graph G2>

For example, among cyan, magenta, and yellow, the nozzle jetting rates of the respective nozzles for cyan and magenta are set to the nozzle jetting rate shown in the graph G2 of FIG. 22, and the nozzle jetting rates of the nozzles for yellow are set to the nozzle jetting rate shown in the graph G3 of FIG. 22.

FIG. 23 shows a jetting rate pattern corresponding to 10×10 pixels in a case where the nozzle jetting rate shown in graph G2 of FIG. 22 is applied. FIG. 23 shows a jetting rate pattern obtained by applying the nozzle jetting rate shown in the graph G2 of FIG. 22 to the nozzle pattern shown in FIG. 12.

FIG. 24 shows an overlap probability pattern of two colors of cyan and magenta. The overlap probability pattern shown in FIG. 24 is a pattern having a value obtained by squaring the value of each pixel in the jetting rate pattern shown in FIG. 23.

FIG. 25 shows an overlap probability pattern in a case where the dot dispositions of two colors of cyan and magenta are shifted by one pixel in the main scan direction. FIG. 26 shows an overlap probability pattern in a case where the dot dispositions of two colors of cyan and magenta are shifted by one pixel in the sub scan direction.

From comparison between FIGS. 24 and 14, it can be obviously understood that the nozzle jetting rate (graph G2) indicated by the dotted chain line of FIG. 22 has a smaller difference between overlap probabilities of respective pixels, compared with the case of the nozzle jetting rate (graph G1) indicated by the solid line of FIG. 22. In the overlap probability pattern shown in FIG. 24, it can be understood that the overlap probability of respective pixels may be any value from 0.18 to 0.71. On the other hand, in the overlap probability pattern shown in FIG. 14, the overlap probability of respective pixels is any value from 0.00 to 1.00.

Further, from comparison between FIGS. 24 to 26 in a case where the nozzle jetting rate (graph G2) indicated by the dotted chain line of FIG. 22 is employed, and FIGS. 14, 17, and 18 in a case where the nozzle jetting rate (graph G1) indicated by the solid line of FIG. 22 is employed, it can be obviously understood the nozzle jetting rate (graph G2) indicated by the dotted chain line of FIG. 22 has a smaller difference between average overlapping probabilities due to a slight shift in the main scan direction and/or the sub scan direction, compared with the case of the nozzle jetting rate (graph G1) indicated by the solid line of FIG. 22.

In an overlap probability pattern of FIG. 24 corresponding to a case where there is no shift in dot dispositions of two colors, an average overlap probability per unit area is 0.54. In an overlap probability pattern of FIG. 25 corresponding to a case where dot dispositions of two colors are shifted by one pixel in the main scan direction, an average overlap probability per unit area is 0.50. In an overlap probability pattern of FIG. 26 corresponding to a case where dot dispositions of two colors are shifted by one pixel in the sub scan direction, an average overlap probability per unit area is 0.51.

FIG. 27 is a graph showing an average overlap probability per unit area at each position in the sub scan direction in a case where a nozzle jetting rate (graph G2) indicated by a dotted chain line of FIG. 22 is employed. A lateral axis of FIG. 27 represents a pixel position in the sub scan direction, and a longitudinal axis thereof represents an overlap probability. A graph indicated by a solid line of FIG. 27 represents an average overlap probability per unit area in a case where there is no shift in dot dispositions of two colors (in the case of FIG. 24). A graph indicated by a dotted line of FIG. 27 represents an average overlap probability per unit area in a case where dot dispositions of two colors are shifted by one pixel in the main scan direction (in the case of FIG. 25). A graph indicated by a dotted chain line of FIG. 27 represents an average overlap probability per unit area in a case where dot dispositions of two colors are shifted by one pixel in the sub scan direction (in the case of FIG. 26).

From comparison between FIGS. 27 and 19, it can be obviously understood that the nozzle jetting rate indicated by the dotted chain line of FIG. 22 (graph G2) has a smaller change in the average overlap probability in the sub scan direction compared with the case of the nozzle jetting rate (graph G1) indicated by the solid line of FIG. 22 and becomes close to the value "0.52" (FIG. 16) of the average overlap probability in the case of the uniform nozzle jetting rate.

<In a Case where Nozzle Jetting Rates of Two Colors are Different>

In a case where a nozzle jetting rate of one color among two colors is the nozzle jetting rate indicated by the solid line of FIG. 22 and a nozzle jetting rate of the other color is the nozzle jetting rate indicated by the dotted chain line of FIG. 22, similarly, the overlap probability becomes close to be uniform compared with the overlap probability in a case where the nozzle jetting rates of both the two colors match the nozzle jetting rate indicated by the solid line of FIG. 22.

FIG. 28 shows an overlap probability pattern corresponding to 10×10 pixels in a case where a nozzle jetting rate of one color among two colors is the nozzle jetting rate shown in the graph G1 of FIG. 22 and a nozzle jetting rate of the other color is the nozzle jetting rate shown in the graph G2 of FIG. 22.

The overlap probability pattern in FIG. 28 is obtained by multiplying a value of each pixel of a nozzle jetting rate pattern obtained by applying the nozzle jetting rate shown in the graph G1 of FIG. 22 to the nozzle pattern in FIG. 12 by a value of a corresponding pixel of a nozzle jetting rate pattern obtained by applying the nozzle jetting rate shown in the graph G2 of FIG. 22 to the nozzle pattern in FIG. 12.

FIG. 29 shows an overlap probability pattern in a case where dot dispositions of two colors are shifted by one pixel in the main scan direction. FIG. 30 shows an overlap probability pattern in a case where dot dispositions of two colors are shifted by one pixel in the sub scan direction. The overlap probability pattern in a case where the dot dispositions of two colors are shifted in the main scan direction or the sub scan direction is obtained by multiplying values of corresponding pixels of a shifted positional relationship, in a jetting rate pattern obtained by applying the nozzle jetting rate shown in the graph G1 of FIG. 22 to the nozzle pattern of FIG. 12 and a jetting rate pattern obtained by applying the nozzle jetting rate shown in the graph G2 of FIG. 22 to the nozzle pattern of FIG. 12.

FIG. 31 is a graph showing an average overlap probability per unit area at each position in the sub scan direction. A lateral axis of FIG. 31 represents a pixel position in the sub scan direction, and a longitudinal axis thereof represents an overlap probability. A graph indicated by a solid line of FIG. 31 represents an average overlap probability per unit area in a case where there is no shift in dot dispositions of two colors (in the case of FIG. 28). A graph indicated by a dotted line of FIG. 31 represents an average overlap probability per unit area in a case where dot dispositions of two colors are shifted by one pixel in the main scan direction (in the case of FIG. 29). A graph indicated by a dotted chain line of FIG. 31 represents an average overlap probability per unit area in a case where dot dispositions of two colors are shifted by one pixel in the sub scan direction (in the case of FIG. 30).

In the overlap probability pattern shown in FIG. 28, an overlap probability of each pixel has a certain value from 0.00 to 0.84. Further, in the overlap probability pattern shown in FIG. 28 corresponding to a case where there is no shift in dot dispositions of two colors, an average overlap probability per unit area is 0.56. In the overlap probability pattern shown in FIG. 29 corresponding to a case where dot dispositions of two colors are shifted by one pixel in the main scan direction, an average overlap probability per unit area is 0.48. In the overlap probability pattern shown in FIG. 30 corresponding to a case where dot dispositions of two colors are shifted by one pixel in the sub scan direction, an average overlap probability per unit area is 0.48.

According to the examples shown in FIG. 28 to FIG. 31, it can be understood that the overlap probabilities are slightly not uniform compared with the overlap probability in the case of the nozzle jetting rate (graph G2) shown in the dotted chain line of FIG. 22 with respect to both two colors, and are more uniform than the overlap probability in the case of the nozzle jetting rate (graph G1) shown in the solid line of FIG. 22 with respect to both two colors.

«Specific Examples of Dot Disposition»

FIG. 32 is a diagram showing an example of dot dispositions in a case where both nozzle jetting rates of two colors match the nozzle jetting rate (graph G2) indicated by the dotted chain line of FIG. 22. A pattern shown in a leftmost part of FIG. 32 is an example of a dot disposition of color A. A second pattern from the left of FIG. 32 is an example of a dot disposition of color B. A third pattern from the left of FIG. 32 shows a dot-OFF disposition in a case where the dot disposition of color A and the dot disposition of color B overlap each other.

A second pattern from the right of FIG. 32 shows a dot-OFF disposition in a case where the dot disposition of color A and the dot disposition of color B are relatively shifted by one pixel in the main scan direction to overlap each other. A pattern shown in a rightmost part of FIG. 32 shows a dot-OFF disposition in a case where the dot disposition of color A and the dot disposition of color B are relatively shifted by one pixel in the sub scan direction to overlap each other.

FIG. 33 is a diagram showing an example of dot dispositions in a case where a nozzle jetting rate of one color among two colors is the nozzle jetting rate indicated by a solid line in the graph G1 of FIG. 22 and a nozzle jetting rate of the other color is the nozzle jetting rate indicated by a dotted chain line in the graph G2 of FIG. 22. A pattern shown in a leftmost part of FIG. 33 is an example of a dot disposition of color A. A second pattern from the left of FIG. 33 is an example of a dot disposition of color B. A third pattern from the left of FIG. 33 shows a dot-OFF disposition in a case where the dot disposition of color A and the dot disposition of color B overlap each other.

A second pattern from the right of FIG. 33 shows a dot-OFF disposition in a case where the dot disposition of color A and the dot disposition of color B are relatively shifted by one pixel in the main scan direction to overlap each other. A pattern shown in a rightmost part of FIG. 33 shows a dot-OFF disposition in a case where the dot disposition of color A and the dot disposition of color B are relatively shifted by one pixel in the sub scan direction to overlap each other.

Each pattern shown in FIG. 32 and FIG. 33 corresponds to a disposition chart of dots in the range of 20×20 pixels, in which a black cell represents a dot-ON pixel, and a white cell represents a dot-OFF pixel.

In both of the example shown in FIG. 32 and the example shown in FIG. 33, it can be understood that a difference in the number of dot-OFF pixels due to shift of dot dispositions of two colors is small, compared with the example shown in FIG. 20. The example shown in FIG. 20 shows a case where both nozzle jetting rates of two colors match the nozzle jetting rate (graph G1) indicated by the solid line in FIG. 22.

As described above, by making a jetting rate of each nozzle of at least one color that is a chromatic color close to a uniform nozzle jetting rate by increasing a jetting rate of an end nozzle compared with an achromatic black color, it is possible to reduce banding and color unevenness.

«Configuration Example of Image Processing Apparatus»

In this embodiment, an example in which jetting rates of respective nozzles are controlled by reflecting the jetting rates of the respective nozzles in input gradation values in halftone processing to perform the halftone processing with respect to the gradation values in which the jetting rates are reflected and performing jetting from the respective nozzles in accordance with a halftone processing result will be described.

FIG. 34 is a block diagram showing functions of an image processing apparatus according to an embodiment of the invention. An image processing apparatus 200 has a function of selectively using data on plural types of nozzle jetting rates in accordance with color types of image data and performing halftone processing for data on a continuous-tone image of each color. The functions of the image processing apparatus 200 shown in FIG. 34 may be incorporated in the control device 102 (see FIG. 5) of the ink jet recording apparatus 10. The image processing section 110 shown in FIG. 5 corresponds to the image processing apparatus 200.

The image processing apparatus 200 performs halftone processing after converting gradation values using a nozzle jetting rate A with respect to image data of black that is an achromatic color having a high density. The image processing apparatus 200 performs halftone processing after converting gradation values using a nozzle jetting rate B with respect to image data of respective colors of magenta and cyan that are chromatic colors having a lighter density compared with black. The image processing apparatus 200 performs halftone processing after converting gradation values using a nozzle jetting rate C with respect to image data of yellow that is a chromatic color having an extremely lighter density, compared with black.

The nozzle jetting rate A is a nozzle jetting rate in which a nozzle jetting rate of an end nozzle of a nozzle row is suppressed to be low in order to suppress banding, as in the graph G1 indicated by the solid line of FIG. 22.

The nozzle jetting rate B is a nozzle jetting rate in which a jetting rate of an end nozzle is made to be close to a jetting rate of a central nozzle (close to a uniform nozzle jetting rate compared with the graph G1) in order to suppress color unevenness while suppressing banding to some extent, as in the graph G2 indicated by the dotted chain line of FIG. 22.

The nozzle jetting rate C is a uniform nozzle jetting rate in which a jetting rate of each nozzle in a nozzle row is constant, as in the graph G3 shown in the dotted line of FIG. 22. Here, since yellow has little contribution to banding, the nozzle jetting rate C may be used.

In the case of this example, focusing on the graphs G1 and G2, the nozzle jetting rate of the graph G1 corresponds to a "first nozzle jetting rate", and the nozzle jetting rate of the graph G2 corresponds to a "second nozzle jetting rate". Alternatively, focusing on the graphs G2 and G3, the nozzle jetting rate of the graph G2 corresponds to the "first nozzle jetting rate", and the nozzle jetting rate of the graph G3 corresponds to the "second nozzle jetting rate". Alternatively, focusing on the graphs G1 and G3, the nozzle jetting rate of the graph G1 corresponds to the "first nozzle jetting rate", and the nozzle jetting rate of the graph G3 corresponds to the "second nozzle jetting rate".

A method for controlling recording of dots by reflecting jetting rates of respective nozzles in input gradation values in halftone processing is disclosed in JP2016-043651A, for example. In the embodiment of the invention, the method disclosed in the JP2016-043651A is used.

The image processing apparatus 200 includes an image data acquiring section 202, a color converting section 204, a nozzle pattern determining section 205, a jetting rate selecting section 206, a nozzle jetting rate storing section 208, a gradation value converting section 210, a halftone processing section 212, and a data output section 214. The functions of the image processing apparatus 200 may be realized by a combination of hardware and software of a computer. The image processing apparatus 200 executes the control program 140 stored in the information storing section 124 to function as the image data acquiring section 202, the color converting section 204, the nozzle pattern determining section 205, the jetting rate selecting section 206, the nozzle jetting rate storing section 208, the gradation value converting section 210, the halftone processing section 212, and the data output section 214.

The image data acquiring section 202 is an input interface that takes in image data that is a printing target. The image data acquiring section 202 may be configured by a data input terminal that takes in image data from an external signal processing or another signal processing unit in the apparatus. As the image data acquiring section 202, a wired or wireless communication interface may be employed, a media interface that performs reading and writing with respect to an external storage medium (removable disk) such as a memory card, or an appropriate combination thereof may be employed. The image data acquiring section 202 may be the image input interface 126 described with reference to FIG. 5.

The color converting section 204 performs a color converting process with respect to input image data. The color converting section 204 performs a process of converting image data of respective color bits of RGB into 8 bit-image data of respective colors of CMYK, for example. Here, R in the RGB notation represents red. G represents green. B represents blue.

The color converting section 204 performs a color converting process of image data using a color profile that conforms to the ICC profile format based on the International Color Consortium (ICC), to thereby generate a color image signal that is suitable for an output from the ink jet recording apparatus 10. In a case where four-color ink of CMYK is used in the ink jet recording apparatus 10, image data of CMYK is generated by the color converting section 204. Further, in a case where six-color ink including light magenta (LM) and light cyan (LC) in addition to CMYK is used, image data including respective color components of CMYK, and LM and LC is generated by the color converting section 204. The color converting section 204 performs a separation process of separating input image data into image data of each color of ink used in the ink jet recording apparatus 10. The color converting section 204 outputs image data 240 of respective colors after the color converting process to the gradation value converting section 210.

In a case where CMYK image data is input from the image data acquiring section 202, a color conversting process of converting RGB to CMYK in the color converting section 204 may not be performed. Further, although not shown, a gradation transformation process may be performed with respect to the image data after the color converting process so as to have color development characteristics defined by the ink jet recording apparatus 10.

The nozzle pattern determining section 205 determines a nozzle pattern indicating which one of the respective nozzles 62 of the recording head 24 records each pixel of an image to be recorded on the recording medium 12 using the recording head 24 on the basis of image data input through the image data acquiring section 202.

The nozzle pattern determining section 205 discriminates a scan pattern in relatively moving the recording head 24 in the main scan direction and the sub scan direction with respect to the recording medium 12, with reference to a scan pattern program 142 in the information storing section 124.

Since the scan pattern program 142 defines a reciprocating scan of the recording head 24 in the main scan direction with respect to the recording medium 12 that is intermittently transported in the sub scan direction or the number of paths, it is possible to discriminate the scan pattern of the recording head 24 from the scan pattern program 142. Accordingly, it is possible to determine which one of the nozzles 62 of the recording head 24 records each pixel of the image indicated by the image data on the recording medium 12 on the basis of the scan pattern using. The nozzle pattern determining section 205 determines the nozzle pattern on the basis of the scan pattern of the recording head 24, and outputs a nozzle pattern determination result to the gradation value converting section 210.

The method for determining the nozzle pattern is not limited to the method for performing the determination on the basis of the scan pattern program 142, and variously known methods may be used. Further, the nozzle pattern may be determined whenever the image recording process is performed, but the nozzle pattern may be determined in a case where the ink jet recording apparatus 10 is operated for the first time and may be retained in the information storing section 124 together with the scan pattern program 142, or may be stored in the information storing section 124 in advance. That is, since the nozzle pattern may be determined by the scan pattern program 142 regardless of an image, the nozzle pattern may be stored in the information storing section 124 together with the scan pattern program 142 in advance.

The jetting rate selecting section 206 performs a process of selecting a nozzle jetting rate to be applied to the gradation value converting section 210 from the plural kinds nozzle jetting rates of the nozzle jetting rate A, the nozzle jetting rate B, and the nozzle jetting rate C stored in the nozzle jetting rate storing section 208. The jetting rate selecting section 206 is an example of a "nozzle jetting rate selecting section".

The jetting rate selecting section 206 selects the nozzle jetting rate A, the nozzle jetting rate B, or the nozzle jetting rate C in accordance with color types of image data to be binarized. The jetting rate selecting section 206 selects the nozzle jetting rate A with respect to image data of black. The jetting rate selecting section 206 selects the nozzle jetting rate B with respect to image data of cyan and magenta. The jetting rate selecting section 206 selects the nozzle jetting rate C with respect to image data of yellow.

The nozzle jetting rate storing section 208 is a storage device that stores data of plural kinds of nozzle jetting rates including the nozzle jetting rate A, the nozzle jetting rate B, and the nozzle jetting rate C. The nozzle jetting rate storing section 208 is configured to include a storage device such as a hard disk device and/or a memory.

Data of the nozzle jetting rate selected by the jetting rate selecting section 206 is read out from the nozzle jetting rate storing section 208, and is sent to the gradation value converting section 210.

The gradation value converting section 210 reflects nozzle jetting rates of nozzles 62 for recording respective pixels for each gradation value of the respective pixels in the image data 240 of the respective colors of C, M, Y, and K input from the color converting section 204, and converting the gradation values of the respective pixels, to thereby generate jetting rate-reflected image data of each color. The gradation values of the respective pixels refer to digital signal values indicating gradations of the respective pixels, that is, values of pixels, which are synonymous with "pixel values".

The gradation value converting section 210 converts gradation values of respective pixels of image data on the basis of a nozzle pattern input from the nozzle pattern determining section 205 and data of a nozzle jetting rate selected by the jetting rate selecting section 206 to generate jetting rate-reflected image data.

The gradation value converting section 210 includes a jetting rate pattern generating section 216 and a conversion calculating section 218. The jetting rate pattern generating section 216 generates a jetting rate pattern obtained by developing a nozzle jetting rate selected by the jetting rate selecting section 206 into a nozzle pattern.

The conversion calculating section 218 performs calculation of reflecting a jetting rate of a nozzle that records each pixel in a gradation value of each pixel (calculation of multiplying the gradation value of each pixel by the jetting rate of the nozzle that records the pixel, for example), using the jetting rate pattern, with respect to image data of the respective colors of C, M, Y, and K input from the color converting section 204, and converts the obtained value into a gradation value. Image data after conversion in which the gradation values are converted by the gradation value converting section 210 is referred to as "jetting rate-reflected image data".

In this embodiment, in generating jetting rate-reflected image data, a gradation value converting process of reflecting different jetting rates in respective colors is performed, with respect to at least two colors among a plurality of colors. In the gradation value converting process, it is necessary that duties do not change before and after the reflection of the jetting rates. That is, it is necessary that duties of the respective colors are the same before and after reflecting the jetting rates in the gradation values. It is possible to form a calculation algorithm in which the duties change before and after the reflection of the jetting rates, but since the calculation process becomes excessively complicated, herein, a method for setting the duties not to change before and after the reflection of the jetting rates is employed.

In this embodiment, the gradation value converting process of reflecting jetting rates for respective colors that are control targets in input gradation values in halftone processing for the respective colors is performed so that the nozzle jetting rate of each nozzle becomes the jetting rate shown in FIG. 22 for each color, but a nozzle jetting rate shown in FIG. 35 is used, instead of the nozzle jetting rate shown in FIG. 22, so that the duties do not change before and after reflecting the jetting rates in the gradation values.

A graph G11 indicated by a solid line of FIG. 35 represents nozzle jetting rate data corresponding to the graph G1 indicated by the solid line of FIG. 22. A graph G22 indicated by a dotted chain line of FIG. 35 represents nozzle jetting rate data corresponding to the graph G2 indicated by the dotted chain line of FIG. 22. A graph G33 indicated by a dotted line of FIG. 35 represents nozzle jetting rate data corresponding to the graph G3 indicated by the dotted line of FIG. 22. Compared with the nozzle jetting rate data shown in the graph G1, G2, and G3 of FIG. 22, the nozzle jetting rate data shown in the graph G11, G22, and G33 of FIG. 35 has different numerical values of jetting rates, but has the same relative ratio of the jetting rate of each nozzle in the nozzle row, in which the relative jetting rates are equivalent.

Under the condition that duties do not change before and after reflecting jetting rates in input gradation values in halftone processing, in a case where the jetting rate is uniform as indicated by the dotted line (graph G3) of FIG. 22, a jetting rate of "1.0" may be reflected in all nozzles, as indicated by the dotted line (graph G33) of FIG. 35.

Further, in a case where the jetting rate of the end part nozzle is suppressed (to be smaller than) compared with the jetting rate of the central nozzle as shown by the solid line (graph G1) or the dotted chain line (graph G2) in FIG. 22, as shown in the solid line (graph G11) or the dotted chain line (graph G22) of FIG. 35, the jetting rate to be reflected in the end part nozzle is set to be smaller than "1.0", and the jetting rate to be reflected in the central nozzle is set to be larger than "1.0".

In order not to change the duty before and after the jetting rate is reflected in the input gradation value, a value of each nozzle jetting rate may be converted according to the following Equation 1.

$$\frac{Li}{\text{AVERAGE}(L1, L2, L3 \ldots Ln)} \quad \text{[Equation 1]}$$

Li in Equation 1 represents a jetting rate of a nozzle having a nozzle number "i". AVERAGE (L1, L2, L3, . . . , Ln) represents an average value of L1, L2, . . . , Ln. n is the number of nozzles. In the examples of FIGS. 22 and 35, n is 50.

In a case where the jetting rates of the respective nozzles shown in FIG. 22 are converted according to Equation 1, the jetting rates of the respective nozzles shown in FIG. 35 are obtained. Here, regardless of absolute values of the respective nozzle jetting rates before conversion, the respective nozzle jetting rates after conversion become the same value. That is, in a case where the ratios of the relative jetting rates of the respective nozzles are the same, the respective nozzle jetting rates after conversion based on Equation 1 become the same value.

FIG. 36 is a diagram illustrating a jetting rate-reflected image data generating process using the gradation value converting section 210. As shown in FIG. 36, the gradation value converting section 210 first compares a nozzle pattern 230 with nozzle jetting rate data L to obtain a jetting rate pattern 234.

In the example of FIG. 36, the nozzle jetting rate data shown in the graph G11 of FIG. 35 is used as the nozzle jetting rate data L. The nozzle pattern 230 shown in FIG. 36 is the nozzle pattern shown at the right view of FIG. 12. In FIG. 36, for ease of illustration, only a range of 5×10 pixels that is a part of the nozzle pattern 230 is shown.

The jetting rate pattern 234 shown in FIG. 36 is obtained by specifying a nozzle jetting rate corresponding to each nozzle number of the nozzle pattern 230 from the graph G11 of FIG. 35. In FIG. 36, each cell numbered in the jetting rate pattern 234 represents each pixel of an image, and a numeral in each cell represents a nozzle jetting rate of the nozzle 62 for performing recording of the pixel. In FIG. 36, values of jetting rates are rounded to the fifth decimal place, and are shown up to the fourth decimal place. In the nozzle jetting rate data L corresponding to the graph G11 of FIG. 35, nozzle jetting rates of a nozzle number 0, a nozzle number 1, a nozzle number 2, . . . , a nozzle number 16, . . . , a nozzle number 38, . . . , and so on are respectively set to "0", "0.1068", "0.2137", . . . , "1.3889", . . . , "1.1752", . . . , and so on. On the basis of the jetting rate pattern 234, a nozzle jetting rate of each pixel of the image data 240 is determined.

Then, the gradation value converting section 210 multiplies a gradation value of each pixel of the image data 240 by a nozzle jetting rate of the jetting rate pattern 234 corresponding to each pixel to convert the gradation value of each pixel of the image data 240, to thereby generate jetting rate-reflected image data 250.

In the example of FIG. 36, in order to facilitate understanding of the gradation value converting process, image data in which the gradation values of all pixels in the image data 240 are "20" is shown. The image data 240 is image data corresponding to black, for example.

The jetting rate-reflected image data 250 shown in FIG. 36 is image data obtained by multiplying the gradation value "20" of each pixel of the image data 240 by the jetting rate of the jetting rate pattern 234 and performing rounding to the first decimal place. In the jetting rate-reflected image data 250 shown in FIG. 36, each numbered cell represents each pixel of an image, and a numeral in each cell represents a gradation value of a pixel after gradation value conversion.

For example, since a nozzle jetting rate of the nozzle 62 with the nozzle number 0 is "0", the gradation value converting section 210 converts gradation values of pixels recorded by the nozzle 62 with the nozzle number 0 from "20" to "0" (=20×0). Further, since a nozzle jetting rate of the nozzle 62 with the nozzle number 1 is "0.1068", the gradation value converting section 210 converts gradation values of pixels recorded by the nozzle 62 with nozzle number 1 from "20" to "2". In a case where the gradation value "20" of the pixel is multiplied by "0.1068", "2.136" is obtained, but since a numerical value after conversion by the gradation value converting section 210 is expressed as an integer value in a range of "0 to 255" in the case of 8-bit gradation, the first decimal place of "2.136" is rounded to be an integer value to obtain a converted gradation value "2".

Similarly, gradation values of pixels recorded by the nozzles 62 with other nozzle numbers are converted by multiplying the nozzle jetting rates. The gradation value converting section 210 converts gradation values of pixels recorded by the nozzles 62 of the nozzle number 2, the nozzle number 3, the nozzle number 4, and so on from "20" into "4", "6", "9", and so on, respectively.

For image data of colors other than black, the same converting process is also performed by changing the nozzle jetting rate data to be applied. As described above, the gradation value converting section 210 multiplies a gradation value of each pixel of the image data 240 of each color of CMYK by a corresponding nozzle jetting rate to convert the gradation value of each pixel into a nozzle jetting rate-reflected gradation value. Thus, the jetting rate-reflected image data 250 for each color of CMYK is generated.

Here, in order to reflect the nozzle jetting rate in the image data 240, the gradation value of each pixel of the image data 240 is multiplied by the nozzle jetting rate, but the reflection may be performed by various methods. For example, the gradation converting process for forming color development characteristics defined in the ink jet recording apparatus 10 and the process of reflecting the nozzle jetting rate may be integrated. That is, the color converting section 204 may perform only a color converting process from RGB image data into CMYK image data, and the gradation value converting section 210 may first perform a gradation converting process for giving color development characteristics defined in the ink jet recording apparatus 10 with respect to the CMYK image data after the color conversion, and then, may perform a process corresponding to multiplication of a gradation value of each pixel of the CMYK image data after the gradation converting process and a nozzle jetting rate.

In this case, the reflection of the nozzle jetting rate corresponds to performing non-linear conversion obtained by integrating the gradation converting process and the multiplication of the nozzle jetting rate. In this way, in performing the reflection of the nozzle jetting rate as the non-linear conversion, the non-linear conversion may be performed by using a function that uses a gradation value in which the nozzle jetting rate is reflected as an output, using the gradation value of each pixel of the image data 240 and the nozzle jetting rate of each pixel of the jetting rate pattern 234 (or the nozzle number of each pixel of the nozzle pattern 230 and the nozzle jetting rate data L) as arguments, or may be performed using a conversion table.

Further, in a case where the scan pattern program 142 and the nozzle pattern 230 are stored together in the information storing section 124 in advance, the jetting rate pattern 234 may be determined on the basis of the nozzle pattern 230 and the nozzle jetting rate data L, and the jetting rate pattern 234 may be stored in the information storing section 124. For example, the jetting rate pattern 234 may be determined with respect to each combination of the scan pattern program 142 and the nozzle jetting rate data L for each of the plural types of nozzles 62, and the jetting rate pattern 234 for each combination may be stored in the information storing section 124. In a case where the jetting rate pattern 234 is stored in the information storing section 124 in advance, the function of the jetting rate pattern generating section 216 (see FIG. 34) in the gradation value converting section 210 may not be provided.

In the description of FIG. 36, an example in which the nozzle jetting rate indicated by the solid line in FIG. 35 is reflected has been described, but similarly, a gradation value converting process in which the nozzle jetting rate (graph G22) indicated by the dotted chain line of FIG. 35 is reflected or a gradation value converting process in which the nozzle jetting rate (graph G33) indicated by the dotted line of FIG. 35 is reflected may be performed.

The gradation value converting section 210 generates the jetting rate-reflected image data 250 of each color of C, M, Y, and K, and outputs the generated jetting rate-reflected image data 250 of each color to the halftone processing section 212 (see FIG. 34). The processing function performed by the gradation value converting section 210 is an example of a "gradation value converting function".

The halftone processing section 212 performs halftone processing with respect to the jetting rate-reflected image data 250 of each color of C, M, Y, and K input from the gradation value converting section 210 to generate dot data 254 to be used for jetting control of ink for each nozzle 62. That is, the halftone processing section 212 performs halftone processing with respect to the jetting rate-reflected image data 250 that is a continuous tone image for each color in which any one of the nozzle jetting rate A, the nozzle jetting rate B, and the nozzle jetting rate C is reflected, and generates the dot data 254 of each color as a halftone processing result. The dot data 254 is data that represents a dot indicating a disposition pattern of dots. In this embodiment, the dot data 254 is binary data indicating ON/OFF of the dots. As the dot data 254, multi-value data corresponding to types of dot sizes (large dot, medium dot, small dot, and the like) may be used.

In a case where the types of dot sizes are plural (multi-value) and image data of each color of C, M, Y, and K is once converted into image data of each color of C, M, Y, and K corresponding to the respective dot sizes to perform halftone processing, after the image data of each color of C, M, Y, and K are converted into the image data of each color of C, M, Y, and K corresponding to the respective dot sizes, a gradation value of each pixel of the image data of each color of C, M, Y, and K corresponding to the respective dot sizes may be converted into a gradation value in which the nozzle jetting rate is reflected to generate the jetting rate-reflected image data 250 of each color of C, M, Y, and K corresponding to the respective dot sizes.

Known methods may be used as the halftone processing method in the halftone processing section 212. The halftone processing section 212 performs halftone processing using any one of a dither method, an error diffusion method, and a direct binary search (DBS) method, for example.

In the dither method, dot-ON or dot-OFF is determined by comparing a threshold value of a dither mask with a gradation value of each pixel of the jetting rate-reflected image data 250.

In the error diffusion method, by comparing a threshold value in each pixel with an input value (a sum of gradation values of respective pixels of the jetting rate-reflected image data 250 and diffusion errors from surrounding quantized pixels), dot-ON or do-OFF of each pixel is determined on the basis of the comparison result. Further, using a difference between a gradation value corresponding to the determined dot-ON or dot-OFF and an input value as a quantification error, diffusion is performed at a predetermined rate to unprocessed pixels around a pixel that is a processing target.

In the DBS method, a blurred input image is generated by convolving an input image (here, the jetting rate-reflected image data 250) with a visual transfer function (VTF) or other blurring functions (Gaussian function or the like) representing human visual characteristics.

Then, a blurred output image is generated by disposing a predetermined number of dots and convolving the VTF function or other blurring functions. Further, dot replacement is repeated so that a difference between the blurred output image and the blurred input image (sum of squares of respective pixel differences) becomes small. There are various methods for determining the "predetermined number of dots", but for example, a method for determining dot-ON or dot-OFF by the dither method for the jetting rate-reflected image data 250 and calculating the number of dot-ONs, a method for determining relationships between respective input gradation values and dot-ON number densities (the number of dot-ONs per pixel), storing the relationships in the information storing section 124 as a table, summing the dot-ON number densities corresponding to the gradation values of the respective pixels of the jetting rate-reflected image data 250 to calculate the number of dot-ONs, or the like may be used.

The halftone processing section 212 performs halftone processing using any one of the dither method, the error diffusion method, and the DBS method to generate the dot data 254, and then, outputs the dot data 254 to the data output section 214. In a case where there are plural types of dot sizes (multi-value), the halftone processing method may be properly used according to the types of dot sizes. For example, the halftone processing may be performed using the error diffusion method for large dots, and may be performed using the dither method for medium dots and small dots. The processing function performed by the halftone processing section 212 is an example of a "halftone processing function".

The data output section 214 is an interface that outputs the dot data 254 generated by the halftone processing section 212 to a processing unit inside the image processing apparatus 200 or to the outside of the apparatus. The dot data 254 generated by the halftone processing section 212 is sent to the jetting control section 112 (see FIG. 5) through the data output section 214, and printing is performed using the recording head 24.

<Image Processing Method in Image Processing Apparatus>

FIG. 37 is a flowchart showing a processing flow of the image processing apparatus 200. In step S102, image data that is a processing target is input to the image processing apparatus 200. For example, in a case where a recording start operation is performed by the input device 122 after RGB image data is input to the image data acquiring section 202, an image recording process by the ink jet recording apparatus 10, including processes of steps S104 to S120, is started.

In step S104, the image processing apparatus 200 performs color conversion for input image data. For example, the color converting section 204 performs a process of converting RGB image data into CMYK image data.

In step S106, the nozzle pattern determining section 205 of the image processing apparatus 200 specifies a nozzle that performs recording for each pixel of the image data. The nozzle pattern determining section 205 discriminates a scan pattern of the recording head 24 with reference to the scan pattern program 142 in the information storing section 124. Then, the nozzle pattern determining section 205 determines which nozzle 62 of the recording head 24 records each pixel of the image based on the image data 240, on the basis of the scan pattern. Thus, the nozzle pattern determining section 205 determines the nozzle pattern 230 (see FIG. 12).

In a case where the scan pattern program 142 and the nozzle pattern 230 are stored in the information storing section 124 in advance and the above-described recording start operation is performed, the nozzle pattern determining section 205 determines a corresponding nozzle pattern 230, with reference to the nozzle pattern 230 corresponding to the scan pattern program 142 in the information storing section 124.

The nozzle pattern 230 determined by the nozzle pattern determining section 205 is sent from the nozzle pattern determining section 205 to the gradation value converting section 210.

The order of execution of the color converting process of step S104 and the nozzle pattern determination process of step S106 is not limited to the order shown in FIG. 37, and may be appropriately changed, or may be executed in parallel.

Then, the image processing apparatus 200 repeats the processes of steps S110 to S118 for each color among four colors of CMYK, performs gradation value conversion for reflecting a nozzle jetting rate for each color type, and performs halftone processing for a gradation value after the gradation value conversion.

For example, it is assumed that 0, 1, 2, and 3 are set as indexes for distinguishing four color types of CMYK, in which "0" represents cyan, "1" represents "magenta", "2" represents "yellow", and "3" represents "black", respectively. A color type index variable is "color", the index variable is changed by "+1" from the initial value "0" to the final value "3", and the processes of steps S110 to S118 are repeated. The order of colors to be processed is not limited to this example, and may be appropriately changed.

In step S112, the image processing apparatus 200 selects nozzle jetting rate data corresponding to the color types. The jetting rate selecting section 206 selects a nozzle jetting rate B for cyan and magenta. The jetting rate selecting section 206 selects a nozzle jetting rate C for yellow. The jetting rate selecting section 206 selects a nozzle jetting rate A for black. The jetting rate selecting section 206 transmits information on the selected nozzle jetting rates to the gradation value converting section 210.

In step S114, the image processing apparatus 200 converts a gradation value of each pixel for each color into a gradation value in which a nozzle jetting rate is reflected, using the nozzle jetting rate data selected in step S112. That is, as described with reference to FIG. 36, the gradation value converting section 210 compares the nozzle jetting rate data L with the nozzle pattern 230 to determine a nozzle jetting rate of the nozzle 62 that records each pixel of the image data. Thus, the jetting rate pattern 234 is obtained by the gradation value converting section 210.

In a case where the scan pattern program 142 and the nozzle pattern 230 are stored in the information storing section 124 in advance and the jetting rate pattern 234 for each combination of the scan pattern program 142 and the nozzle pattern 230 and plural types of nozzle jetting rate data L is stored in the information storing section 124, the nozzle pattern determining section 205 and the jetting rate selecting section 206 determines the jetting rate pattern 234 to be applied to conversion of the gradation value of each pixel with reference to the jetting rate pattern 234 corresponding to the corresponding nozzle jetting rate data L in the information storing section 124, and inputs the determined result to the gradation value converting section 210, and the gradation value converting section 210 adopts the jetting rate pattern 234 as it is.

In step S114 of FIG. 37, the gradation value converting section 210 multiplies the gradation value of each pixel of the image data 240 of each color of CMYK by the nozzle jetting rate of the jetting rate pattern 234 corresponding to each pixel, or reflects the nozzle jetting rate of the jetting rate pattern 234 corresponding to each pixel in the gradation value of each pixel of the image data 240 of each color of CMYK using a function or a conversion table, to perform conversion of the gradation value of each pixel of the image data 240 of each color (gradation value converting process). Thus, the gradation value of each pixel of the image data 240 for each color is converted into the gradation value in which the nozzle jetting rate is reflected, to generate the jetting rate-reflected image data 250 of each color. The jetting rate-reflected image data 250 of each color is input from the gradation value converting section 210 to the halftone processing section 212.

In step S116, the image processing apparatus 200 performs halftone processing with respect to the jetting rate-reflected image data 250 of each color. The jetting rate-reflected image data 250 of each color of CMYK input to the halftone processing section 212 is halftone-processed using any one of the dither method, the error diffusion method, and the DBS method by the halftone processing section 212, and is converted into dot data of each color (step S116 in FIG. 37, halftone processing process).

The image processing apparatus 200 generates all the dot data 254 of each color of CMYK, by the looped processes of steps S110 to S118, and then, the procedure proceeds to step S120.

In step S120, the image processing apparatus 200 converts the halftone processing result into printing data, and outputs the printing data to the ink jet printing apparatus.

The dot data 254 of each color is input from the halftone processing section 212 to the jetting control section 112 through the data output section 214. In a case where there are plural types of dot sizes (multi-value), the dot data of each color is multi-valued according to the dot size. The jetting control section 112 converts the dot data 254 into printing data.

The jetting control section 112 controls the head drive circuit 128 that drives the recording head 24 on the basis of the dot data 254 of each color of CMYK input from the halftone processing section 212, to control jetting of ink from each nozzle 62 of the recording head 24.

Further, the recording medium transport control section 104 controls the transport drive section 114 to intermittently transport the recording medium 12 in the sub scan direction, and the carriage drive control section 106 controls the main scan drive section 116 in accordance with the scan pattern program 142 to reciprocally scan the recording head 24 in the main scan direction. Thus, an image based on the image data 240 is recorded on the recording medium 12 by the recording head 24 while relatively moving the recording head 24 with respect to the recording medium 12 in the main scan direction and the sub scan direction.

Hereinafter, in a case where image recording is continued, the processes of the above-described steps S102 to S120 are repeatedly executed. In a case where the nozzle jetting rate data L or the nozzle pattern 230 may be the same as in previous image recording, since the previously obtained nozzle jetting rate data L, the nozzle pattern 230 or the jetting rate pattern 234 is used as it is, a part of the processes of the determination (step S106) of the nozzle pattern 230 or the selection (step S112) of the nozzle jetting rate data may be omitted.

In this example, in paying attention to a relationship between the nozzle jetting rate A and the nozzle jetting rate B, the nozzle jetting rate A to be applied to black (graph G1 of FIG. 22 or graph G11 of FIG. 35) corresponds to a "first nozzle jetting rate", and the nozzle jetting rate B to be applied to cyan and magenta (graph G2 of FIG. 22 or graph G22 of FIG. 35) corresponds to a "second nozzle jetting rate".

Alternatively, in paying attention to a relationship between the nozzle jetting rate B and the nozzle jetting rate C, the nozzle jetting rate B to be applied to cyan and magenta (graph G2 of FIG. 22 or graph G22 of FIG. 35) corresponds to the "first nozzle jetting rate", and the nozzle jetting rate C to be applied to yellow (graph G3 of FIG. 22 or graph G33 of FIG. 35) corresponds to the "second nozzle jetting rate".

Alternatively, in paying attention to a relationship between the nozzle jetting rate A and the nozzle jetting rate C, the nozzle jetting rate A to be applied to black (graph G1 of FIG. 22 or graph G11 of FIG. 35) corresponds to the "first nozzle jetting rate", and the nozzle jetting rate C to be applied to yellow (graph G3 of FIG. 22 or graph G33 of FIG. 35) corresponds to the "second nozzle jetting rate".

«Measures for Preventing Gradation Value in which Jetting Rate is Reflected from Exceeding Maximum Gradation Value»

Even in a case where the jetting rate indicated by the solid line (graph G11) of FIG. 35 is reflected in an input gradation value having a duty of 72% or less (in the case of 255 gradations, the gradation value is 183 or less), the gradation value after the reflection does not exceed 100% (in the case of 255 gradations, the gradation value does not exceed 255). Further, even in a case where the jetting rate indicated by the dotted chain line (graph G22) of FIG. 35 is reflected in an input gradation value having a duty of 86% or less (in the case of 255 gradations, the gradation value is 219 or less), the gradation value after the reflection does not exceed 100% (in the case of 255 gradations, the gradation value does not exceed 255).

However, in a case where the jetting rate indicated by the solid line (graph G11) of FIG. 35 is reflected in an input gradation value larger than the duty of 72%, or in a case where the jetting rate indicated by the dotted chain line (graph G22) of FIG. 35 is reflected in an input gradation value larger than the duty of 86%, the gradation value after reflection of the jetting rate in the pixel recorded by the central nozzle exceeds 100% (maximum gradation value). Accordingly, it is necessary to change the jetting rate to be reflected so that the gradation value after the jetting rate reflection does not exceed 100%.

With respect to the jetting rate indicated by the solid line (graph G11) of FIG. 35, the jetting rate is reflected in the input gradation value having the duty of 72% or less (in the case of the 255 gradations, the gradation value is 183 or less) as it is, but with respect to the input gradation value larger than the duty of 72%, the jetting rate obtained as described below is reflected to prevent the gradation value after the jetting rate reflection from exceeding 100%.

Here, it is assumed that the gradations of the input gradation values are 255 gradations. First, in a case where the input gradation value is larger than "183", an absolute nozzle jetting rate shown by a graph G13 in FIG. 38 and an absolute nozzle jetting rate shown by the graph G33 are interpolated to obtain an absolute nozzle jetting rate corresponding to the gradation value. The interpolation is performed so that in a case where the input gradation value is "183", the absolute nozzle jetting rate matches the absolute nozzle jetting rate of the graph G13, and in a case where the input gradation value is "255", the absolute nozzle jetting rate matches the absolute nozzle jetting rate of the graph G33. For example, in a case where the input gradation value is "200", the absolute nozzle jetting rate of the nozzle number 0 is obtained by the following equation.

$$\{0.0 \times (255-200) + 1.0 \times (200-183)\}/(255-183) = 0.2361$$

Here, the absolute nozzle jetting rate is rounded to the fifth decimal place, and are shown up to the fourth decimal place.

Then, absolute nozzle jetting rates of respective nozzles obtained by the above-mentioned interpolation are converted by Equation 1.

By reflecting the jetting rates obtained in this way in the input gradation values, it is possible to prevent the gradation values after the reflection from exceeding "255".

With respect to the jetting rate indicated by the dotted chain line (graph G22) of FIG. 35, the jetting rate is reflected in the input gradation value having the duty of 86% or less (in the case of the 255 gradations, the gradation value is 219 or less) as it is, but with respect to the input gradation value larger than the duty of 86%, by interpolating an absolute nozzle jetting rate shown in a graph G23 of FIG. 39 and an absolute nozzle jetting rate shown in a graph G33 to obtain an absolute nozzle jetting rate corresponding to the gradation value and reflecting a jetting rate obtained by converting the absolute nozzle jetting rate according to Equation 1, it is possible to prevent the gradation value after the jetting rate reflection from exceeding "255".

Here, in the absolute nozzle jetting rate shown in the graph G13 of FIG. 38, the relative ratio of the absolute nozzle jetting rate of each nozzle is the same as the relative ratio of the jetting rate of each nozzle in the jetting rate shown in the graph G11 of FIG. 35 (and the graph G1 of FIG. 22). That is, the absolute nozzle jetting rate shown in the graph G13 of FIG. 38 is equivalent to the jetting rate shown in the graph G11 of FIG. 35 (and the graph G1 of FIG. 22) as the relative jetting rate. Similarly, an absolute nozzle jetting rate shown in the graph G23 of FIG. 39 is equivalent to the jetting rate shown in the graph G22 of FIG. 35 (and the graph G2 of FIG. 22) as the relative jetting rate. In a case where the absolute nozzle jetting rate shown in the graph G13 of FIG. 38 is converted by Equation 1, the jetting rate shown in the graph G11 in FIG. 35 is obtained, and in a case where the absolute nozzle jetting rate shown in the graph G23 of FIG. 39 is converted by Equation 1, the jetting rate shown in the graph G22 of FIG. 35 is obtained.

Advantages of Embodiment

According to the present embodiment, halftone processing including gradation value conversion for reflecting a nozzle jetting rate in which a jetting rate of an end part nozzle is suppressed to be lower than a jetting rate of a central nozzle is performed with respect to a high-density or low-saturation color having a relatively large contribution to banding, whereas halftone processing including gradation value conversion for reflecting a nozzle jetting rate that is close to uniformity is performed with respect to a low-density chromatic color or a high-saturation color having a relatively small contribution to banding and a relatively large contribution to color unevenness. The color having the relatively large contribution to the banding refers to a color with high banding visibility. The color having the relatively large contribution to the color unevenness refers to a color with high color unevenness visibility.

According to this embodiment, it is possible to obtain a halftone processing result in which a nozzle jetting rate that is a control target is reflected, and to perform a jetting control of each nozzle on the basis of the halftone processing result. Thus, it is possible to suppress occurrence of color unevenness while suppressing banding without lowering productivity.

Modification Example 1

Instead of the configuration of the image processing apparatus 200 shown in FIG. 34, a configuration of an image processing apparatus 200A shown in FIG. 40 may be employed. In FIG. 40, the same reference numerals are given to components that are the same as or similar to those shown in FIG. 34, and description thereof will not be repeated.

The gradation value converting section 210 in the image processing apparatus 200A of FIG. 40 includes a first gradation value converting section 261, a second gradation value converting section 262, and a third gradation value converting section 263. The first gradation value converting section 261 performs gradation value conversion using the nozzle jetting rate A with respect to image data of black (K). The second gradation value converting section 262 performs gradation value conversion using the nozzle jetting rate B with respect to image data of respective colors of cyan (C) and magenta (M). The third gradation value converting section 263 performs gradation value conversion using the nozzle jetting rate C with respect to image data of yellow (Y).

Here, in a case where black is set to a "first color" and each of cyan and magenta is set to a "second color", the nozzle jetting rate A corresponds to a "first nozzle jetting rate", the first gradation value converting section 261 corresponds to a "first gradation value converting section", the nozzle jetting rate B corresponds to a "second nozzle jetting rate", and the second gradation value converting section 262 corresponds to a "second gradation value converting section".

Alternatively, in a case where each of cyan and magenta is set to a "first color" and yellow is set to a "second color", the nozzle jetting rate B corresponds to a "first nozzle jetting rate", the second gradation value converting section 262 corresponds to a "first gradation value converting section", the nozzle jetting rate C corresponds to a "second nozzle jetting rate", and the third gradation value converting section 263 corresponds to a "second gradation value converting section".

Alternatively, in a case where black is set to a "first color" and yellow is set to a "second color", the nozzle jetting rate A corresponds to a "first nozzle jetting rate", the first gradation value converting section 261 corresponds to a "first gradation value converting section", the nozzle jetting rate C corresponds to a "second nozzle jetting rate", and the third gradation value converting section 263 corresponds to a "second gradation value converting section".

Modification Example 2

A gradation value converting process may be performed using the nozzle jetting rate A with respect to one color among cyan and magenta, and a gradation value converting process may be performed using the nozzle jetting rate B with respect to the other color.

Modification Example 3

In the case of an ink jet recording apparatus that records a color image using six-color ink including light cyan (LC) and light magenta (LM) in addition to four colors of CMYK, a gradation value conversting process is performed using the nozzle jetting rate B with respect to image data of respective colors of light cyan and light magenta.

Modification Example 4

In the above-described embodiment, a configuration in which a nozzle jetting rate corresponding to a color type is selected from the nozzle jetting rate A, the nozzle jetting rate B, and the nozzle jetting rate C respectively corresponding to three kinds of nozzle jetting rates of the graphs G1, G2, and G3 of FIG. 22 is shown, but from the viewpoint of reducing the amount of memory or the like, a configuration in which two kinds of nozzle jetting rates are used and a nozzle jetting rate corresponding to a color type is selected therefrom may be used. For example, a non-uniform nozzle jetting rate (the graph G1 in FIG. 22) may be selected for only black and a uniform nozzle jetting rate (the graph G3 in FIG. 22) may be selected for cyan, magenta, and yellow. Alternatively, a configuration in which plural kinds of nozzle jetting rates corresponding to three or more kinds of nozzle jetting rates are retained and a nozzle jetting rate corresponding to a color type is selected may be used. For example, a configuration in which nozzle jetting rates of respective colors of black, cyan, magenta, and yellow are different from each other may be used. In summary, a configuration in which two or more kinds of nozzle jetting rates are used and a nozzle jetting rate corresponding to a color type is selected therefrom may be used. Here, the "different types" in the nozzle jetting rates means that relative ratios of jetting rates of respective nozzles in a nozzle row are different from each other.

Modification Example 5

Hereinabove, specific examples of four colors of CMYK have been described, but a configuration in which image data on a plurality of colors based on a combination of two or more colors is handled may be used. For example, a configuration in which only three colors of CMY in which black is removed may be used.

Modification Example 6

For each color type, how much the jetting rate of the end part nozzle should be suppressed depends on a color (density, saturation, and hue) in actual printing on the recording medium with each color, but since visibility of color unevenness or banding is affected by a plurality of causes, for example, not only the color, but also a dot shape, a dot size, landing interference, and the type of permeation into the recording medium, it is preferable to experimentally determine an appropriate nozzle jetting rate.

For example, it is preferable to retain a plurality of kinds of nozzle jetting rates in advance, to apply each of the plural kinds of nozzle jetting rates to perform gradation value conversion, to perform printing with a primary color, a secondary color, and a tertiary color of each color, and to evaluate visibilities of color unevenness and banding, to thereby determine an appropriate nozzle jetting rate.

For example, nozzle jetting rates of respective colors of cyan, magenta, yellow, light cyan, and light magenta are experimentally determined. Nozzle jetting rates of a plurality of types of candidate nozzle jetting rates are retained in advance, test printing of primary colors, secondary colors, tertiary colors, and the like is actually performed by applying a combination of nozzle jetting rates to respective colors, visibilities of color unevenness and banding are evaluated on the basis of the printing result, and a combination of nozzle jetting rates with favorable color unevenness and banding is employed. Here, instead of a configuration in which the nozzle jetting rates of the respective colors are not all different, a combination in which the same nozzle jetting rate is set for some colors may be employed. For example, a combination in which the same nozzle jetting rate is set for cyan and magenta, or light cyan and light magenta may be employed.

Modification Example 7

In the above-described embodiment, as a specific method for reflecting nozzle jetting rates of respective nozzles in input gradation values in halftone processing to control recording, an example based on the method disclosed in JP2016-043651A has been described, but the invention is not limited to this example in reducing the invention to practice. For example, a method for reflecting nozzle jetting rates of respective nozzles in input gradation values and reflecting the nozzle jetting rates in dither masks is disclosed in JP2016-120714A. In reducing the invention to practice, the method disclosed in JP2016-120714A may be used. In this case, in a state where one type of dither mask is prepared, only a nozzle jetting rate of each nozzle to be reflected in an input gradation value may be changed between a first color and a second color to be selected, or in a state where two types or more dither masks are prepared, a nozzle jetting rate of each nozzle to be reflected in an input gradation value and each dither mask may be both changed between a first color and a second color to be selected.

Modification Example 8

In the above-described embodiments, as an ink jet recording apparatus that is an example of an image recording apparatus, a wide format printer that uses an ultraviolet curable ink has been described as an example, but the invention is not limited to the ultraviolet curable ink, and may be applied to a variety of ink jet recording apparatuses for recording an image on a recording medium using various kinds of ink.

With respect to the main scan operation and the sub scan operation, it is sufficient if the relative movement of the recording medium and the recording head is performed in each of the main scan direction and the sub scan direction, and thus, the recording medium may be moved in the main scan direction to perform the main scan operation, or the recording head may be moved in the sub scan direction to perform the sub scan operation.

<Hardware Configuration of Respective Processing Units and Control Sections>

A hardware structure of processing units that execute a variety of processes, such as the recording medium transport control section 104, the carriage drive control section 106, the light source control section 108, the image processing section 110, the jetting control section 112, and the information storing section 124 of the control device 102 described in FIG. 5, the color converting section 204, the nozzle pattern determining section 205, the jetting rate selecting section 206, the gradation value converting section 210, and the halftone processing section 212 of the image processing apparatus 200 described in FIG. 34, the first gradation value converting section 261, the second gradation value converting section 262, and the third gradation value converting section 263 of the image processing apparatus 200A described in FIG. 40 corresponds to a variety of processors which will be described hereinafter.

The variety of processors may include a central processing unit (CPU) that is a general-purpose processor that executes a program to function as a variety of processing units, a programmable logic device (PLD) that is a processor of which a circuit configuration is changeable after manufacturing, such as a field programmable gate array (FPGA), a dedicated electric circuit that is a processor having a circuit configuration that is dedicatedly designed for executing a specific process, such as an application specific integrated circuit (ASIC), or the like.

One processing unit may be configured by one processor among the variety of processors described above, or may be configured by the same type or different types of two or more processors. For example, one processing unit may be a combination of a plurality of FPGAs, or a combination of a CPU and an FPGA. Further, a plurality of processing units may be configured by one processor. Furthermore, as an example in which a plurality of processing units are configured by one processor, first, as represented by a computer such as a client or a server, a configuration in which a combination of one or more CPUs and software forms one processor and this processor functions as a plurality of processing units may be employed. Second, as represented by a system on chip (SoC) or the like, a configuration in which a processor for realizing entire functions of a system including a plurality of processing units using one integrated circuit (IC) chip is used may be employed. In this way, the variety of processing units may be configured by using one or more of the variety of processors as the hardware structure.

Further, the hardware structure of the variety of processors is, more specifically, electric circuitry in which circuit elements such as semiconductors are combined.

«Program that Causes Computer to Function as Image Processing Apparatus»

A program that causes a computer to function as an image processing apparatus described in the above-described embodiment may be recorded on a computer-readable medium (a non-transitory information storage medium that is a tangible object), such as an optical disc, a magnetic disc, or the like, and the program may be provided through the information storage medium. Instead of a configuration in which the program is stored and provided in such an information storage medium, a configuration in which a program signal is provided as a download service using a communication network such as the Internet may be used.

Further, it is possible to provide a function of the image processing apparatus according to the embodiment as an application server, and to provide a service for providing the processing function through a communication network.

Further, by incorporating the program in the computer, it is possible to cause the computer to realize the functions of the image processing apparatus, to thereby realize the image processing functions described in the above-described embodiments.

In addition, a configuration in which a part or an entirety of a program for realizing print control including the image processing function described in the present embodiment is incorporated in a host control device such as a host computer or is applied as an operation program of a central processing unit (CPU) on the ink jet recording apparatus.

«Terms»

The term "image recording apparatus" includes a concept of a term such as a printer, a printing device, an image forming device, an image output device, or a drawing device. Further, the term "image recording apparatus" includes a concept of a printing system formed by combining a plurality of devices.

The "image" should be interpreted in a broad sense, and includes a color image, a white black image, a single color image, a gradation image, a uniform concentration (solid) image, or the like. The "image" is not limited to a photo image, and is used as a generic term including a figure, a character, a symbol, a line, a mosaic pattern, a color-filled pattern, a variety of other patterns, or an appropriate combination thereof.

In this specification, the term "perpendicular" or "vertical" includes a configuration that generates the same effects as in a case where two elements cross each other at an angle that is substantially 90°, among configurations in which two elements cross each other at an angle that is smaller than 90° or at an angle that exceeds 90°. In this specification, the term "parallel" includes a configuration in which two elements can be considered to be substantially parallel, capable of obtaining substantially the same effects as in a case where two elements are parallel, among configurations in which two elements are not strictly parallel.

Combinations of Embodiments and Modification Examples

The configurations described in the above-described embodiments or the content described in the modification examples may be appropriately combined for use, and a part thereof may be switched.

«Others»

In the above-described embodiment, the object is to suppress banding, streaks, or unevenness due to density change. However, banding, streaks, or unevenness due to gloss change also occurs in the ink jet recording apparatus in a similar way, and the invention is effective for this problem. Similarly, the invention is effective for banding, streaks, or unevenness due to change in a dot pattern.

The configurations described in the above-described embodiments of the invention may include appropriate modifications, additions, or deletions in a range without departing from the concept of the invention. The invention is not limited to the above-described embodiments, and a variety of modifications may be made by those skilled in the art within the technical idea of the invention.

EXPLANATION OF REFERENCES

10: ink jet recording apparatus
12: recording medium
20: apparatus body
22: support feet
24, 24A: recording head
24C, 24M, 24Y, 24K: head module
26: platen
28: guide mechanism
30: carriage
32A, 32B: precuring light source
34A, 34B: main curing light source
36: ink cartridge
38: mounting section
40: nip roller
42: supply side roll
44: winding roll
46: guide
50: temperature control section
52: pre-temperature control section
54: after-temperature control section
61, 61A: nozzle row
61C, 61M, 61Y, 61K: nozzle row
62: nozzle
102: control device
104: recording medium transport control section
106: carriage drive control section
108: light source control section
110: image processing section
112: jetting control section
114: transport drive section
116: main scan drive section
118: light source drive circuit
119: light source drive circuit
120: display device
122: input device
124: information storing section
126: image input interface
128: head drive circuit
130: encoder
132: sensor
140: control program
142: scan pattern program
200, 200A: image processing apparatus
202: image data acquiring section
204: color converting section
205: nozzle pattern determining section
206: jetting rate selecting section
208: nozzle jetting rate storing section
210: gradation value converting section
212: halftone processing section
214: data output section
216: jetting rate pattern generating section
218: conversion calculating section
230: nozzle pattern
234: jetting rate pattern
240: image data
250: jetting rate-reflected image data
254: dot data
261: first gradation value converting section
262: second gradation value converting section
263: third gradation value converting section
S102 to S120: steps of image processing method

What is claimed is:

1. An image processing apparatus that generates dot data indicating a disposition pattern of dots for each color for recording an image on a recording medium, while relatively moving a recording head having a nozzle row in which a plurality of nozzles that jet, for each of a plurality of colors of ink, each ink are arranged in a sub scan direction, in a main scan direction perpendicular to the sub scan direction and the sub scan direction with respect to the recording medium, comprising:

a gradation value converting section that performs a process of reflecting a first nozzle jetting rate in which a nozzle jetting rate of an end part nozzle that is located at each of both end parts of the nozzle row is suppressed to be smaller than a nozzle jetting rate of a central nozzle located at a central part of the nozzle row in a range of at least a part of a recording duty, in a gradation value of each pixel in image data of a first color among the plurality of colors, to convert the gradation value of each pixel in the image data of the first color, and a process of reflecting a second nozzle jetting rate having a smaller difference between the nozzle jetting rate of the end part nozzle and the nozzle jetting rate of the central nozzle compared with the first nozzle jetting rate in the range of at least the part of the recording duty, in a gradation value of each pixel in image data of a second color different from the first color among the plurality of colors, to convert the gradation value of each pixel in the image data of the second color; and a halftone processing section that performs halftone processing with respect to the image data of the first color and the image data of the second color that are converted by the gradation value converting section to generate the dot data of the first color and the second color.

2. The image processing apparatus according to claim 1, wherein the nozzle jetting rate of an end nozzle located at an end of the nozzle row at the first nozzle jetting rate is lower than the nozzle jetting rate of an end nozzle located at an end of the nozzle row at the second nozzle jetting rate.

3. The image processing apparatus according to claim 1, wherein the first color has a higher banding visibility than that of the second color.

4. The image processing apparatus according to claim 1, wherein the first color has a lower visibility of color unevenness in a case where the first color overlaps a different color than that of the second color.

5. The image processing apparatus according to claim 1, wherein the first color has a higher density than that of the second color.

6. The image processing apparatus according to claim 1, wherein the first color has a lower saturation than that of the second color.

7. The image processing apparatus according to claim 1, wherein the nozzle jetting rate of each nozzle of the nozzle row at the second nozzle jetting rate is constant.

8. The image processing apparatus according to claim 1, wherein the plurality of colors include four colors of cyan, magenta, yellow, and black,
wherein the first color is black, and
wherein the second color is at least one color among cyan, magenta, and yellow.

9. The image processing apparatus according to claim 1, wherein the plurality of colors include three colors of cyan, magenta, and yellow,
wherein the first color is at least one color among cyan and magenta, and
wherein the second color is yellow.

10. The image processing apparatus according to claim 1, wherein the plurality of colors include two colors of cyan and magenta,
wherein the first color is one color among cyan and magenta, and
wherein the second color is the other color among cyan and magenta.

11. The image processing apparatus according to claim 1, wherein the plurality of colors include four colors of cyan, magenta, yellow, and black,
wherein a nozzle jetting rate of each nozzle that jets black ink as the first color is set so that the nozzle jetting rate of the end nozzle that is located at the end of the nozzle row is the lowest, compared with a nozzle jetting rate of each nozzle that jets ink of the other colors.

12. The image processing apparatus according to claim 1, wherein the plurality of colors include four colors of cyan, magenta, yellow, and black,
wherein a nozzle jetting rate of each nozzle that jets black ink as the first color is set so that a difference between the nozzle jetting rate of the end part nozzle and the nozzle jetting rate of the central nozzle is the largest, compared with a nozzle jetting rate of each nozzle that jets ink of the other colors.

13. The image processing apparatus according to claim 1, wherein the plurality of colors include four colors of cyan, magenta, yellow, and black,
wherein a nozzle jetting rate of each nozzle that jets at least one ink of cyan or magenta has a higher nozzle jetting rate of the end nozzle that is located at the end of the nozzle row, compared with a nozzle jetting rate of each nozzle that jets black ink as the first color.

14. The image processing apparatus according to claim 13, wherein a nozzle jetting rate of each nozzle that jets cyan ink and a nozzle jetting rate of each nozzle that jets magenta ink are different from each other.

15. The image processing apparatus according to claim 1, wherein the plurality of colors include four colors of cyan, magenta, yellow, and black,
wherein a nozzle jetting rate of each nozzle that jets ink of at least one of cyan or magenta is set so that a difference between the nozzle jetting rate of the end part nozzle and the nozzle jetting rate of the central nozzle is smaller, compared with a nozzle jetting rate of each nozzle that jets black ink as the first color.

16. The image processing apparatus according to claim 15, wherein a nozzle jetting rate of each nozzle that jets cyan ink and a nozzle jetting rate of each nozzle that jets magenta ink are different from each other.

17. The image processing apparatus according to claim 1, wherein the plurality of colors include yellow, and
wherein a nozzle jetting rate of each nozzle that jets yellow ink as the second color is set so that the nozzle jetting rate of an end nozzle that is located at an end of the nozzle row is the largest, compared with a nozzle jetting rate of each nozzle that jets ink of the other colors.

18. The image processing apparatus according to claim 1, wherein the plurality of colors include yellow, and
wherein a nozzle jetting rate of each nozzle that jets yellow ink as the second color is set so that a difference between the nozzle jetting rate of the end part nozzle and the nozzle jetting rate of the central nozzle is the smallest, compared with a nozzle jetting rate of each nozzle that jets ink of the other colors.

19. The image processing apparatus according to claim 1, wherein the plurality of colors include yellow, and
wherein a nozzle jetting rate of each nozzle that jets yellow ink as the second color is constant.

20. The image processing apparatus according to claim 1, further comprising:
a nozzle jetting rate storing section that stores plural kinds of nozzle jetting rates including the first nozzle jetting rate and the second nozzle jetting rate; and
a nozzle jetting rate selecting section that selects a nozzle jetting rate to be used for the gradation value converting process in the gradation value converting section from the plural kinds of nozzle jetting rates, in accordance with a color type of image data that is a target of the halftone processing.

21. The image processing apparatus according to claim 1, wherein the gradation value converting section includes a first gradation value converting section that performs a process of reflecting the first nozzle jetting rate in the gradation value of each pixel in the image data of the first color to convert the gradation value of each pixel in the image data of the first color, and
a second gradation value converting section that performs a process of reflecting the second nozzle jetting rate in the gradation value of each pixel in the image data of the second color to convert the gradation value of each pixel in the image data of second color.

22. The image processing apparatus according to claim 1, further comprising:
a nozzle pattern determining section that determines a nozzle pattern indicating which one of the plurality of nozzles records each pixel of image data to be recorded on the recording medium using the recording head,
wherein the gradation value converting section reflects the nozzle jetting rate of the nozzle that records each pixel in the gradation value of each pixel in the image data of the respective colors of the first color and the second color, on the basis of the nozzle pattern determined by the nozzle pattern determining section, to convert the gradation value of each pixel.

23. An image processing method for generating dot data indicating a disposition pattern of dots for each color for recording an image on a recording medium, while relatively moving a recording head having a nozzle row in which a plurality of nozzles that jet, for each of a plurality of colors of ink, each ink are arranged in a sub scan direction, in a main scan direction perpendicular to the sub scan direction and the sub scan direction with respect to the recording medium, comprising:

a gradation value converting process of performing a process of reflecting a first nozzle jetting rate in which a nozzle jetting rate of an end part nozzle that is located at each of both end parts of the nozzle row is suppressed to be smaller than a nozzle jetting rate of a central nozzle located at a central part of the nozzle row in a range of at least a part of a recording duty, in a gradation value of each pixel in image data of a first color among the plurality of colors, to convert the gradation value of each pixel in the image data of the first color, and a process of reflecting a second nozzle jetting rate having a smaller difference between the nozzle jetting rate of the end part nozzle and the nozzle jetting rate of the central nozzle compared with the first nozzle jetting rate in the range of at least the part of the recording duty, in a gradation value of each pixel in image data of a second color different from the first color among the plurality of colors, to convert the gradation value of each pixel in the image data of the second color; and a halftone processing process of performing halftone processing with respect to the image data of the first color and the image data of the second color that are converted in the gradation value converting process to generate the dot data of the first color and the second color.

24. A program that causes a computer to execute a function of generating dot data indicating a disposition pattern of dots for each color for recording an image on a recording medium, while relatively moving a recording head having a nozzle row in which a plurality of nozzles that jet, for each of a plurality of colors of ink, each ink are arranged in a sub scan direction, in a main scan direction perpendicular to the sub scan direction and the sub scan direction with respect to the recording medium, the program causing the computer to execute:

a gradation value converting function of performing a process of reflecting a first nozzle jetting rate in which a nozzle jetting rate of an end part nozzle that is located at each of both end parts of the nozzle row is suppressed to be smaller than a nozzle jetting rate of a central nozzle located at a central part of the nozzle row in a range of at least a part of a recording duty, in a gradation value of each pixel in image data of a first color among the plurality of colors, to convert the gradation value of each pixel in the image data of the first color, and a process of reflecting a second nozzle jetting rate having a smaller difference between the nozzle jetting rate of the end part nozzle and the nozzle jetting rate of the central nozzle compared with the first nozzle jetting rate in the range of at least the part of the recording duty, in a gradation value of each pixel in image data of a second color different from the first color among the plurality of colors, to convert the gradation value of each pixel in the image data of the second color; and a halftone processing function of performing halftone processing with respect to the image data of the first color and the image data of the second color that are converted by the gradation value converting function to generate the dot data of the first color and the second color.

25. An image recording apparatus comprising:

a recording head having a nozzle row in which a plurality of nozzles that jet, for each of a plurality of colors of ink, each ink are arranged in a sub scan direction;

a gradation value converting section that performs a process of reflecting a first nozzle jetting rate in which a nozzle jetting rate of an end part nozzle that is located at each of both end parts of the nozzle row is suppressed to be smaller than a nozzle jetting rate of a central nozzle located at a central part of the nozzle row in a range of at least a part of a recording duty, in a gradation value of each pixel in image data of a first color among the plurality of colors, to convert the gradation value of each pixel in the image data of the first color, and a process of reflecting a second nozzle jetting rate having a smaller difference between the nozzle jetting rate of the end part nozzle and the nozzle jetting rate of the central nozzle compared with the first nozzle jetting rate in the range of at least the part of the recording duty, in a gradation value of each pixel in image data of a second color different from the first color among the plurality of colors, to convert the gradation value of each pixel in the image data of the second color; and a halftone processing section that performs halftone processing with respect to the image data of the first color and the image data of the second color that are converted by the gradation value converting section to generate dot data indicating dot disposition patterns of the first color and the second color; and a recording control section that controls the jetting of the ink from the nozzles on the basis of the dot data obtained through the halftone processing and performs a control for recording an image on a recording medium by repeating a main scan operation of jetting the ink from the nozzles while relatively moving the recording head with respect to the recording medium in a main scan direction that is perpendicular to the sub scan direction to perform recording and a sub scan operation of relatively moving the recording medium with respect to the recording head in the sub scan direction.

* * * * *